(12) United States Patent
Parshionikar

(10) Patent No.: US 10,558,272 B2
(45) Date of Patent: Feb. 11, 2020

(54) GESTURE CONTROL VIA EYE TRACKING, HEAD TRACKING, FACIAL EXPRESSIONS AND OTHER USER ACTIONS

(71) Applicant: Uday Parshionikar, Mason, OH (US)

(72) Inventor: Uday Parshionikar, Mason, OH (US)

(73) Assignee: Uday Parshionikar, Mason, OH (US)

( * ) Notice: Subject to any disclaimer, the term of this patent is extended or adjusted under 35 U.S.C. 154(b) by 0 days.

(21) Appl. No.: 15/921,632

(22) Filed: Mar. 14, 2018

(65) Prior Publication Data

US 2018/0364810 A1 Dec. 20, 2018

Related U.S. Application Data

(63) Continuation-in-part of application No. 14/897,657, filed as application No. PCT/US2014/043529 on Jun. 20, 2014, now Pat. No. 10,254,844, and a continuation-in-part of application No. 15/469,456, filed on Mar. 24, 2017, now Pat. No. 10,137,363, which is a continuation-in-part of application No. 14/897,657, filed as application No. PCT/US2014/043529 on Jun. 20, 2014, now Pat. No. 10,254,844.

(Continued)

(51) Int. Cl.
*G06F 3/01* (2006.01)
*G06K 9/00* (2006.01)

(52) U.S. Cl.
CPC .............. *G06F 3/017* (2013.01); *G06F 3/012* (2013.01); *G06F 3/013* (2013.01); *G06K 9/00302* (2013.01)

(58) Field of Classification Search
CPC ........... G06F 3/013; G06F 3/011; G06F 3/017
See application file for complete search history.

(56) References Cited

U.S. PATENT DOCUMENTS

2009/0052785 A1* 2/2009 Shamaie .................. G06F 3/017
382/209
2010/0295782 A1* 11/2010 Binder .................. G01S 3/7864
345/158

(Continued)

OTHER PUBLICATIONS

Skovsgaard H., et. al.; Computer Control by Gaze; Chapter 9 in Book "Gaze Interaction and Applications of Eye Tracking"; IGI Global; ISBN13: 9781613500989; Release Date: Oct. 2011; pp. 78-102.

(Continued)

*Primary Examiner* — Christopher E Leiby
(74) *Attorney, Agent, or Firm* — Taft Stettinius & Hollister LLP; Anthony P. Filomena, II

(57) ABSTRACT

Methods of interpreting user actions for controlling electronic devices, as well as apparatuses and systems implementing the methods. User actions can involve eyes, head, face, fingers, hands, arms, other body parts, as well as facial, verbal and/or mental actions. Hand and/or voice free control of devices. Methods for large as well as fine motion and placement of objects. Use of actions before and during other actions to confirm the intent of the other actions. Objects can be moved or warped based on combinations of actions. Measurement of eye gaze, and iterations and helper signals for improved accuracy of control. Triggers to start and end recognition of user actions and generation of device commands.

35 Claims, 33 Drawing Sheets

Related U.S. Application Data

(60) Provisional application No. 61/837,215, filed on Jun. 20, 2013, provisional application No. 62/313,042, filed on Mar. 24, 2016, provisional application No. 62/427,006, filed on Nov. 28, 2016, provisional application No. 62/470,872, filed on Mar. 14, 2017, provisional application No. 62/537,482, filed on Jul. 27, 2017, provisional application No. 62/589,228, filed on Nov. 21, 2017, provisional application No. 62/626,253, filed on Feb. 5, 2018, provisional application No. 62/630,253, filed on Feb. 14, 2018.

(56) References Cited

U.S. PATENT DOCUMENTS

| | | | | |
|---|---|---|---|---|
| 2012/0300061 | A1* | 11/2012 | Osman | G06F 1/3231 |
| | | | | 348/135 |
| 2013/0141313 | A1* | 6/2013 | Zhou | G02B 27/017 |
| | | | | 345/8 |
| 2014/0247215 | A1 | 9/2014 | George-Svahn et al. | |
| 2014/0347265 | A1* | 11/2014 | Aimone | G09G 3/003 |
| | | | | 345/156 |
| 2015/0338651 | A1* | 11/2015 | Wang | G06F 1/163 |
| | | | | 345/8 |
| 2016/0048223 | A1* | 2/2016 | Taguchi | G06F 3/013 |
| | | | | 345/157 |
| 2017/0177079 | A1 | 6/2017 | George-Svahn et al. | |

OTHER PUBLICATIONS

Raiha K-J, Spakov, O.; Disambiguating Ninja Cursors with Eye Gaze; Proceedings of CHI 2009; Boston, MA; Apr. 2009; 4 pages.

Leyba J., Malcolm J.; Eye Tracking as an Aiming Device in a Computer Game.; Course work (CPSC 412/612 Eye Tracking Methodology and Applications by A. Duchowski), Clemson University; 2004; 9 pages.

Wilson A., Cutrell, E.; FlowMouse: A Computer Vision-Based Pointing and Gesture Input Device; In: Costabile M.F., Paternò F. (eds) Human-Computer Interaction—Interact 2005; Interact 2005; Lecture Notes in Computer Science, vol. 3585. Springer, Berlin, Heidelberg; 14 pages.

Liebling D, et. al.; Gaze and Mouse Coordination in Everyday Work; Proceedings of UbiComp 2014; Seattle, WA; Sep. 13-17, 2014; ACM; 10 pages.

Zhai S. et. al.; Manual and Gaze Input Cascaded (MAGIC) Pointing; Proceedings of CHI 1999: ACM Conference on Human Factors in Computing Systems; Pittsburgh, PA; May 15-20, 1999; 8 pages.

Tobii Technology AB; Tobii Developer Zone; Mouse Warp in combination with headtracking mouse; https://developer.tobii.com/community/forums/topic/mouse-warp-in-combination-with-headtracking-mouse/; Sep. 30, 2015; 2 pages.

Dell Inc.; AlienWare; Tobii Eye Tracker User's Guide; 2016; 12 pages.

Tobii Technology AB; Tobii Developer Zone; Mouse Warp not working on eye move?; https://developer.tobii.com/community/forums/topic/mouse-warp-not-working-on-eye-move/; Aug. 16-17, 2015; 2 pages.

Tobii Technology AB; Tobii Developer Zone; Mouse Warp?; Tobii Developer Zone; Mouse Warp not working on eye move?; https://developer.tobii.com/community/forums/topic/mouse-warp/; Dec. 12, 2014; 3 pages.

Wall Street Journal; YouTube; Turning Your Eyes Into a Computer Mouse; https://www.youtube.com/watch?v=QRMPkTrngUw; Jan. 6, 2012; 3 pages.

Nash, H.; YouTube; Precision Gaze Mouse Demo; https://www.youtube.com/watch?v=htbBH0W5F78; Jul. 14, 2017; 4 pages.

* cited by examiner $d = 0.1 \times D$  $\quad d = 0.2 \times D$  $\quad d = 0.3 \times D$  $\quad d = 0.4 \times D$  $\quad d = D$

GESTURE CONTROL VIA EYE TRACKING, HEAD TRACKING, FACIAL EXPRESSIONS AND OTHER USER ACTIONS

CROSS REFERENCE TO RELATED APPLICATIONS

This application is a continuation-in-part of U.S. patent application Ser. No. 14/897,657 filed Dec. 11, 2015 entitled "SYSTEMS, METHODS, APPARATUSES, COMPUTER READABLE MEDIUM FOR CONTROLLING ELECTRONIC DEVICES", which claims priority to PCT Application Serial No. PCT/US14/43529, filed Jun. 20, 2014 entitled "SYSTEMS, METHODS, APPARATUSES, COMPUTER READABLE MEDIUM FOR CONTROLLING ELECTRONIC DEVICES", which claims priority to U.S. Provisional Patent Application Ser. No. 61/837,215, filed Jun. 20, 2013 entitled "Multipurpose Controllers using Sensors, Heuristics for User Intent, Computer Vision, Multiple OMDs, ODEs and POLAs", the disclosures of which are all expressly incorporated herein by reference.

This application is also a continuation-in-part of U.S. patent application Ser. No. 15/469,456 filed Mar. 24, 2017 entitled "GESTURE BASED USER INTERFACES, APPARATUSES AND CONTROL SYSTEMS", which is a continuation-in-part of U.S. patent application Ser. No. 14/897,657 filed Dec. 11, 2015 entitled "SYSTEMS, METHODS, APPARATUSES, COMPUTER READABLE MEDIUM FOR CONTROLLING ELECTRONIC DEVICES", which claims priority to PCT Application Serial No. PCT/US14/43529, filed Jun. 20, 2014 entitled "SYSTEMS, METHODS, APPARATUSES, COMPUTER READABLE MEDIUM FOR CONTROLLING ELECTRONIC DEVICES", which claims priority to U.S. Provisional Patent Application Ser. No. 61/837,215, filed Jun. 20, 2013 entitled "Multipurpose Controllers using Sensors, Heuristics for User Intent, Computer Vision, Multiple OMDs, ODEs and POLAs"; and which also claims priority to U.S. Provisional Patent Application Ser. No. 62/313,042 filed on Mar. 24, 2016 entitled "Gestures Based User Interfaces, Apparatuses and Control Systems" and U.S. Provisional Patent Application Ser. No. 62/427,006 filed on Nov. 28, 2016 entitled "Gestures Based User Interfaces, Apparatuses and Control Systems", the disclosures of which are all also expressly incorporated herein by reference.

This application also claims priority to U.S. Provisional Patent Application Ser. No. 62/470,872 filed on Mar. 14, 2017 entitled "Gestures Based User Interfaces, Apparatuses and Control Systems", U.S. Provisional Patent Application Ser. No. 62/537,482 filed on Jul. 27, 2017 entitled "Gestures Based User Interfaces, Apparatuses and Control Systems", U.S. Provisional Patent Application Ser. No. 62/589,228 filed on Nov. 21, 2017 entitled "Gestures Based User Interfaces, Apparatuses and Control Systems", U.S. Provisional Patent Application Ser. No. 62/626,253 filed on Feb. 5, 2018 entitled "Gestures Based User Interfaces, Apparatuses and Control Systems", and U.S. Provisional Patent Application Ser. No. 62/630,253 filed on Feb. 14, 2018 entitled "Gestures Based User Interfaces, Apparatuses and Control Systems", the disclosures of which are all also expressly incorporated herein by reference.

This disclosure is related to U.S. patent application Ser. No. 13/418,331 filed Mar. 12, 2012 entitled "Multipurpose Controller for Electronic Devices, Facial Expressions Management and Drowsiness Detection", U.S. patent application Ser. No. 14/054,789 filed Oct. 15, 2013 entitled "Multipurpose Controllers and Methods", and U.S. patent application Ser. No. 15/695,283 filed Sep. 5, 2017 entitled "Multipurpose controllers and methods", the disclosures of which are all hereby expressly incorporated by reference.

BACKGROUND

Efforts have been made for many years to provide diverse means of controlling/communicating with electronic devices. Some of the means of control involve use of controllers to control/communicate with electronic devices. Other means/methods seek to eliminate the need to hold and/or touch controllers to control electronic devices. They involve communicating intent by means of gestures performed using hands, arms, legs, face and other body parts. Voice commands can also be used to communicate with electronic devices. Communication via brain waves is also possible. Each of these methods have limitations, however, one of the common concerns can be communicating and/or confirming user intention behind actions performed by the user of the electronic device(s).

SUMMARY

This application includes disclosure of methods, systems, apparatuses as well as principles/algorithms that can be implemented on computer readable media, for defining user gestures, performing user gestures, interpreting user actions, communicating and confirming user intent when communicating with electronic devices. Disclosed user gestures include user actions that can involve eyes, head, facial expression, fingers, hands, arms, and other parts of body, as well verbal and mental actions. Many of the disclosed principles can enable hands-free and/or voice-free control of devices including those used in the fields of accessibility, Augmented/Mixed/Virtual Reality, gaming, desktop and mobile computing, and others. However, the disclosures are not limited to hands-free or voice-free principles of control over electronic devices. Multiple principles, concepts and user gestures are disclosed that allow for quick and large motions of OOI via eye gaze, as well as precise motions along user intended paths and accurate placement of OOI using other user actions including head motion and hand gestures are disclosed.

Principles in definition and use of steady eye gaze before and during performance of other user actions, as a confirmation of user intent of those user actions, are disclosed. Eye gaze steadiness can be measured using a combination of displacement of the point of interest on the display screen, displacement of the eye gaze vector, magnitude of velocity of the point of interest on the display screen and magnitude of velocity of the eye gaze vector.

Concept of warping an Object of Interest (OOI) is disclosed. The warping can be based on combination of head motion, facial expressions, hand gestures, and any other user actions.

Concept of Post Warp Period (PWP) is disclosed. Use of additional OOI Modification Driver (OMD) actions in PWP is disclosed. Conditional use of OMD based on factors such as change in eye gaze, presence/absence of active facial expressions, programmatic states, input mechanisms' state, and other user actions is disclosed.

Variations related to measurement of change in eye gaze are disclosed. Iteration based calculations for change in eye gaze is disclosed. Calculation of change in eye gaze based on a designated event, wherein designated event can include OOI warp, motion of OOI and other suitable actions, is disclosed.

Combination of multiple user actions in formation of OOI Warp start triggers is disclosed, including combination of head motion and eye gaze displacement.

OOI Warping without PWP phase is disclosed.

Concept of chained OOI warping wherein an end trigger of one warp serves as the start trigger of a subsequent warp, is disclosed.

OOI Warping based on Hand Gestures and OOI Modification Signals based on Hand Gestures is disclosed. Changing hand gestures during PWP is disclosed. Influence of changes in hand gesture on OOI Modification Signals during the Post Warp Period is disclosed.

Generation of Helper Signals (including Zoom signals) during Post Warp Period is disclosed.

DETAILED DESCRIPTION

Figure 1:
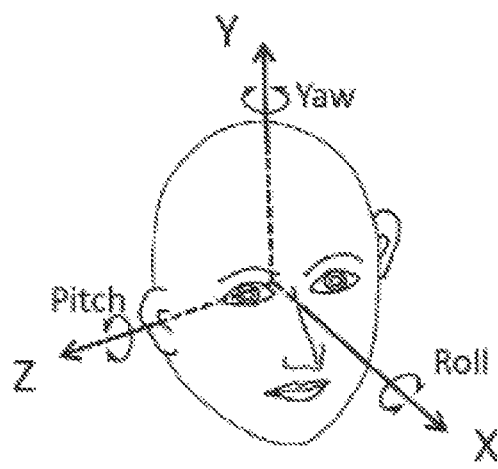
FIG. 1 illustrates a Head Coordinate System.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

While exemplary embodiments incorporating the principles of the present invention have been disclosed herein above, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

The term "electronic device" is used to designate any devices that can have a microprocessor and that can be communicated with. A microprocessor can include one or more processors, memory and programmable input/output peripherals. A controller can include one or more microprocessors and/or memory with instructions that can help control or communicate with electronic devices.

This document discloses user interface concepts, principles and techniques that can be translated into software algorithms to provide a rich functionality, convenience, flexibility and ease-of-use to users. Further, the disclosed concepts/principles/techniques can lead to easier implementation of the gesture recognition algorithms. Note that these concepts, techniques and principles can be used with controllers described in the above referenced US patent applications as well as any other devices or systems that can track a user's head/face/bodily motions, facial expressions, gestures and other actions to control or communicate with any electronic devices. Further, the concepts and principles described herein can be used to not only control an electronic device distinct from the controller, but also the controller and/or the controlling system itself. For simplicity, the rest of the document will use the term "controller" to include "controlling systems" as well. Further, it is also understood that controllers themselves can be electronic devices; therefore, any mention of "controlling/communicating with an electronic device" can also include controlling/communicating with the controller itself.

The principles disclosed can be used with hand held or body worn controllers, traditional computing devices such as desktop and laptop computers, smart TVs, mobile computing devices such as tablets and smart phones, Augmented/Virtual/Mixed Reality devices, industrial machinery, medical systems, home appliances, electrical lighting systems, as well as any electronic devices utilizing control systems where the user's body or body part can be used as input. Body parts used for user actions prescribed to perform user gestures can include, but are not limited to, head, facial muscles, part of the face, jaws, tongue, eyes, ears, throat, neck, fingers, hands, arms, torso, chest, abdomen, shoulders, legs, feet, toes, and any muscles or tissues a user can have control over.

A user gesture can be defined as a combination of actions performed (by the user) with the intent of communicating with or controlling an electronic device. These actions can be body actions that can include motions or actions of various body parts, facial expressions, actions to orient and hold various body parts in certain poses/positions/orientations, as well as other body actions. Holding the eye gaze steady or moving the eye balls to move the eye gaze can also be considered a bodily action. Some embodiments can also use actions performed by the user such as speech/speaking, holding breath/inhaling/exhaling, tensing of muscles/body parts (that may or may not be detected externally, such as jaw muscles, abdominal muscles, arm and leg muscles, anal sphincter, etc.), and so on as body actions. User actions such as entering meditative or attentive state, consciously relaxing the body with or without meditation, (mentally) imagining, visualizing, remembering or intending particular actions (e.g. pushing or pulling, lifting or sinking imaginary, virtual or real objects), experiences or scenarios (which can be detected by analyzing brainwaves or other biometric information), breathing, inhaling, exhaling, holding breath, etc. can also be used as user actions in defining user gestures. A user gesture can require certain user actions to be performed in a specified sequence, while requiring other user actions to be performed concurrently/simultaneously with each other. User gestures can be recognized and translated by the controller or control system into signals to communicate with and/or control an electronic device. Some user gestures can be recognized and translated into signals to control the controller/control system itself. Signals generated in response to some user gestures may be stored in the control system or controlled device for indefinite amount of time and that stored signal information can be retrieved when required. Body actions performed as part of a user gesture can serve various purposes in a specified user gesture. Following are some types of body actions based on the purpose they can fulfill in a user gesture.

a. Actions Enabling/Disabling Generation of Signals (AEGS)

b. Actions Influencing Attributes of Generated Signals being or to be generated (AIAGS)

c. Actions that Confirm User Intent (ACUI)

d. Actions that are Demarcators (i.e. help demarcate one part of user gesture from another, or even help demarcate one user gesture from another)

e. Actions with Multiple Purposes (AMP) (i.e. they can fulfill a combination of multiple purposes simultaneously)

Note: A particular body action can serve different purposes (and thereby can be viewed as having different types) when it is used in different user gestures. Further, a particular body action can occur multiple times within a user gesture and can be specified to have different purpose(s) (type/types) during different occurrences.

Note: Any particular heuristics (explained in this as well as the referenced applications) can be implemented in a controller/control system by means of multiple user gestures. For example, the selection heuristics can be implemented in one embodiment using a first user gesture that uses a smile facial expression as the Primary Control Expression (PCE) as well as another user gesture that uses an eyebrow raise facial expression as the PCE, and so on.

Note that PCE's can be considered as AEGS.

Body actions such as motion of one or more body parts and/or placing/posing/orienting one or more body parts in certain positions (including motions & poses/positions of the entire head, eyeballs, arms, hands, fingers, legs, torso, and other body parts) or other body actions that have not been already designated as a Primary Control Motion (PCM) or PCE can be designated to be used for purpose of modifying/influencing designated attributes of an Object Of Interest (OOI). Body actions that may not lead to motion or position change of a body part, such as applying pressure on touch or pressure sensitive surface, or tensing of muscles, can also be detected and measured. The level of applied pressure can be measured and used to modify an attribute of an OOI. Any body actions intended to modify attributes of an OOI can be referred to as OOI Modification Drivers (OMD). An electronic device can then be controlled via use of combination of PCMs and/or PCEs and/or OMDs. A user gesture then can be a specified combination of PCMs, PCEs and OMDs performed or held in succession and/or simultaneously with each other. Some embodiments can also use user actions such as speech/speaking, holding breath, inhaling, exhaling, tensing of muscles/body parts (that may or may not be visible to naked human eye), entering meditative or attentive state, mental imagination of specified activity, raising or lowering certain types of brain waves (alpha, beta, theta, delta, etc.) or combinations thereof, etc., which can be detected and measured, and therefore used in user gestures. Such user actions can also be treated as body actions and treated as such in user gestures. For examples, they can be designated as PCE/PCM or even OMD in user gestures. User gestures can be used to generate signals for communication with electronic devices, user gestures can also signify user intent and thereby used to decide if/when certain other user gestures can cause signals to be generated to communicate with the controlled device. Note that the term "positions" can include linear/translational positions as well as angular positions. Thereby the term positions can include angular orientations.

As explained in the referenced patent applications, facial expressions can be detected via a variety of sensors and techniques. For example, a distance reading from a proximity sensor measuring the distance of a facial muscle from the sensor, can be used as indicative of the magnitude of a facial expression. Therefore, such readings can have a wide range of integer or decimals values, beyond just a binary (on or off) value. Further, given that sensors (such as a distance sensors) can often provide non-zero readings even in the absence human discernible activity, a non-zero reading from a facial expression sensor may not be considered to be indicative of the presence of a facial expression. Furthermore, human beings can unintentionally have facial expressions on their faces, which they may not want to translate into commands to control a device. Therefore, we distinguish between a detection of a facial expression versus detection of an "active" facial expression. This distinction can be done based on a facial expression threshold beyond which a reading from a detected facial expression can be considered as an indication of an "active" facial expression. Given that setting of the threshold can be done based on user involvement (implicit or explicit), detection of an "active" facial expression can be considered to be a user intended action and therefore can be used in various heuristics/principles/user gestures disclosed.

Note: Magnitude (intensity) of a facial expression can also be determined based on ratios of facial features in relation to one another. For example, the distance between the two corners of the mouth in relation to the width of the user's face could be used as a measure of magnitude of the smile facial expression. It will be obvious that such a ratio can be a fractional number (decimal number) that can be normalized based on the face width (or some other suitable dimension of the face that does not change upon a smile) and converted to a number between 1-100 or some other convenient numerical range. For another example of technique for calculation of intensity of a facial expression, see the following reference.

"Toward Practical Smile Detection" by Jacob Whitehill, Gwen Littlewort, Ian Fasel, Marian Bartlett and Javier Movellan, published in IEEE Transactions On Pattern Analysis and Machine Intelligence on November 2009 (vol. 31 no. 11), pp. 2106-2111.

A facial expression (FE) can be considered to be active when the magnitude/level of a facial expression (indicated by a reading from an appropriate FE sensor) equals or crosses a specified FE magnitude/level threshold. A detected facial expression is not considered to be active by default. A facial expression (just as a physical quantity such as displacement, speed, etc.) can be detected by a sensor when it surpasses the minimum detection threshold of the sensor. However, it may not be convenient for the user if various heuristics defined in this as well as referenced documents used that minimum detection threshold of the sensor as the "active" threshold. Embodiments can set the active threshold to be much higher than the minimum detection threshold so that users have a wiggle room before triggering various actions based on the disclosed heuristics. Further, the "active" threshold can be a user settable quantity. The user can explicitly set a numerical value for the active threshold, or have the system calculate a suitable value based on a calibration process. A system can prompt the user to take certain steps such as smiling, making a facial muscle motion, opening/closing mouth, looking at interesting locations on a display screen, hold head steady, nod/move head, tense a body muscle at a comfortable level, focus attention, relax the body, breathe deeply, or any other suitable action based on what body part is of interest. Some embodiments can just monitor the user (via sensors) to gather statistical data on the user to figure out variation of sensors readings over usage of the system or the electronic device, and there by determine the active threshold level automatically. For example, an active threshold level could be based on the average or median sensor reading from a sensor obtained over a sampling period (which can be part of a calibration process or a silent observation process where the user may not be aware that the system is collecting sensor data for purposes of setting active thresholds and other parameters that can be used by the control system for user gesture detection). Some embodiments can define additional criteria to define when a measured quantity (such as a facial expression) can be considered to be "active" (and not just detected). For example, sensors such as capacitive touch and proximity sensors can be used to sense facial expression, where the sensors can provide a variable proximity reading and also provide a touch status reading. The amount of facial muscle motion (which can be used as an indication of level of facial expression) can be combined with the touch status of a facial muscle with a sensor to determine when a facial expression can be considered active. Some embodiments can take head pose into account before a FE sensor reading (beyond active FE Threshold) can be taken to indicate an active facial expression. For example, only if the user's head is turned in a certain direction (say towards the display screen on an electronic device, etc.) that a FE sensor reading beyond the specified FE Threshold can be interpreted as an "active" facial expression. Other criteria such as blink rate, pupil dilation of the user's eye (to be within specified range), steadiness of the user's head, presence/absence of other facial expression, EEG brain wave levels to be within specified range, as well as any other suitable criteria can be defined as requirement (along with the active FE threshold criteria) before a facial expression can be considered to be active.

Note: For purposes of simplicity, we will use "detected facial expression" phrase to indicate "detected and active facial expression" throughout this application (including drawings), unless a specific explicit reference is made to "detected but not-active" facial expression.

An OOI can be a variety of things (real and virtual) that can be affected by the controlled electronic device. For example, an OOI can be a graphical object on the display screen of the controlled electronic device, such as a mouse pointer or an icon. As another example, an OOI can be the sound that is being output from a smart phone (if the smart phone is the controlled electronic device), and the OOI can have one or more attributes of interest, such as the volume of that sound (the OOI). If the controlled electronic device is a wheelchair, the OOI can be the entire wheel chair and the attribute of interest can be the location (coordinates) of the wheel chair. If the electronic device is a computer, then the OOI can an application running on the computer and the attribute of interest could be the state of that application (the OOI). As can be seen, the OOI can be independent of the display screen of the controlled electronic device. Further, the command signals generated (by the control system) to change an attribute of interest on an OOI can take different forms based on what that attribute of interest is and what type of OOI it belongs to. For example, generated OOI modification signals could move a mouse pointer, or change sound output of a smart phone, move a wheel chair, or change the state of an electronic device or a component of the computing device or a program or an object on the program running on an electronic device (e.g. user logged-in or logged-out on a computer, mic on a smart phone enabled or disabled, program running on a AR/VR/AR headset in a paused mode versus active mode, etc.), a mouse selection signal to select something on a display screen of the electronic device or a switch signal to start/end row/column scanning on AAC (Augmentative and Alternative Communication) accessibility device or software application, etc.

OMDs can also include motions and positions of objects that are not part of the body but that can be directly or indirectly moved by the user. For example, motion of a pencil can be used as an OMD, provided that the user is directly or indirectly causing the motion of the pencil and the controller/control system is able to sense the motion of the pencil. Though OMDs can be used as AIAGS such as for modifying signals for motion of an OOI, some OMDs can be used as Demarcators, ACUIs as well as AMPs. For example, certain patterns of OMDs may be used as pre-requisites for recognition and processing of other user gestures.

The above referenced US patent applications define Head Coordinate System (HCS), which is reproduced here in FIG. 1, and will be used in this document to describe various motions that can be performed by the user. Note that other coordinate systems can also be used to track motion of head or other body parts, as well as the motion of the controller itself. This document elaborates on use of these motions, the expressions on the user's face and other body actions that could be used as a set of commands (User Interface) to control electronic devices. In some embodiments, a body worn or hand-held controller can be used to sense user's bodily motions and/or expressions. It is possible to have systems that employ cameras, ultrasound, magnetic fields, electrical fields, electromagnetic fields, radar, sonar, Electromyography (EMG), Electroencephalography (EEG), and other sensing techniques to sense bodily motions and/or expressions and/or body actions. The user interface principles and embodiments described in this document do not depend on what methods were used to sense the motions, positions, expressions or other user actions; they can be used regardless of the sensing methods and type of the controller or controlling system. For example, these principles/techniques can be used with head/body mounted hands-free controllers, handheld controllers, or even in systems where no one particular device in the system can be identified as the controller. Further, in the definition/heuristics of a user gesture, one body action can be substituted by another body action.

Following sections provide some definitions, concepts, techniques, as well as principles that can be used for creating or designing user interfaces for using or operating such controllers/controlling systems. Some embodiments of various user gestures and user gesture based User Interfaces are also described with the aid of symbolic representations. Some of these symbolic representations have been explained in the referenced patent applications. This document repeats some of the material already incorporated in referenced patent applications for the sake of convenience.

A methodology of symbolic representation of type, direction and other properties of motions and expressions (as performed by the user or experienced by the controller or detected by the control system) is described below. These symbolic representations can be used for describing user gestures. These user gestures can be detected and recognized by the controller/control system to generate signals to communicate with an electronic device and/or to perform certain functions.

Types of Motion—

Roll—This is rotational motion about the X-axis of a coordinate system, such as the HCS. It will be represented symbolically by the letter "R". For example, when the user rolls his/her head so that his/her left ear gets closer to the left shoulder, then that will be called the "Left Roll" and represented symbolically as "<R" or "R<". Then, "Right Roll" is the opposite of the "Left Roll" and will be symbolically represented as "R>" or ">R". The symbols "<" and ">" are called the direction specifiers and are used to denote left/up and right/down motion respectively (from the viewpoint of the user).

Yaw—This is rotational motion about the Y-axis of a coordinate system, such as the HCS. It will be represented symbolically by the letter "Y". For example, when the user rotates his/her head/body/part of body to his/her left, then that will be called the "Left Yaw" and represented symbolically as "<Y" or "Y<". Then, "Right Yaw" is the opposite of the "Left Yaw" and will be symbolically represented as "Y>" or ">Y".

Pitch—This is rotational motion about the Z-axis of a coordinate system, such as HCS. It will be represented symbolically by the letter "P". For example, when the user pitches his/her head/body/part of body upwards, then that will be called the "Up Pitch" and represented symbolically as "<P" or "P<". Then, "Down Pitch" is the opposite of the "Up Pitch" and will be symbolically represented as "P>" or ">P".

X Translation—This is translational motion along the X-axis, represented by "Tx". The front and back translation motions (i.e. along +X axis and −X axis) can be then represented by "Tx>" or ">Tx" and "<Tx" or "Tx<" respectively.

Y Translation—This is translational motion along the Y-axis, represented by "Ty". The up and down translation motions (i.e. along +Y axis and −Y axis) can be then represented by ">Ty" or "Ty>" and "<Ty" or "Ty<" respectively.

Z Translation—This is translational motion along the Z-axis, represented by "Tz". The translation motions along +Z axis and −Z axis can be then represented by ">Tz" or "Tz>" and "<Tz" or "Tz<" respectively.

In some embodiments, translational or rotational motions at any particular moment in time can be measured in terms of translational or rotational/angular velocity/speed. However, other embodiments can also use other measures of motion such as instantaneous position or positional change or acceleration, etc. Note that if no direction specifiers are specified, it is understood that the direction of the motion does not matter. Therefore, for example, "Y" can represent either "<Y" or "Y>" or both.

In some embodiments, instantaneous positions can be detected and monitored instead of motions. As an example, devices using the concept of a joystick can generate command signals based on the position of the joystick (in relation to a neutral position) at a particular instant in time to affect an OOI, rather than relying on the speed of the joystick at that particular instant in time. Therefore, all of the above mentioned motion symbols can be used to represent position instead of motion, or some combination thereof. The heuristics/principles disclosed can be used for embodiments that detect/monitor either motions or positions or both. However, for reasons of simplicity, the illustrative embodiments discussed herein will primarily use the term "motion" rather than "motion and/or position" or "a combination of motion and position". Further, "motion" can include translational as well as rotational motion or position.

For reasons of brevity, two consecutive but opposite motions along the same axis may be represented by using only one letter. For example, "<Y Y>" which stands for a Left Yaw followed by a Right Yaw, may also be represented as "<Y>". Similarly, ">R<" is the same as "R><R", which represents a Right Roll followed by a Left Roll. In addition, the same rule will apply to expressions (described later in the document.)

Periods of "No Motion"—User gestures can also have periods of time when there is limited or no motion. Note that a particular motion is termed as "limited" if its absolute magnitude is within a specified range or threshold during a time period. MOTION_NOISE_TH (Motion Noise Threshold, Parameter P #6, also referred to as MNT) as explained in the above-referenced US patent applications is an example of a motion threshold. Every type of motion (R/P/Y/etc.) can have its own MNT. Further, even for the same motion type, MNT values can be different for different user gestures. Time periods of motion where the (absolute) magnitudes of specified motion types are continuously within corresponding specified motion thresholds/ranges for at least specified time thresholds, can be called periods of "No Motion". Such time periods can be represented by the symbol "#" when there is only limited motion observed for at least a specified amount of time in a continuous fashion. Note: The symbol "." is used to represent a period of No Motion (instead of "#"), in some of the referenced applications.

Note that in embodiments that work based on position (versus velocity or acceleration), a period of "No Motion" can be defined as the time period where the detected/monitored position is within the specified MNT value for position. (The position being monitored can be translational position or angular position.) The readings from position sensors (just like readings from motion sensors) can be measured with respect to certain baseline(s), which may have been set or established during an initialization/calibration process (as per the referenced US patent applications). The MNT can also be measured from the baseline position that corresponds to the position of the body part being monitored.

Note that the terms "velocity" and "speed" are used interchangeably in this document, unless a specific reference to the direction of motion of the object whose motion is being measured. The term "motion" of an object can be considered to encompass speed or velocity of the object, as well as displacement or change in position of the object over time. Further, displacement of an object can be measured between a pair of consecutive iterations in the main loop of the control software or between some other convenient pair of events as dictated by the concept/principle/heuristic being disclosed.

Note that the terms "velocity", "speed" or "displacement" are also taken to encompass angular as well as translational motions unless specifically called out to be one versus another.

Some embodiments can use eye gaze as the OMD. That is, eye gaze of the user can be used to modify an OOI on an electronic device. For example, if a mouse pointer on the display screen of a device is the OOI, then it can be moved around on the screen based on where on the screen the user is looking (Point of Interest or POI). The determination of where the user is looking can be done based on eye tracking sensors (aka eye gaze sensors) that can monitor the location and orientation of the user's head (in relation to the eye tracking sensor and/or the display screen) and the orientation of user's eye ball(s). Readings from eye gaze sensor can include all the above quantities as well as the eye gaze vector (the vector between center of an eye or midpoint between two eyes to the calculated POI) as well as the coordinates of the POI (in display screen or some other convenient coordinate system). Based on the readings of the eye gaze, the change in eye gaze (either based on change in POI or the eye gaze vector or some other suitable quantity) can be computed.

As seen above, eye gaze can be defined as a combination of Head Pose (based on angular position of the user's head) and eye ball angular position (based on angular position of eye ball/eye balls of the user with respect to the user's head). Therefore, even if the head angular position and eye ball angular position (when measured individually) are changing more than a specified threshold/range, the combined effect on the eye gaze as a whole may still be within the specified range/threshold, and therefore the user can be said to be in a period of "No Motion". Further note that eye gaze can also be defined in terms of a specific point or location the user may be looking at any particular instance of time. (The specified point/location can be in the plane of the display screen of the electronic device being controlled, or a 3D point in real or virtual space.) In this case, the change in location or the point (the user is looking at) can be monitored against a specified threshold of position change, to determine if a period of No Motion is being encountered with user's eye gaze.

Note that some embodiments can use a more generalized concept called the Periods of Limited Activity (POLA) instead of period of "No Motion". A POLA is a period of time within a user gesture when a particular motion, position or user action (that is being monitored) is within a specified range. This range may or may not be the same as +/−MNT. The specified ranges for a POLA may not be even symmetrically defined. For example, a POLA may be defined as the time period when user's head is rotating between 30 degrees/sec to 40 degrees/sec in Yaw whereas a period of No Motion may be defined as when the user's head is rotating at less than +/−5 degrees/second. Therefore, it can be seen that periods of No Motion can be POLAs but not all POLAs are periods of No Motion.

Note that sensors may not be always be able provide readings based on user or environmental conditions. For example, an eye gaze sensor may not be able to provide readings if the user has closed their eyes, or there is a bright light next to the user, or the view of the user's eye is occluded, etc. If the sensor is not able to detect the eyes of the user then it cannot compute the eye gaze vector or POI. In such a situation, the eye gaze vector/POI calculation can be considered indeterminate but not zero in value. Some embodiments can treat this situation as if there was no change in the eye gaze or POI value and continue monitoring till the time a valid reading is available from the sensor.

Figure 2:
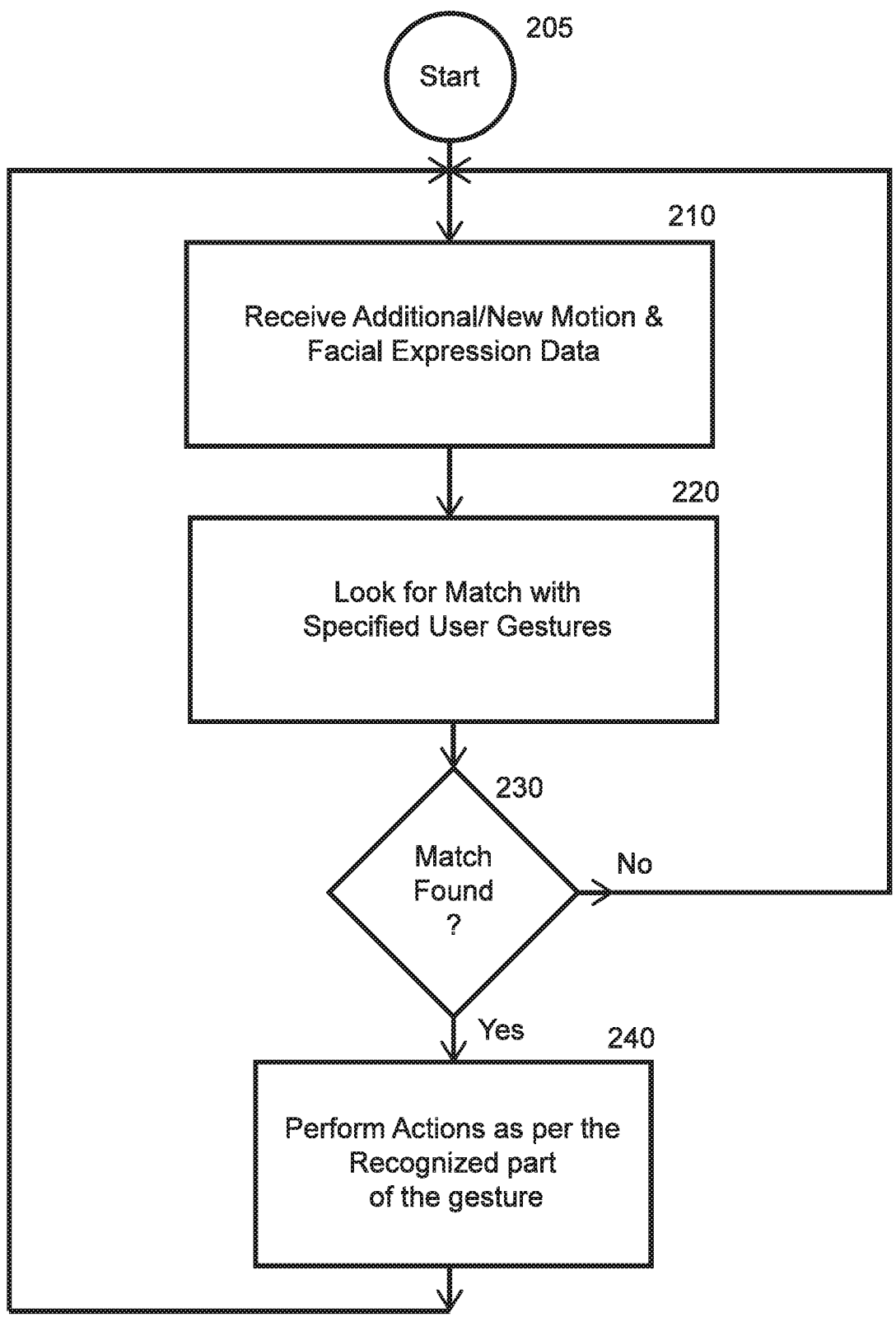
FIG. 2 illustrates an exemplary User Gesture Recognition Process Flowchart in one Embodiment.

Using the above defined convention, user gestures can be represented by strings of symbolic representation of various motions. For example, the symbolic representation "Y>P>" can represent a user gesture where the user performs a "Y>" motion (that is, a Right Yaw motion) followed by a "P>" motion (that is, a Down Pitch motion), in that order. Note that other motions that are not present in the symbolic representation of the user gesture can be ignored by the Control Software if it is looking for this particular user gesture. (See above referenced US patent applications for description of "Control Software".) Amongst other things, control software can also provide the algorithms for processing various sensor inputs, mapping various inputs to specified user gestures and generating various control signals/events/commands corresponding to the detected user gestures. Given this, the behavior of the controller/controller system can be influenced by the control software. See FIG. 2 for an overview of the process that the Control Software uses in one embodiment to detect if the user is performing one of the specified user gestures. Note that the user gesture body action pattern information can be stored in a file (or a database or an equivalent object) or can be embedded in the logic of the control software itself. (The illustrative flowchart in FIG. 2 assumes the logic of the control software has the predefined user gesture body action pattern information embedded in it.) The flow starts at step 205. At this point, the control software can start with a clean slate, meaning there is no information on motion or position of any body parts of the user, any facial expressions or any other actions performed by the user. At step 210, the control software receives body motion/position, facial expression or any other user actions related information sensed by various sensors at this point in time (or over a specified interval of time up to this point in time). This information can be stored in an information stack or list. At step 220, the system tries to match the received information so far (that is possibly stored in the information stack or list) with any of the predefined user gestures' patterns (or parts thereof) that may be valid to be found as per the rules of the user interface. At step 230, the control software checks if a match is found (between received information so far and a (part of) predefined user gesture motion pattern). If no match was found, the control flow takes the "No" branch from step 230 and returns back to the top of the flow (step 210) and continues the process from step 210. If however a match was found at step 230, the control flow takes the "Yes" branch to Step 240 to start performing actions as per the matched (recognized) user gesture (or part thereof). These actions can include generating signals meant for communication with or for controlling the electronic device and/or any other appropriate action. If there are multiple matches found at step 230, the control software can take the most appropriate match. In some embodiments "most appropriate" match can be defined as the most elaborate user gesture (that is the user gesture with the most complex representation) that is valid (as per the rules of the user interface) at that moment in time. Other embodiments can choose the least elaborate user gesture (that is the user gesture with the simplest representation) that is valid at that moment in time. If at Step 240, it is determined that the matched user gesture is complete, the system can initialize the information stack or list, and can start looking for a new user gesture. Note that this embodiment shows Control Software that processes information in iterations, wherein the iteration starts at the top (at Step 210) and finishes at Step 230 or 240, after which the next iteration is started at Step 210. While this embodiment shows no wait time between the end of one iteration and the start of the next iteration, other embodiments can have the processor wait for a suitable amount of time so that there is an approximately constant time interval between start of any two consecutive iterations.

Figure 3A:
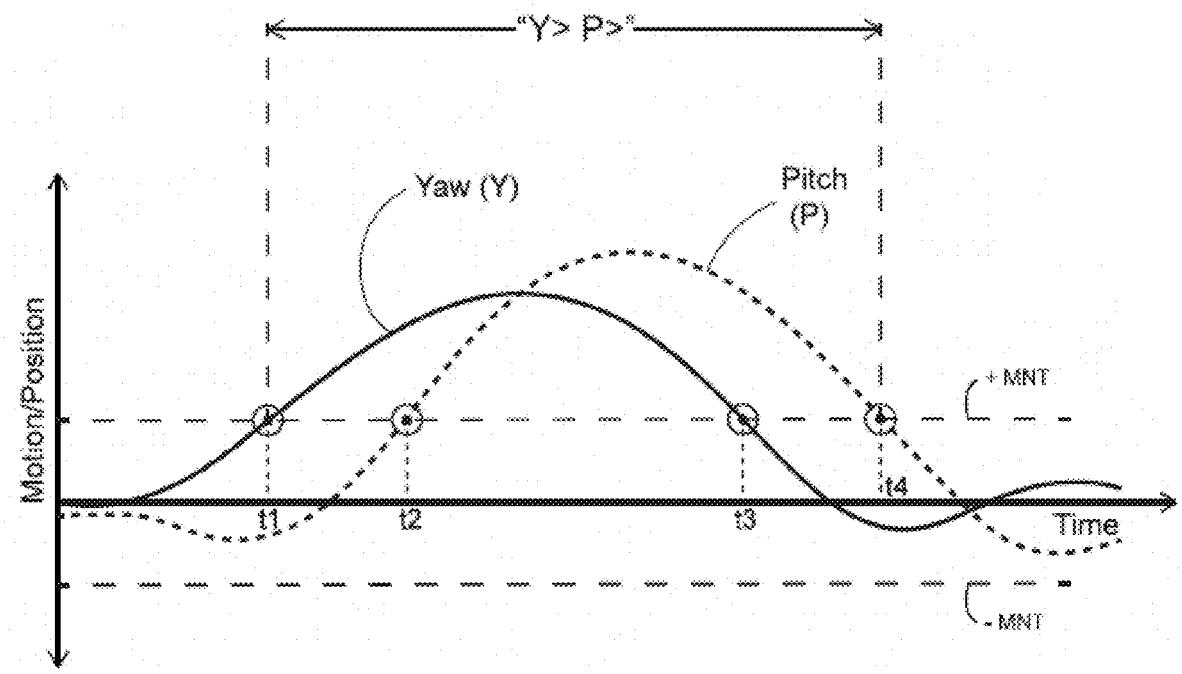
FIG. 3A illustrates an exemplary Body Actions Represented by Symbols including "Y>", and "P>"
Figure 3B:
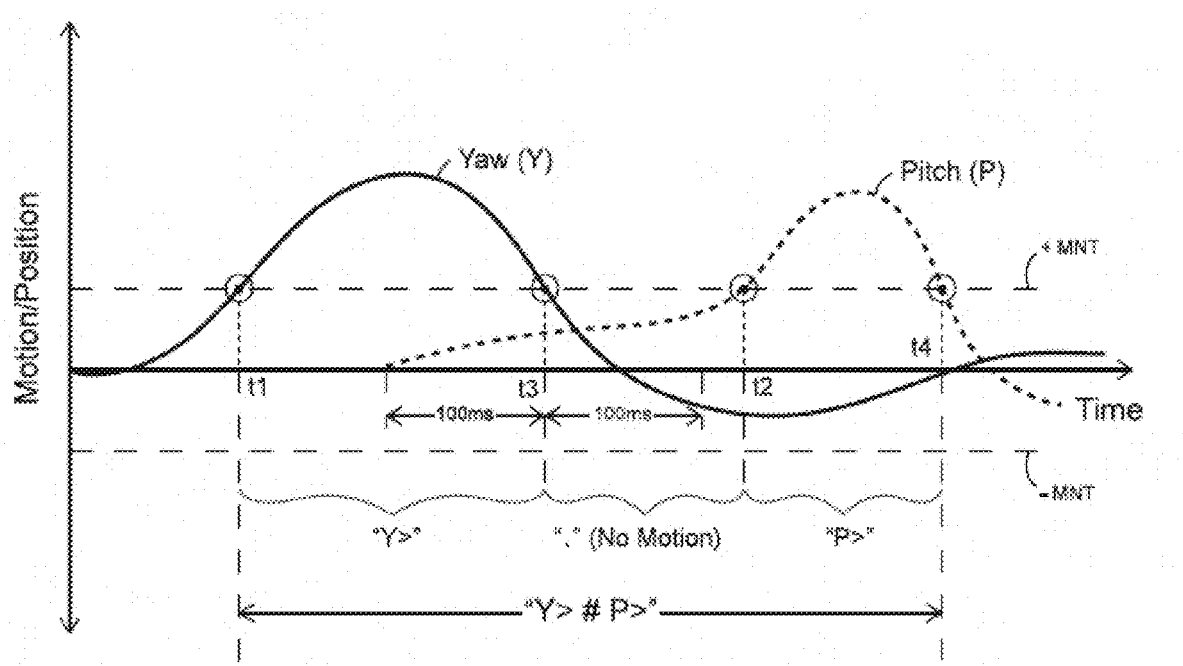
FIG. 3B illustrates an exemplary Body Actions Represented by Symbols including "Y>", and "P>" and "#"

See FIGS. 3A and 3B for further explanation and description of symbolic representation of motions (that are performed as part of a user gesture). The X-axis represents time and Y-axis represents Motion or Position. For example, the Y-axis could represent translational velocity or angular velocity or angular position or translational position as detected by the sensors. In FIGS. 3A and 3B, all motions are shown to use the same MNT value (for purposes of simplicity of explanation). FIG. 3A shows an example of motion/position of a part of the user's body as experienced/detected by the sensors that can map to the "Y>P>" representation. The representation "Y>P>" represents a user gesture where first a Right Yaw motion is performed, followed by a Down Pitch motion. Note that while some embodiments can require Pitch motion to start immediately after the end of the Yaw motion, this embodiment allows the Pitch motion to start even before the Yaw motion has ended. (Recall that a motion can be said to be started when its absolute magnitude is more than the MNT value for that type of motion for that user gesture, and motion can be considered to be ended when its absolute magnitude is less than the MNT.) The Y curve is shown to surpass the threshold value at time t1 and therefore can be considered to be started at that time. The Y value falls back to be within the threshold at time t3 and therefore can be considered to be ended at time t3. The P curve on the other hand can be considered to be started at time t2 and end at time t4. During time period t1-t4, it can be observed that Y motion is first initiated at time t1 and then before it is completed, P motion is started and later ended by time t4. In this embodiment, despite the overlap between P and Y motion (during period t2-t3), the control software can consider this motion pattern to be a match with the symbolic representation "Y>P>".

FIG. 3B shows observed motion pattern for the user gesture represented by the representation "Y># P>". This representation translates to a motion pattern where Y motion is started and completed, followed by a period of No Motion, which then is followed by a P motion. This user gesture thereby ensures that the user cleanly completes the Y motion before initiating the P motion. Note that the length of "#"

period can be specified on a per user gesture basis and can be set to be as low as zero, as per the preference of the designer of the control system or the user interface of the control system. Note that the length of the time threshold for "#" period is set to be 100 ms in this example, whereas the time gap between end of Y and start of P (t3:t2) is more than 100 ms. Therefore, this embodiment can recognize the motion pattern shown in FIG. 3B as a match to the symbolic representation "Y># P>".

Indefinite periods of "motion"—Motion symbols enclosed in "{ }" represent a combination of (possibly overlapping) motions listed within the braces, for an indefinite amount of time, where at least one of the motions listed within the "{ }" is present at any given time during the period. Periods of No Motion ("#") can also be included in such combinations. As an illustrative example, the symbolic pattern "{YP}" stands for a combination of motions where Yaw and Pitch motions can happen simultaneously or individually and possibly in a random order, for an indefinite amount of time. Note that for a user gesture to map to this pattern, at least one of the motions Yaw or Pitch should be present at all times during that period and it is not required that both must be present to map to this pattern. To represent a motion pattern where a particular motion type is guaranteed to be present in the combination, that motion type is highlighted in the representation by an underscore. Therefore, the pattern {YPR} represents a combination of motions where Yaw and Pitch are potentially present, but Roll motion is required to be present for at least some finite amount of time during the {YPR} period. Similarly, {YPR} represents a combination where Pitch motion is potentially present, but Yaw and Roll are required to be present for at least some time for that motion sequence to match the symbolic pattern representation. As another illustration, the pattern {YP #} represents a combination of motions where Yaw, Pitch and "No Motion" occurring for an indefinite amount of time. Therefore, the symbolic representations "Y># P>", "Y # P", "Y # Y # P", "Y", "# Y #", "P # P", etc. can all simply be represented by "{YP #}" instead.

Note: User gestures that include indefinite periods that include "#" can have some other motion or expression specified (within the user gesture) following the indefinite period so that the control software can determine the termination point of the indefinite period. This will be evident from the examples of user gestures containing "{ }", given later in this document.

Note: As per above discussion, "{#}" represents an indefinite period of No Motion, which is also the same as back-to-back occurrences of individual "#" periods repeated indefinitely. On the other hand, "{Y}" represents an indefinite period of Yaw motion, which can also be simply be represented as "Y".

Various facial/body expressions can also be symbolically represented. For example, expression of Smile can be represented as "S", Eyebrow Raise as "E", Wink as "W", Raising a Hand as "H", Closing of hand into a first as "F", Manipulating opening of mouth as "M", and so on. Further, if the expression can be asymmetric, then a "1" or "r" could be attached as a prefix to the expression symbol to differentiate left versus right. Therefore, "1E" would represent Left Eyebrow raise and "rW" would represent right eye Wink. Further, "<" and ">" may also be used with facial expressions, where "<" would represent the initiation of an expression and ">" would represent the termination of an expression. Therefore, "<S" can represent initiation of a Smile and "S>" can represent termination of a Smile. Similarly, "<M" can represent opening the mouth and "M>" can represent closing the mouth. When an expression is initiated in a user gesture, it is assumed to be held until it is explicitly shown as terminated at a later point in the user gesture.

Figure 4:
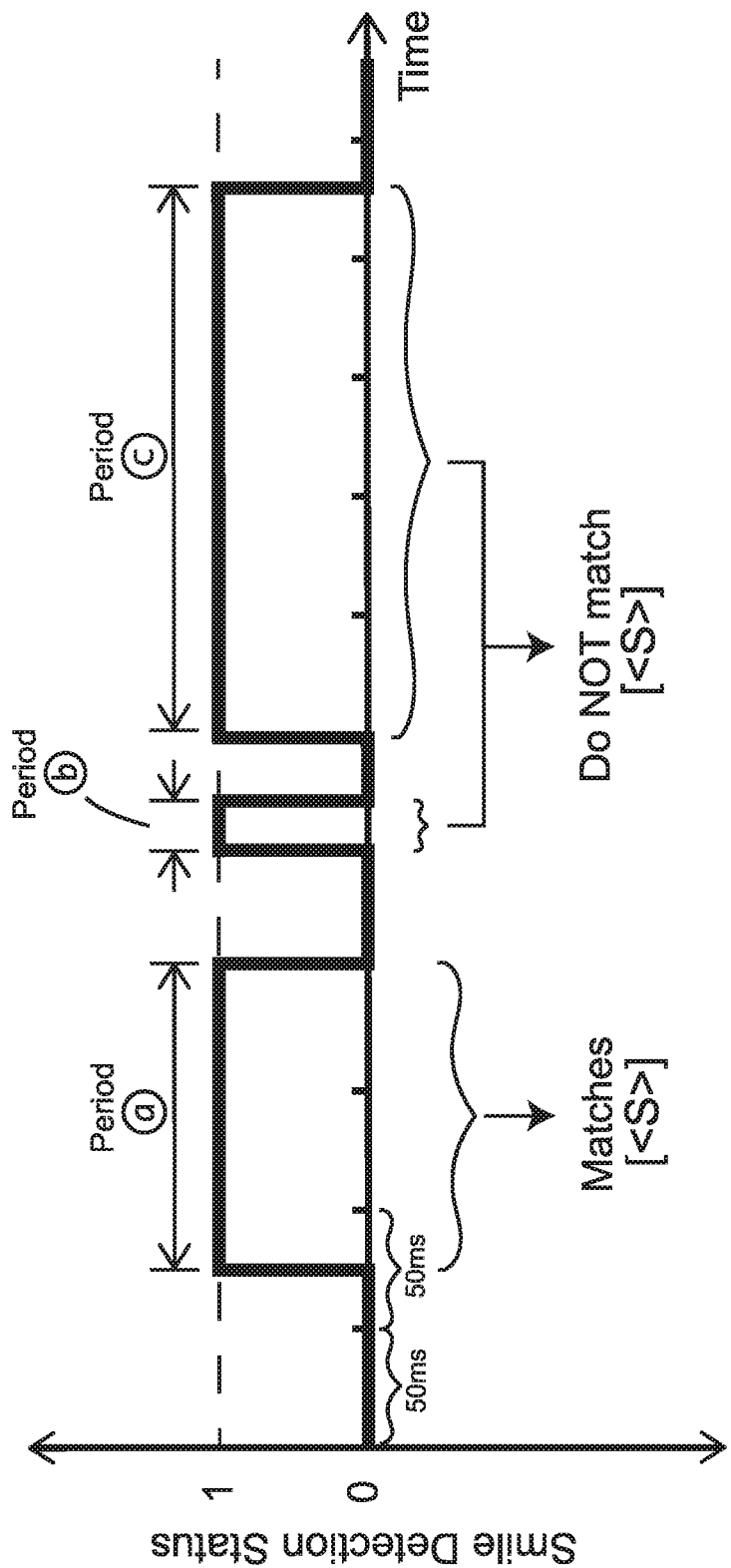
FIG. 4 illustrates exemplary Time Bound Body Actions Represented by Symbols Including "[<S>]"

Time Bounds—A motion or expression that is started, maintained and finished so that the total time duration (i.e. from start to finish) of that motion/expression is within a specified lower and upper bound of time, is symbolically represented by enclosing it within "[" and "]". For example, "[<R]" represents a Left Roll motion started, maintained and ended so that the total time duration of the Left Roll motion falls within a specified range of time duration. (Note that a motion can be said to be started when its absolute magnitude exceeds a specified Motion Noise Threshold (MNT); and a motion can be considered to be ended when its absolute magnitude falls below the same or another specified MNT. The act of holding a body part in a specified position can also be bounded in a similar fashion.) Similarly "[<S S>]" (also represented as "[<S>]" for short), indicates a Smile expression that was started, maintained/held and completed so that the total duration (from start to end) was within a specified range of time. See FIG. 4 for an illustration that shows variation of smile detection status over time. If the time bounds for a representation "[<S>]" were 75 ms-200 ms for a particular user gesture, then period (a) wherein smile is detected continuously for 150 ms matches the representation "[<S>]". However, periods (b) or (c) do not since they are either too short or too long to be within the bounds specified for this representation.

Magnitude Bounds—A motion, position, expression (or any body action) that is performed so that the absolute maximum speed or magnitude or value attained during that body action (motion, position, expression, etc.) is within a specified lower and upper bound of magnitude, then that body action can be symbolically represented by specifying a numeral (or a numerical superscript) following the letter(s) that represent the body action. (As a convention, we can start the numerals from the number 2.) Therefore, for example, if the user performs a Left Roll motion so that the maximum absolute speed attained during the motion is within a certain specified set of bounds, then it can be represented as "<R2". Similarly, for example, "<R3" can indicate a magnitude bounded Roll motion, albeit one with upper or lower speed bound that is different or greater than that of a Left Roll motion indicated by "<R2". Similarly, "<R4" can represents a motion that can be of higher magnitude than "<R3" and so on. Note that the concept of magnitude can be applied to other body actions certain expressions such as Smile, where a user could be said to be smiling mildly versus strongly, or even a Wink and other expressions where the speed and/or level of expression can be measured. Note that some embodiments can have the specified lower magnitude bound be the same as the Motion Noise Threshold (MNT).

Time and Magnitude Bounded (TMB) Body Actions (including Motions, Positions, Expressions, and Other Actions)—A body action is called a TMB action if it is completed (from start to finish) within a specified range of time duration, and it reaches the maximum speed (or magnitude of speed or measured value) that is within the specified bounds for that TMB action, as specified for a particular user gesture. Therefore, for example, "[<R2]" can represent a TMB Left Roll that achieves a maximum speed that falls within a specified range as well as the complete motion (start to finish) is completed so that the total duration falls within the specified time bound. This concept of "TMB-ness" of action is usable with Motion, Positions, Expressions as well as other measurable body actions. For the purpose of simplicity, we will not include magnitude bounds of an expression for the illustrative embodiments described in this document (unless explicitly stated to be included), although many embodiments can easily incorporate the magnitude criterion in the criteria for "TMB-ness" of an expression. Therefore, for example, while we will use "[<S>]" (which only has a time bound) to represent a TMB Smile, other embodiments can use "[<S2>]" (which has time as well as magnitude bound) instead. Specification of time bounds on completion of expressions allows distinction of those expressions from regular expressions, thereby allowing differing interpretation. Again, the specific values of the time bounds (for any body actions) can be different based on user preferences, which user gesture the body action is being used in, the location of occurrence in the user gesture where it is used and any other criteria. The use of bounds on magnitude and/or total time duration of a motion/position/body action pattern can not only allow definition of a richer set of user gestures, but can also help in distinguishing intentional/purposeful motions of the user from unintentional/purposeless actions. When the user is educated in these concepts, they are able to perform them in a fashion that the number of false negatives as well as false positives encountered by the control system are greatly reduced. This ultimately can enhance the utility and usability of the controller/control system.

Note: Some of the referenced documents refer to TMB actions as "Quick" actions, though the term "Quick" is meant to represent both time and magnitude bounds on the action, and not meant to impose any limitations to what the values of the time bound should be.

Figure 5:
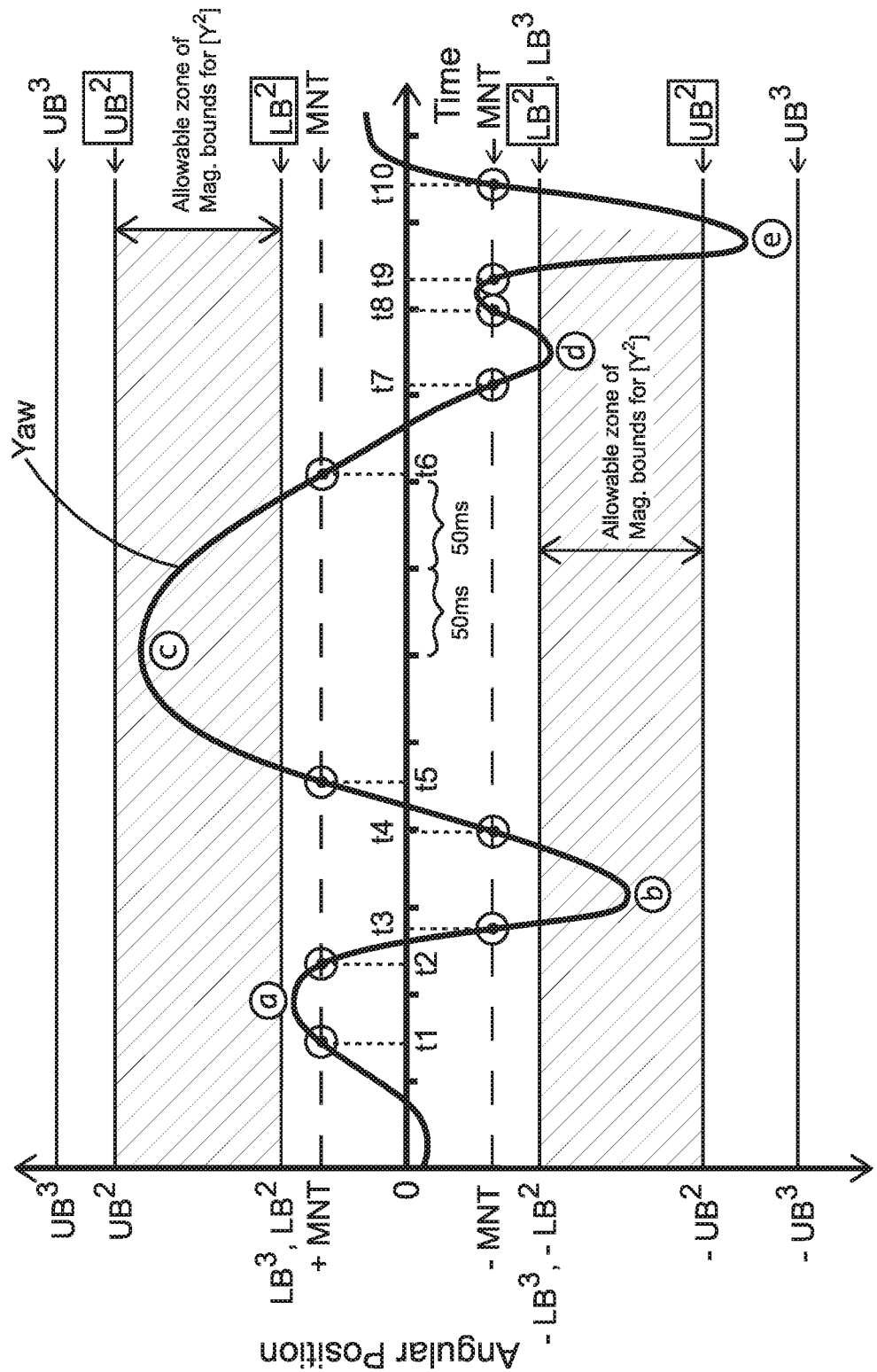
FIG. 5 illustrates exemplary Time And Magnitude Bound (TMB) Body Actions.

FIG. 5 depicts an illustrative example of variation of monitored Yaw Angular Position "Y" (measured with respect to a baseline reading) plotted against time axis. The dashed +/−MNT lines indicate the Motion Noise Threshold for Y angular position. The +/−LB2 lines indicate lower magnitude bounds, and the +/−UB2 lines indicate the upper bounds of an illustrative "[Y2]" representation (that represents a TMB Y angular position pattern). The regions +LB2 to +UB2 and −LB2 to −UB2 represent allowable zones within which the peak magnitude of a particular position pattern needs to fall to be recognized as a potentially matching position pattern with the above representation. Let us assume that for this example, the time bounds are 50 ms-150 ms. (That is, the duration of the Y should be at least 50 ms and be no more than 150 ms to satisfy the time bound requirements.) Then the position pattern (a) that starts at time t1 and ends at time t2 falls within the time bounds of the "[Y2]" representation, but fails to fall within the magnitude bounds (since the max absolute magnitude between time t1:t2 is less than LB2). Pattern (b), on the other hand, starts at time t3 and lasts till time t4, has duration >=50 ms but <=150 ms and has the peak magnitude that falls in the allowable zone. Therefore, pattern (b) can be recognized as a match with the "[Y2]" representation. Pattern (c) from t5:t6 satisfies the magnitude bound but fails to satisfy the time bound since it lasts for longer than 150 ms. Pattern (d) satisfies the magnitude bound as well but fails to satisfy the time bound by being too short in duration. Pattern (e) satisfies the time bound but has peak magnitude that does not lie within the magnitude bounds and therefore does not match the "[Y2]" representation either. However, Pattern (e) does match with "[Y3]" representation assuming that representation has the same time bounds as the "[Y2]" representation and LB3 is same as LB2 in value and UB3 is greater than UB2 (as shown in FIG. 5).

Note: In FIG. 5, pattern (b) also qualifies to be a match with "[Y3]" representation as the absolute peak value of (b) is within the magnitude bounds LB2:UB2 as well as LB3:UB3. Some embodiments can remove overlap between two magnitude bounds. In this example, overlap between "[Y2]" and "[Y3]" can be removed by setting lower bound LB3 to be equal to or greater than upper magnitude UB2.

Note: While the illustration in FIG. 5 uses Yaw Angular Position, the same principle can be used with any other body positions or motions, including rotational and translational positions of any body part. Furthermore, the same illustration can be used to demonstrate the TMB concept with other body actions by substituting "Angular Position" by other measures of body action such as level of a facial expression, amount of pressure applied to an input mechanism, level of brain waves, meditative or attentive levels (as measure by measuring brain waves), level of stress/tension or electrical activity detected in a particular set of muscles, or any other suitable measure.

Figure 6:
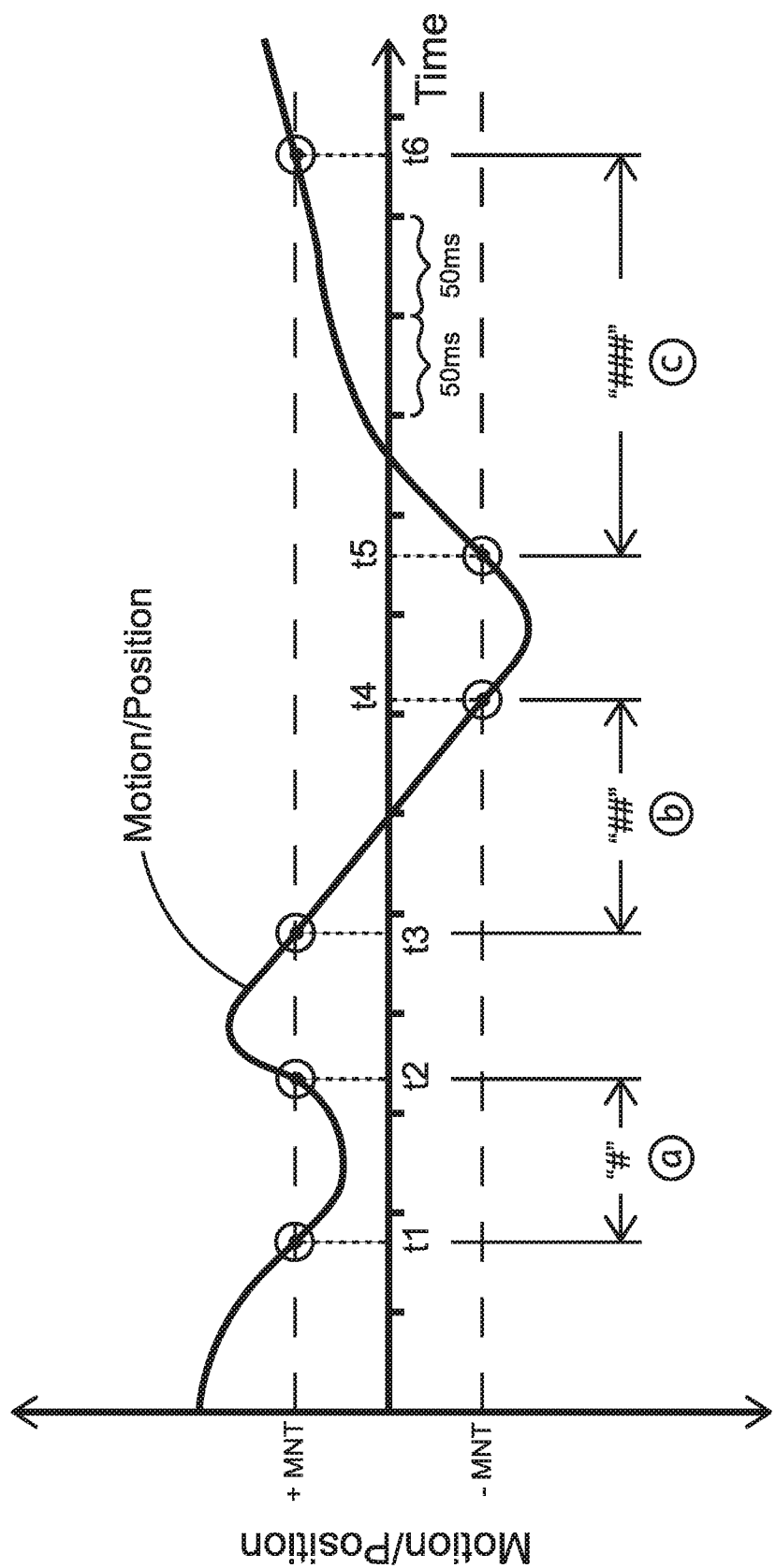
FIG. 6 illustrates exemplary Periods of No Motion.

As mentioned before, the symbol "#" represents a time period of No Motion for at least a first threshold amount of time within a specific user gesture. Further, the symbolic representation "##" indicates a period of No Motion where no significant motion is detected for at least a second threshold amount of time, wherein this second threshold can be larger than the first threshold amount. Similarly, time periods with No Motion for even higher amounts of time can be represented by "###", "####" and so on. Note that every user gesture may define its own values for these time thresholds; that means the time duration for "#" in one user gesture may not be the same as "#" in another user gesture and so on. See FIG. 6 for an illustrative example of various periods of No Motion, where "#" represents a period of No Motion with a (minimum) threshold time duration requirement of 45 ms, "##" with a threshold of 100 ms and "###" with a threshold of 125 ms. The Y-axis can represent either motion or position readings (measured relative to a baseline) and the X-axis represents time. Period (a) going between t1:t2 shows insignificant motion/position readings (i.e. below the MNT), and since t1:t2 is longer than 45 ms but less than 100 ms and 125 ms, it can map to only "#" period of No Motion. Similarly, period (b) (going from t3 to t4) can map to "##" and period (c) (going from t5 to t6) can map to "###". Some embodiments can match period (b) to "##" as well as "#", and period (c) to "###" as well as "##" and "#". Further, some embodiments may make the above mapping decisions based on user gesture by user gesture basis, user/system preferences, controlled device type or any other criteria.

Note: The value of MNTs can vary between various user gestures. Further, even within the same user gesture, MNTs can have different values for motions along different axes. Further, these MNTs can be different for motions of different parts of the body. Therefore, for example, the MNT for motion of a user's hand along the X-axis may be different from MNT for motion of the user's hand along the Y-axis even within the same user gesture. Similarly, the MNT for motion of hand along an axis may be different from MNT for motion of head along the same axis, even within the same user gesture.

Figure 7:
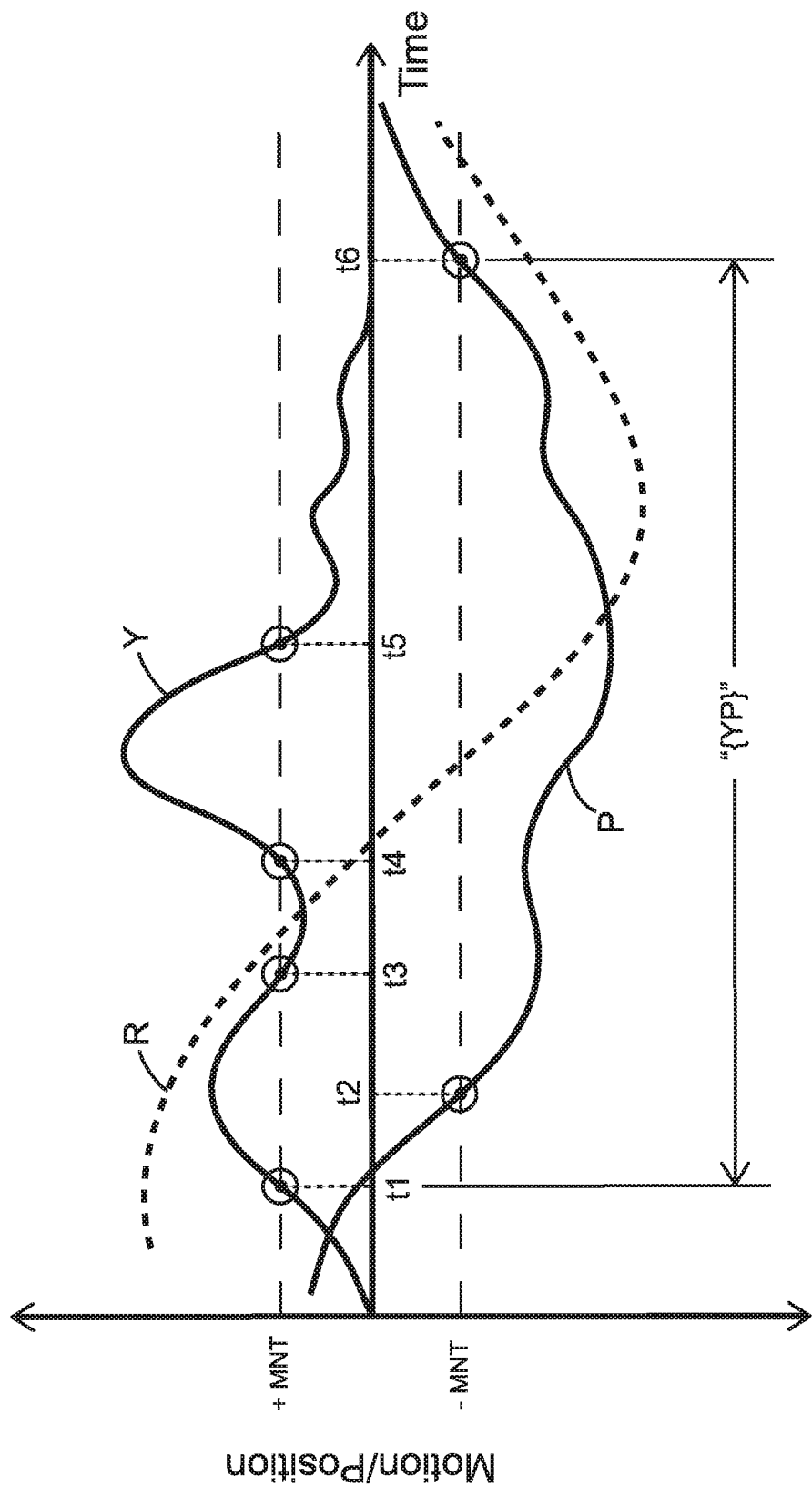
FIG. 7 illustrates an exemplary Body Action Pattern Matching "{YP}"

Some embodiments of the control software/control system can generally look for presence of constituents of motions and/or expressions that define a user gesture, and can ignore anything that is not explicitly present in the symbolic representation of that user gesture. Therefore, for example, if a control system is only looking for a user gesture represented by the representation "{YP}", then even when a combination of Y, P and R motions is detected (where Y and/or P are continuously detected but R is detected at least for some time during the period of Y/P), the system can still tag that time period as matching "{YP}" pattern; the system can thereby effectively ignore the R motion as superfluous or irrelevant for the purposes of detecting user gesture {YP}. (Needless to say that if the system was also looking for {YPR} user gesture at the same time then the above experienced motion/position pattern would be mapped to the {YPR} user gesture.) See FIG. 7 for an illustration of this behavior. The Y pattern (Yaw) is detected only in the time periods of t1:t3 and t4:t5. The P pattern (Pitch) has significant values only during time period t2:t6. However, together, Y and/or P are beyond the MNT thresholds (i.e. detected to be active) continuously from t1:t6, and hence that becomes the time period when the Y and P patterns considered together match the motion representation "{YP}". Note that R is present for a significant portion of the time duration of the "{YP}" motion, but is effectively ignored in this embodiment for the purposes of monitoring for motion/position patterns that can match with the representation "{YP}". In a variation, some embodiments can require that no other superfluous motions or positions be present other than those explicitly stated in the representation of the user gestures. For example, in such embodiments, if the system is looking for a {YP}, then any presence of R during the Y or P motion can disqualify those segments of time when R is also active. The required absence of a particular motion/position/expression/action can be represented by a superscript of 0. Therefore a {YPR$^0$} represents a duration of time when at least a Y or P is detected, but no R.

The types of motions/expressions that are monitored for matching the "#" pattern of motion within a user gesture can be based on what kind of motion types are specified in the complete representation of the user gesture. For example, if a user gesture is (completely) represented by the pattern "<S # {YP} S>", then the No Motion time period (that is one represented by "#") within that user gesture represents a period wherein there is no active Y or P motion detected for at least a specified time threshold. Then, even if some amount of R motion is detected during the period of No Motion, since R motion is not part of this user gesture, it can be ignored by the system when matching this period of time to the "#" part of this user gesture.

Fixed Length Blackout Period—The symbol "*" indicates a time period of a specified fixed duration during which any motions/positions/expressions are ignored for purposes of gesture recognition. The duration of this time period can be set to a different amount based on the user gesture this time period occurs in and the location where it occurs within the definition of user gesture. This time period is called the Fixed Length Blackout Period (FLBP). FLBPs can provide convenience to user in performing the user gestures, and they can be optional based on skill level of the user. Their lengths (durations) can be changed based on user preference or even be set to zero.

Variable Length Waiting Period—The symbol "~" indicates an indefinite period of time where all motions/positions and/or expressions are ignored by the system with the exception of the one specified to terminate this period. This period could be interpreted as a waiting period where the system is looking for a specific motion/position/expression to be detected and can ignore everything else until that motion/position/expression is performed. This "~" will be called Variable Length Waiting Period (VLWP). The motion/position/expression that a VLWP waits to detect is specified right after the VLWP in the representation/definition of the user gesture. For example, the representation "~R" indicates a time period of indefinite duration where all motions/expressions are ignored until up to a point in time when a "R" motion (Roll) is encountered. In this example, "R" is the "terminating" action for the VLWP.

Figure 8A:
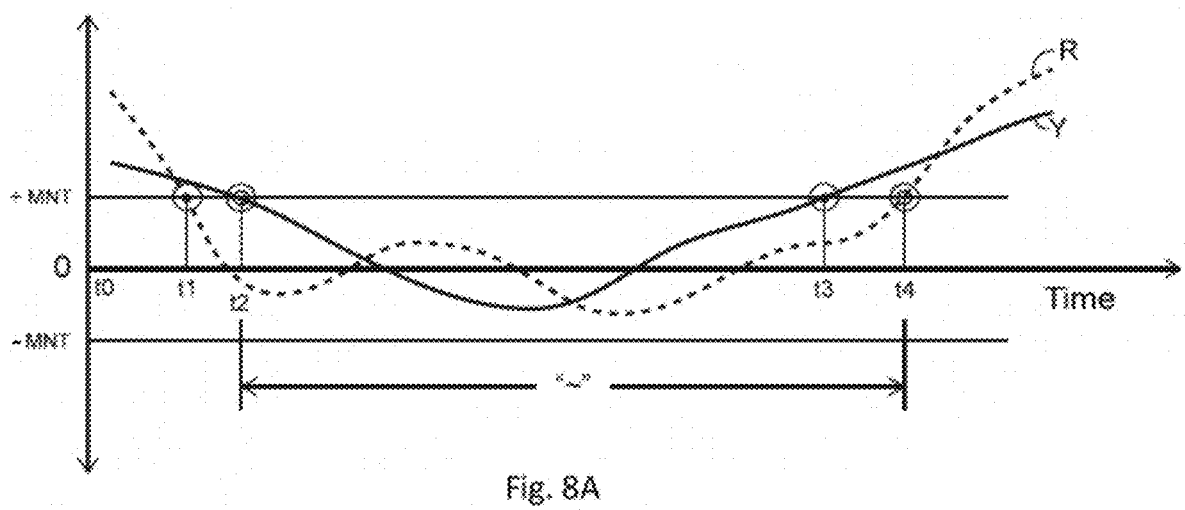
FIG. 8A illustrates exemplary Body Action Patterns Matching VLWP "~R" (Variable Length Waiting Period without a time bound terminated by detection of a Roll action)
Figure 8B:
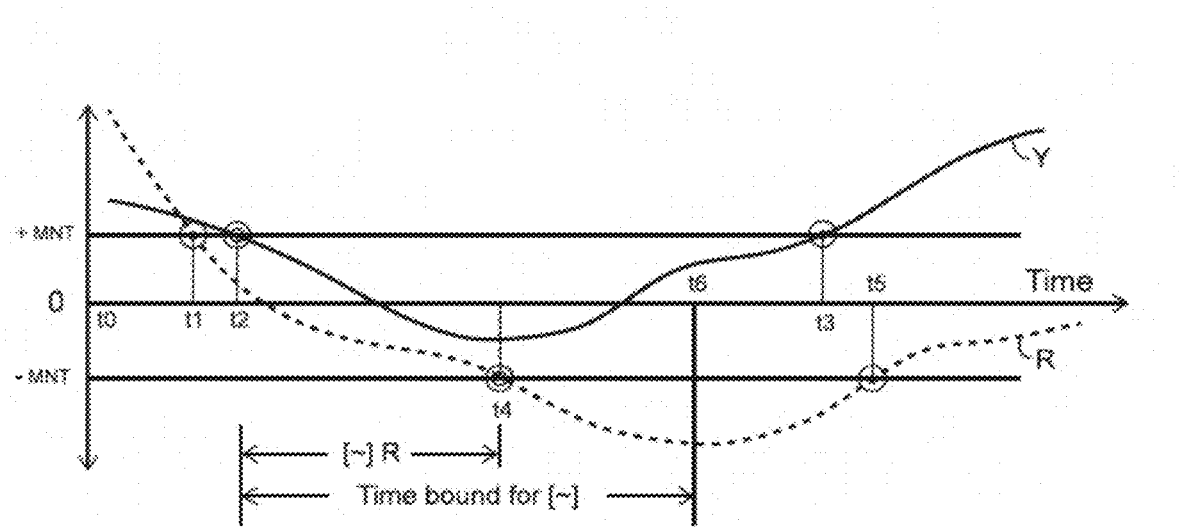
FIG. 8B illustrates exemplary Body Action Patterns Matching VLWP "[~]R" (Variable Length Waiting Period with a time bound terminated by detection of a Roll action within the time bound)
Figure 8C:
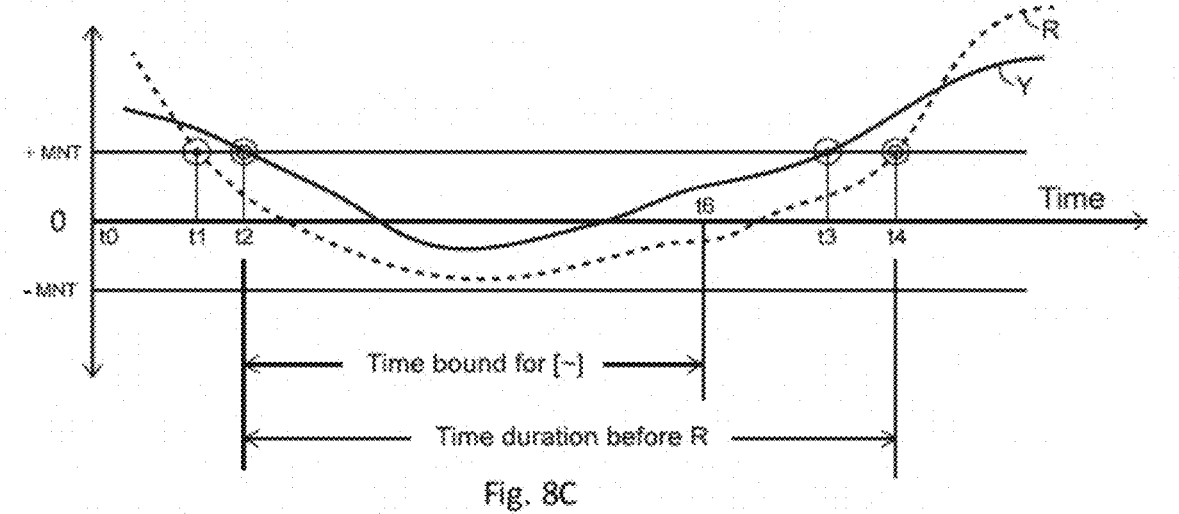
FIG. 8C illustrates exemplary Body Action Patterns that do not Match VLWP "[~R]"

Refer to FIGS. 8A, 8B and 8C. These three figures show an illustrative example showing variation of Y and R motion/position with respect to time for purposes of illustrating how VLWP can work. For purposes of simplicity, both Y and P are shown to have the same MNT values. FIGS. 8A, 8B and 8C, all depict a pictorial representation of a portion of "Y ~R" user gesture. At time t0, the system is assumed to be in a state where it has already recognized "Y" part of the user gesture and is actively monitoring Y motion/position and ignoring other motion/position variations such as R. (Therefore when R drops to below MNT at time t1, the system ignores that event.) The Y motion/position falls to below the MNT at time t2 (that is, Y comes to an end at t2) and the system recognizes that and starts monitoring for the next part of the user gesture, which is a VLWP represented by the "~R" in the user gesture. Starting time t2, the control software/system can start ignoring all other motions/positions until it encounters R motion/position that is greater than the MNT (that is, to become active). Therefore, even if the Y restarts at time t3, that is ignored by the system, and the system continues to wait for R motion to be become active (i.e. to attain absolute value greater than the MNT). Finally, when R is started at time t4, that is when the time period between t2 to t4 is matched by the system with the "~" part of the "Y ~R" user gesture. After time t4, the system starts monitoring for the end of R motion (not shown in the figure) to determine the end of the user gesture "Y ~R". FIGS. 8B and 8C show how the system can behave when time bounds are used with VLWP, and are explained below.

Time Bound VLWP—The symbolic representation "[~]" represents a VLWP that cannot exceed specified maximum time duration and cannot be less than the specified minimum time duration. Note that the lower bound can be set to zero for a particular or even all user gestures. The representation "[~] R" can indicate a time period where all motions/expressions are ignored until up to the point in time when a "R" motion is encountered before or immediately after the specified maximum time limit is reached. Therefore, for example, if the upper bound on "[~] R" in a particular embodiment was 500 milliseconds (ms), then this VLWP will be said to be terminated if an R motion was encountered at 200 ms (from the beginning of the VLWP). However, if no R motion was detected for the entire duration of 500 ms or immediately after the end of 500 ms, the system can stop looking for the VLWP and determine that the specified VLWP (i.e. the "[~] R") was not encountered. Therefore, even if an "R" motion is detected after more than 500 ms, that pattern of motion may not be recognized as one matching with the representation "[~] R". Refer to FIGS. 8B and 8C for illustration of how an embodiment of the system can match a motion/position pattern with a "Y [~]R" gesture. Monitoring for a VLWP is kicked off at t2 (as explained in previous section) however with a difference that in FIGS. 8B and 8C, the system is looking for R within a time limit of "Time bound for [~]" as illustrated in the figures. In FIG. 8B, the R value does fall outside the MNT range (meaning that R is started/detected to be active) at time t4, which is within the time bounds of the "[~]" part of the user gesture (indicated by time period t2:t6). The system therefore can match the time period t2:t4 as a successful match with the time bound VLWP in the user gesture. In contrast, in FIG.

8C, R is started at t4, which does not fall in the expected time bound range (that is during the period t2:t6). Therefore, the motion/position pattern of FIG. 8C does not match with the user gesture "Y HR". In this case, the system can restart looking for the user gesture, all over again from the beginning of the user gesture (i.e. the "Y" part of the user gesture). This can include clearing the motion/position/expression information stack or list.

Some Concepts when Using Eye Tracking Sensors in Control Systems—

Figure 9:
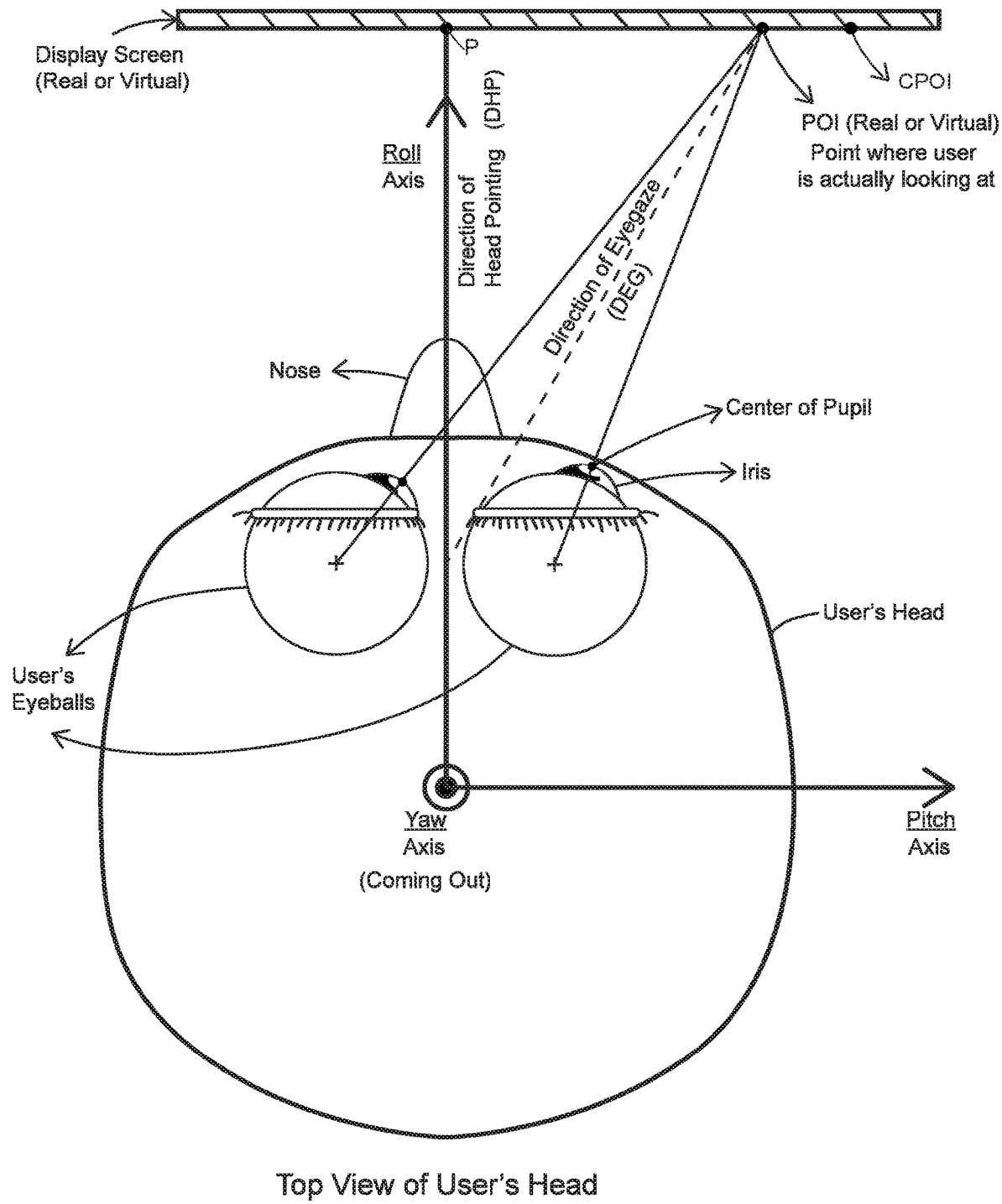
FIG. 9 illustrates an exemplary Direction of Eye Gaze versus Direction of Head Pointing in an Embodiment.

In some embodiments, a control system can include an eye tracking sensor or an eye tracking system that can determine the direction or a point in space (real or virtual) where the user is looking at a given point in time. Let us call this direction the Direction of Eye Gaze (DEG for short), and the point in space as Point of Interest (POI). The DEG can be different from the direction where the user's head is pointed; let us call the latter the Direction of Head Pointing (DHP for short). DHP can be aligned with the Roll Axis of the user's head or be parallel to the Roll axis but in the XY plane of the Head Coordinate System. FIG. 9 shows a top view of user's head (in a schematic form) and shows the DHP aligned with the Roll Axis of the user's head coordinate system. The DEG can be determined based on the orientation of one or both of user's eye ball(s). The user may be looking at a real point in space or a virtual point in virtual space (possibly presented to the user on a display screen or as a projection on interior/exterior part of the user's eye). The display screen itself can be real or virtual, planar or spherical or any other convenient shape. If the display screen is real, it can be in form of a display screen that is part of some eyewear or headgear being worn by the user, or be part of any other type of device.

Note: While this illustration shows POI in the plane of the display screen, that may not be always true. Some eye tracking systems can detect the distance of the object (from the user's eyes) at which the user may be looking at. Further, some devices can present graphical object in 3D virtual space, and not on a 2D display screen. Principles disclosed in this application can be used in all these situations.

Use of Steady Eye Gaze Before and During Performance of Other User Actions

Figure 10:
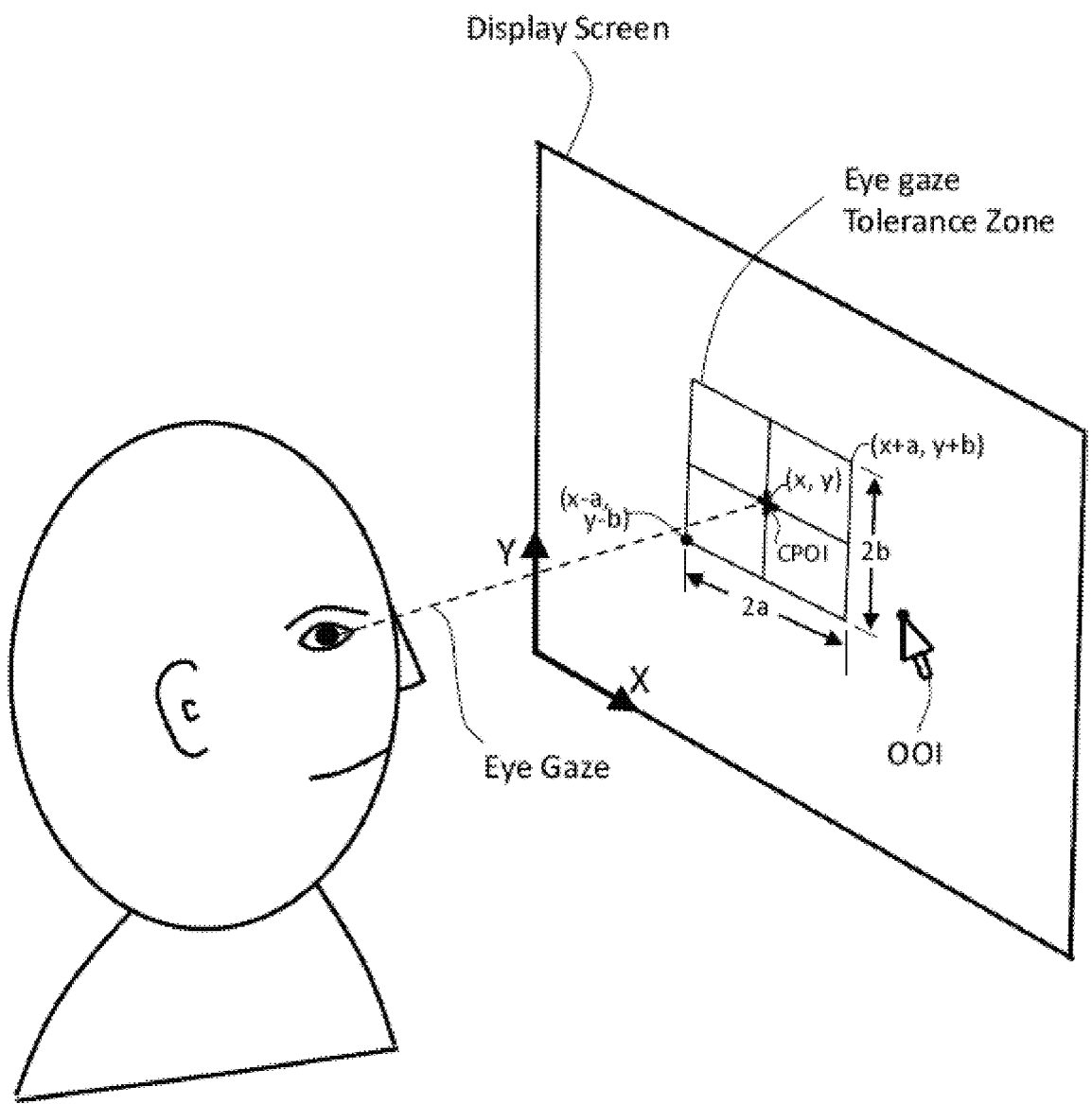
FIG. 10 illustrates an exemplary Eye Gaze Tolerance zone for measuring steadiness of Eye Gaze, wherein the Eye Gaze Tolerance zone is centered at the CPOI.
Figure 11:
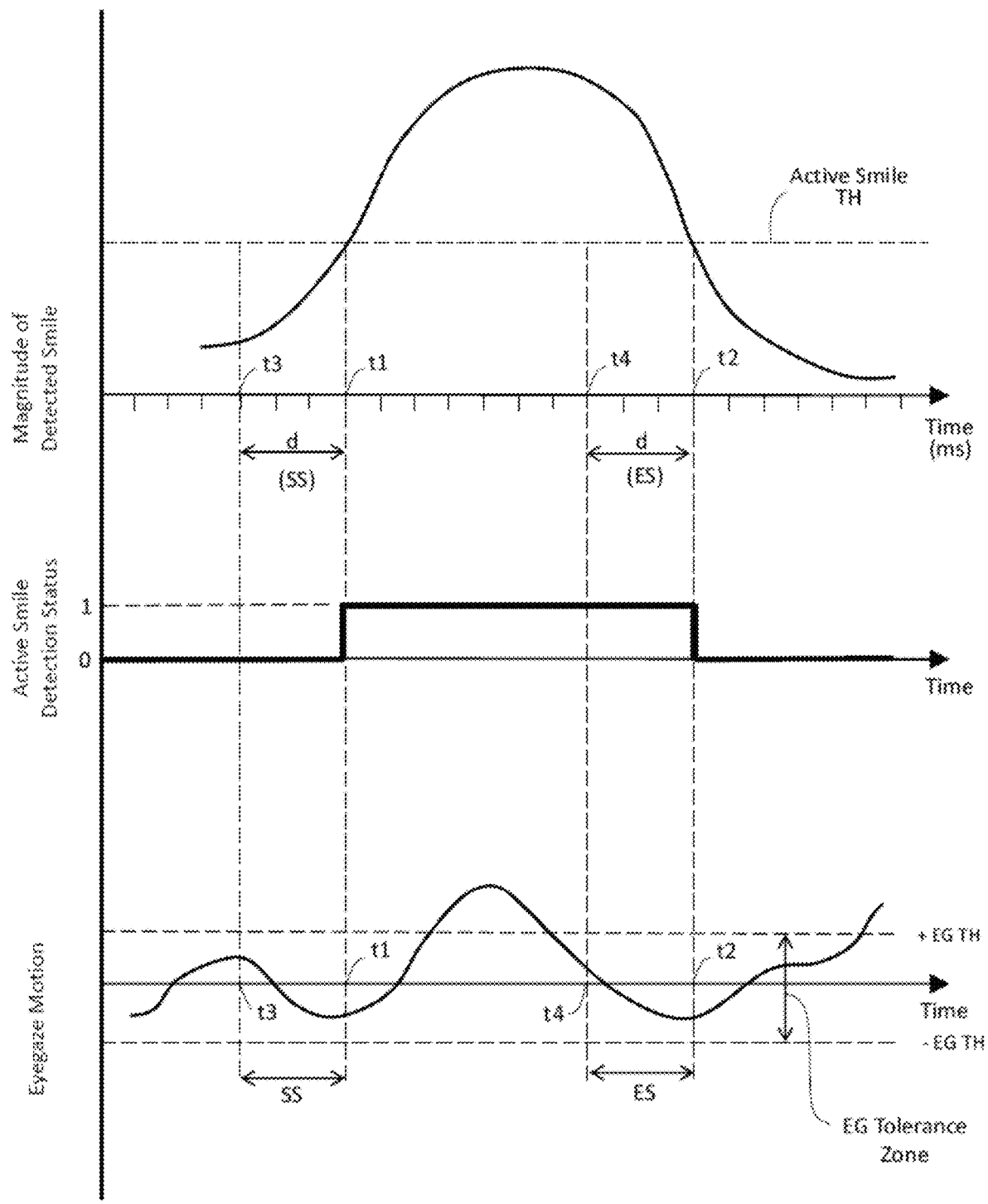
FIG. 11 illustrates an exemplary variation of Smile Facial Expression in relation to steadiness measurement of user's Eye Gaze.

In some embodiments, the steadiness of eye gaze can be used as a further confirmation of user intent when performing a user gesture. For examples of some user gestures, see Tables 1 through 7 in the referenced U.S. patent application Ser. No. 15/469,456. They describe illustrative embodiments of a gesture based user interfaces. Any of the described user gestures (as well as any other user gestures) that contain start or end of a facial expression can be enhanced to include an additional requirement that the user have their eye gaze (DEG or CPOI) be "steady" (that is, stay within a specified zone, possibly on the display screen) during the start or end of the facial expression. For example, if the user was performing the Select user gesture consisting of the "[<S>]" sequence of user actions, then the system can require that the user hold their eye gaze steady just before the performance of the "<S" (i.e. the start of a smile) as well as just before "S>" (i.e. end of a smile) user actions. See FIG. 10 that shows the user looking at a display screen (real or virtual). The point where the user is looking at is calculated (possibly by an eye gaze sensor) to be at coordinates (x, y) on display screen coordinate system. If the specified steadiness tolerance zone was defined to be rectangular in shape '2a' in length and '2b' in height centered around the Calculated Point of Interest ("CPOI"), then the user can be required to hold their eye gaze ("EG") within the "EG Tolerance Zone" rectangle just before the "<S" and "S>" actions. Lower left corner of the EG Tolerance Zone rectangle would be at coordinates (x-a, y-b) and the top right corner would be at coordinates (x+a, y+b). See FIG. 11 for further explanation. The Magnitude of Detected Smile plot of FIG. 11 shows variation of magnitude of detected smile (as measured by the smile sensor), with the depiction of the "Active Smile TH" which is the threshold magnitude. A smile facial expression can be considered to be active only when its magnitude is larger than the threshold. Therefore, in FIG. 11, smile is active during time period t1:t2, as shown in the Active Smile Detection Status plot. An active smile is shown to be detected (that is started) at time t1 and ended at time t2. If the "Required Duration of time to Hold Eye gaze Steady" (RDHES) was 'd' milliseconds, then the user can be required to hold their eye gaze steady during the period SS (that is time period t3:t1, which is just before the detection of an active smile) and during the period ES (that is t4:t2 time period, which is just before the end of active smile). The Eye Gaze Motion plot of FIG. 11 shows variation of eye gaze motion in relation to an eye gaze threshold (TH) that can signify the containment of the eye gaze within an EG Tolerance Zone. It shows that the eye gaze is within the tolerance zone during SS as well as ES. Note that some embodiments can calculate the CPOI at t3 as CPOI3 and then require all the subsequent CPOIs during time period SS to fall within the tolerance zone centered around CPOI3, as a measure of steadiness of the eye gaze during SS. Other embodiments can instead calculate the CPOI at time t1 and then make sure that all the preceding CPOIs during SS time period had fallen within the tolerance zone centered around CPOI1 (that is the CPOI at time t1). Other embodiments can have a tolerance zone of circular or elliptical shapes or some other convenient shape. Some embodiments can simply require that the distance between CPOI3 and CPOI1 be no greater than a specified max distance without regards to all other CPOI measurements between t3:t1. (This latter approach can be more forgiving as it allows for temporary distractions of the user by allowing for their eye gaze to wander off some, as long as the user's eye gaze comes back to be close enough to the CPOI3 at time t1). The eye gaze steadiness requirements can be similarly applied and verified in the ES time period. Therefore, in this scenario, if the eye gaze is found to be steady during SS and ES time periods, only then an active smile can be considered to be detected during time period t1:t2. In this embodiment, if eye gaze steadiness test fails at either at SS or ES time period, then the entire sequence of user actions ("[<S>]") can be considered to have failed and the control system may not generate any command signals to correspond to that user gesture. In other embodiments, the eye gaze steadiness requirement may be applied only to the SS or the ES period. In other variation, the steadiness requirement may be applied to time period t3:t2, and it yet another variation, it may be applied to t1:t2 time period.

Note: The user action of holding eye gaze steady (within certain bounds of displacement and possibly for a specified amount of time) can be seen as a Period of Limited Activity (POLA) being performed with POI, and thus can be called POI POLA. As seen above, POI POLAs can be required to be performed at the same time as other user actions are being performed.

Note: While some embodiments can require for a POI POLA to immediately precede the start or end of a detected active FE, some embodiments can allow for a grace period between the end of the POI POLA and the start or end of the active FE. That is, even if the eye gaze is not steady during this grace period, as long as this grace period is no longer than a maximum allowed grace period duration, the following start or end of the active FE will be treated as a valid event. (This assumes that the POI POLA satisfies all the other specified requirements including minimum time duration.) Further, this concept of grace period occurring prior to a POI POLA can be applied to any POLAs in user gestures that use the POLAs. On the other hand, some embodiments can require the POLA to be active not only before but also during the actual start/end of the active FE or even some time beyond it.

Note: Some control system embodiments may determine the steadiness of the eye gaze based on variance in DEG instead of CPOI.

Note: Some control system embodiments may display a visual representation of the CPOI as well as POI POLA on the display screen, as well as provide visual, audio, haptic and other types of feedback on the performance and success of the POI POLA. The feedback may be provided in real time.

Note: Some systems can also require that the POI POLA be performed no more than a designated maximum lag time period (MLTP) before certain user actions in a user gesture (for those actions to cause a command signals to be generated). The MLTP can be measured from the start/end of the POI POLA to the start/end of the following user actions it is associated with. Some embodiments can have the tolerance zone to be used before or after the action sequence to be sufficiently large so as to effectively eliminate the check for steadiness (before and/or after the initiation of the action sequence). It will be obvious that different actions can be substituted in or added to the illustrative examples of action sequences above to generate various different command signals, using the principles described above. For example, head motion actions can be substituted by arm/hand/finger actions (e.g. pointing gesture made with the index finger, raising a hand in a Vulcan salute, making a fist, clapping, etc.), facial expression actions (e.g. smile, wink, blink, opening mouth, puckering lips, raising an eye brow, twitching a facial muscle, etc.), contracting/tensing/relaxing specified muscles in the body, making a sound, giving a verbal command, and so on.

Note: Same or different sensors can be used to determine the DEG, POI as well as the motion/position of body parts used in the sequence(s) of body action(s). In one embodiment, an image sensor (monitoring the position/orientation of user's eyeball) to determine DEG, can also be used to get an indication of motion of head of the user based on the relative location of the various "features" on the eye. These "features" can be corners of the eye, center of the pupil, interesting locations on the iris or the sclera, interesting locations on the eyelids, the glint(s) on eyeball cast by a light source, etc. In other embodiments, inertial sensors (such as MEMS gyroscopes or accelerometers, radar sensors, etc.) can be used to get an indication of the motion/position of a body part of the user (such as the head). In other embodiments, a different image sensor(s) may be used for getting information indicative of motion of body part(s) than what is used for determining the DEG. Some embodiments can use MEMS sensors (instead of or in conjunction with image sensors) to determine user's eye gaze.

Figure 12:
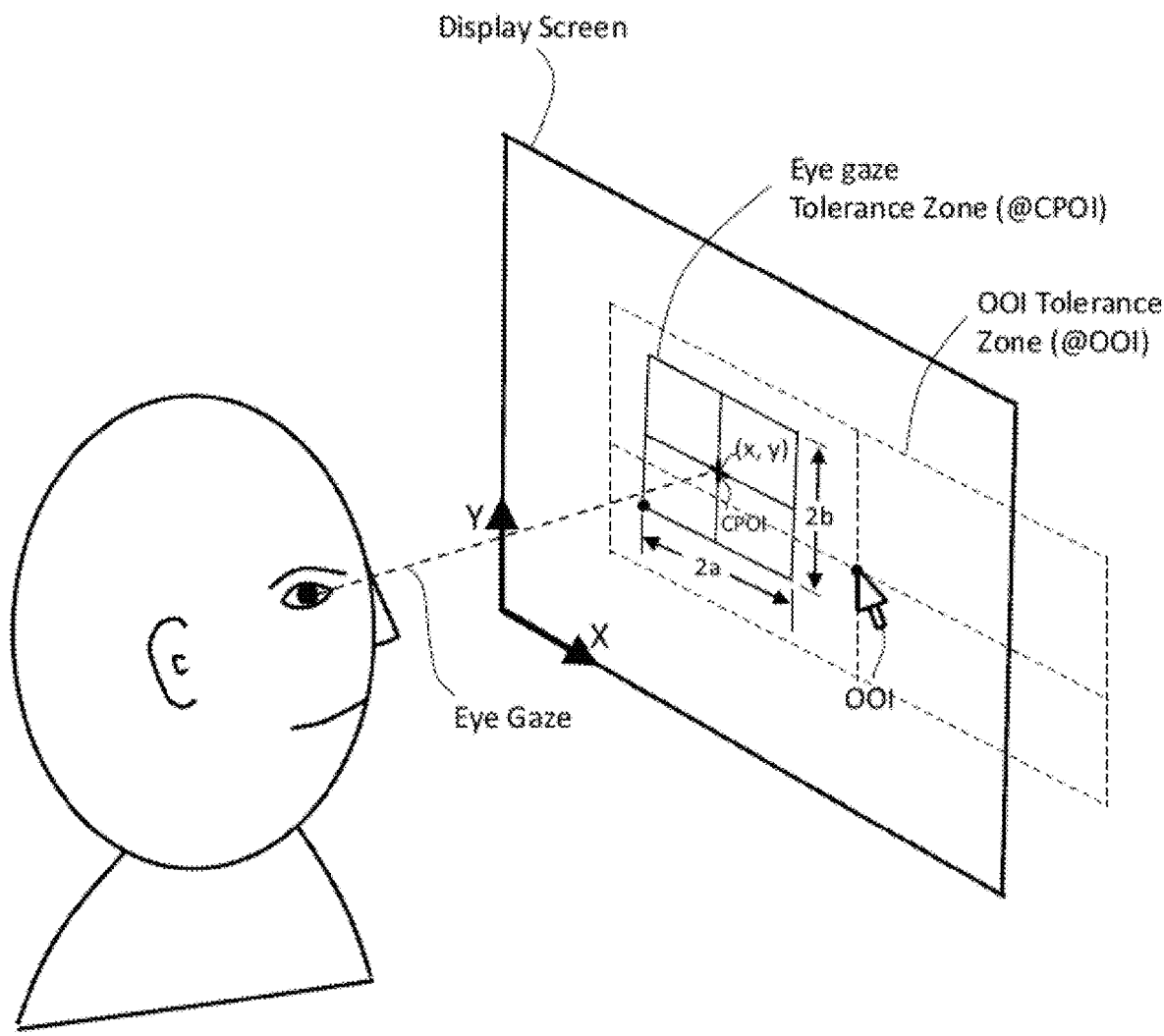
FIG. 12 illustrates an exemplary Eye Gaze Tolerance zone for measuring steadiness of Eye Gaze, wherein the Eye Gaze Tolerance zone is centered at the location of OOI.

This above paragraphs illustrate how eye gaze steadiness can be used as a measure of user's focus and therefore the user's intent when performing various actions in a user gesture. Note that the CPOI computed during the steadiness determination may or may not be close enough to the OOI that may be affected by the generated command signals at the end of the user gestures. For example, if the OOI was a mouse pointer, the location of the mouse pointer may or may not fall within the EG Tolerance Zone. However, other variations can require that the some or all the CPOIs calculated during the performance of a part or whole of a user gestures be within a certain distance from (or be within certain tolerance zone centered around) the location of the OOI. See FIG. 12 for an illustration of this. In this embodiment, the system can also require that the EG Tolerance Zone be within the OOI Tolerance Zone. (Note that the OOI tolerance zone can be of different shapes and sizes as per the requirements on the control system.) The OOI Tolerance Zone requirement can make sense when the resulting command signals (of the performed user gesture) are applicable to the location of the OOI. For example, for left or right click user gestures, it can be important that the user be cognizant of the location of mouse pointer OOI and therefore have their eye gaze be generally in the direction of the location of the OOI. However, for certain other commands such as Swipe (up, down, left or right), Windows Minimize/Maximize, Desktop Show/Hide, Go Forward/Backward/Home, or other commands that are not affected by the current location of the mouse pointer OOI, the awareness of the mouse pointer OOI location) may or may not be critical based on the program running or the operating system running on the controlled electronic device.

The control system may impose the eye gaze steadiness requirement to entire user gesture or only parts of it. For example, as seen earlier, some embodiments may require eye gaze steadiness during performance of the entire user gesture. Here are a few examples—

| | |
|---|---|
| [<S>] | (Click/Select) |
| {R>} [~] [<S>] | (Right Click) |
| [<Y2] [~] # | (Go back or Swipe left) |
| #[Y2>] [~] # | (Go back or Swipe left) |
| [Y2>] [~] [P2>] [~] # | (Window Maximize) |
| [P2>] [<P2] [P2>] [<P2] [~] [<Y2] [Y2>] [~] # | (Initialize) |

Whereas, the steadiness requirement can be made applicable only to the underlined portions of the following user gestures.

| | |
|---|---|
| [<S>] | (Click/Select) |
| <U>S</U> * {YP} {YP#} <U>S></U> | (Move/Modify OOI) |
| <U>S</U> * {YP} {YP#} <U>S></U> | (Move/Modify OOI) |
| <U>S</U> * ## {YP} {YP#} <U>S></U> | (Scroll or Pan) |
| <U>S</U> * ### {YP#} <U>S></U> | (Drag or Tap + Hold + Move) |
| {R>} [~] [<U><S></U>] | (Right Click) |
| {R>} [~] <U>S</U>* ## {YP#} <U>S></U> | (Right Click and Drag) |
| [<U><Y2</U>] [~] # | (Go back or Swipe left) |
| #[<U>Y2></U>] [~] # | (Go back or Swipe left) |
| [Y2>] [~] [P2>] [~] # | (Window Maximize) |
| [P2>] [<P2] [P2>] [<P2] | (Initialize) |
| [~] [<U><Y2</U>] [Y2>] [~] # | |
| <U>S</U> * {R} {R #} S> | (Zoom or Rotate) |

Note that certain user gestures such as Select, Right Click, Swipe Left, Windows Maximize, Initialize, etc. occur on both the above lists, meaning that some variations can require eye gaze steadiness throughout the performance of certain user gestures whereas other variations may require steadiness over only parts of the same user gestures.

Note that the above lists are only a sample of some of the candidate user gestures that can require POI POLA during the entire performance of user gesture or during only parts of a user gesture. Any new/different user gestures can be created and the requirement of performance of POI POLA may be applied to all or any parts of those user gestures.

Note: Commands corresponding to user actions can be generated (to be applicable) at one of the CPOIs computed during the performance of the POI POLA (that is the location where the user is determined to be generally looking during the POI POLA) for certain user gestures and/or in certain control system embodiments. In other user gestures or variations of control systems, the commands can be generated to be applicable to the location of a designated OOI (e.g. a mouse pointer or a reticle being displayed on the display screen). E.g. the generated commands for the Click/Select user gesture may be applied at the location of the mouse pointer on the display screen at the time of detection of the Click/Select gesture. Whereas, the generated command for the Window Maximize user gesture may be applied to the window that the user was determined to be looking at during the POI POLA (and not where the mouse pointer may be located at that time.)

Note: Same or different sensors can be used to determine the DEG, POI as well as the motion/position of body parts used in the sequence(s) of body action(s). In one embodiment, an image sensor (monitoring the position/orientation of user's eyeball) to determine DEG, can also be used to get an indication of motion of head of the user based on the relative location of the various "features" on the eye. These "features" can be corners of the eye, center of the pupil, interesting locations on the iris or the sclera, interesting locations on the eyelids, the glint(s) on eyeball cast by a light source, etc. In other embodiments, inertial sensors (such as MEMS gyroscopes or accelerometers, radar sensors, etc.) can be used to get an indication of the motion/position of a body part of the user (such as the head). In other embodiments, a different image sensor(s) may be used for getting information indicative of motion of body part(s) than what is used for determining the DEG. Some embodiments can use MEMS sensors (instead of or in conjunction with image sensors) to determine user's eye gaze.

Content Manipulation Using Eye Gaze and Head Gestures

Some embodiments in the following paragraphs disclose use of Start Trigger based on POI POLA and/or Head POLA, OMD comprising Head Motion, OOI Motion/Modification Disabling Event ("ODE") comprising of Head Returning to Start Position.

Using the above principles, the content on a display screen or an OOI can be scrolled, moved, rotated, zoomed, panned when the user performs a POI POLA (for a minimum required time) and then moves/rotates their head (possibly as measured by change in DHP or movement of tracked features of the user's face captured by an image sensor), by a minimum required amount in a specified direction. The command signal generation can initiate once the user's head is moved/rotated by the minimum required amount and then continue indefinitely. The command can end (i.e. the command signals can stop being generated) when the user moves/rotates their head back to roughly the position their head was at the time of the initiation of the rotation and/or possibly holds their head steady for another minimum specified amount of time (Head POLA) or performs another POI POLA or a designated ODE (possibly even using a PCE/PCM). For example, if a user performs a POI POLA on an OOI (such as a virtual 3D Model) displayed on their head worn device (such as Augmented/Virtual/Mixed Reality headset), a subsequent Yaw, Pitch, Roll of their head can cause the OOI to rotate/change orientations as per their subsequent head motions. However, if a PCE/PCM is active at the time of POI POLA or during the subsequent head motions, the system can generate signals to translate the OOI (instead of rotation), or any other command signals to modify the OOI for that matter. Some embodiments can provide visual indication of the POI and/or the OOI that is "selected" as a result of the performance of the POI POLA while looking at that OOI. In further variations, some embodiments can require a POLA based on head motion/position (Head POLA) in lieu of or in addition to the POI POLA. Some embodiments can decide not to require steadiness of the DEG or POI once the command is initiated.

It will be obvious that any number and variety of command signals can be generated by the system based on different sequences of body actions. Similarly, any number, variety and combination of sensors can be used to get information indicative motion or position of different body parts of the user or different body actions of the user.

In some embodiments, an OOI (e.g. a cursor or pointer or a graphical icon on a display screen of a device) can be moved/modified in accordance to body action such as eye gaze or head motion of the user, wherein the motion is initiated upon a first body action such as blinking of at least one eye, winking, squinting/changing the amount of opening of the eye (possibly beyond a specified threshold), opening an eye wide, crinkling around the corner of the eyes or any area surrounding the eye, moving an eyebrow, smile, mouth twitch, mouth open/close, twitching/pulling/moving a corner of lip(s), frowning, sticking the tongue out, wiggling the tongue, inflating the nostrils, puffing cheeks, sucking cheeks, sucking/puffing action, moving an eyebrow(s), squinting eye(s), making eye(s) bigger (by opening it/them wide), lip pucker, or any other facial expressions or any other designated body action. As an example, OOI motion/modification can be initiated upon performance of a designated body action such as blinking or winking or other suitable action. The user can place the OOI at a particular spot on a display screen by looking at that spot and blinking/winking. The blinking/winking action can be taken as a cue by the system to generate command signals to move the OOI to the spot where the user is determined to be looking. After the OOI is moved to the spot, it can stay there till the user looks at another spot and performs another blink (or any other designated body action). Alternatively, the OOI can keep on moving once the OOI Motion is initiated by the first designated body action and can be terminated by an ODE (OOI Motion/Modification Disabling Event). That is, for example, once the OOI Motion is initiated by a blink/wink or other designated first body action, it can continue to be moved/modified in accordance to the eye gaze and/or head motion or motion of other designated body part, until the point the user performs a second body action such as another blink, wink, smile, mouth twitch, mouth open/close, twitching/pulling/moving a corner of lips, puckering lips/making a kissing shape with lips, sticking the tongue out, wiggling the tongue, inflating the nostrils, puffing cheeks, sucking cheeks, sucking/puffing action, moving eyebrow(s), squinting eye(s), making eye(s) bigger (by opening it/them wide), lip pucker, or any other facial expressions or any other designated body action. The second body action can also include performance of a POLA such as the user simply holding their gaze or head steady for designated minimum amount of time and/or within certain limits of range of motion or position. Use of a POLA for disabling the OOI Motion/Modification can be called the "Dwell Park" concept/principle/heuristic wherein OOI Motion/Modification is ended upon hovering the OOI for a designated minimum duration or time and/or within a designated area on the display screen and/or within designated limits of motion, or any other suitable criteria for measuring the hover action.

Control Systems Using Multiple OMDs

Many control systems employ only one OMD to change an OOI. For example, if the OMD is eye gaze, then an OOI follows the POI on the display screen. Other systems using head motion as the OMD can have the OOI be modified in accordance to the change in position or velocity of the user's head. However, each OMD has its advantages and disadvantages. For example, determination of the POI (CPOI) in an eye tracking based system is often fraught with inaccuracies and rarely is pixel perfect. Therefore, while the user may be looking at POI, the system may compute it to be at CPOI (Calculated POI), which may or may not coincide with the POI. Whereas, systems using head motion as the OMD, may be able to calculate head motion quite accurately and without noise, however, given that users often need to move/modify an OOI (such as a mouse pointer) moving their head often can become tiring to some users. As in the referenced documents, we disclose control systems that can employ multiple OMDs to move/modify the OOI. This allows for taking advantage of the benefits of various OMDs while compensating for their shortfalls. For example, some embodiments can employ head motion as well as eye gaze as OMDs. In some of such embodiments, criteria can be specified to define how one OMD is used versus the other when modifying an OOI. One such criteria can use magnitude of a designated OMD to determine which OMD (of the multiple possible OMDs) to use. For example, the system can specify a threshold on the magnitude of a first OMD, above which only the first OMD can be used to generate OOI modification signals (OM signals) and below which only a second OMD (that is distinct from the first OMD) can be used to generate the OM signals. As an illustration, if the first OMD was eye gaze and second OMD was head motion, then if at any point in time the eye gaze was changing by an amount greater than a designated eye gaze threshold, then the OOI (for example a mouse pointer on a display screen of the controlled electronic device) would move according to the changes in the eye gaze. (Note that this eye gaze threshold can be defined on the angular velocity of the DEG, displacement of POI or displacement of DEG, or any other suitable criteria. Further, the displacement could be measured from various events in time. For example, the displacement could be measured in relation to (a) the DEG/POI/CPOI during a previous or immediately previous iteration (with respect to the current iteration), (b) the location of OOI the last time the OOI was affected by the any OMD, (c) the location of OOI the last time the OOI was affected by eye gaze OMD in particular, (d) DEG/POI/CPOI at beginning, end or during a previous or last eye gaze fixation, (e) DEG/POI/CPOI at a specified time duration ago (from the current time or from beginning of current iteration), or (f) any other suitable point in time. However, if the change in eye gaze is within the threshold, then the system can switch generation of signals to be based only on head motion OMD.)

Warping of OOI Based on Head Motion, Facial Expressions or Other User Actions

In some embodiments, an OOI can be configured to be modified using user's eye gaze as the OMD. In such embodiments the OOI can change in accordance to the user's eye gaze, during every iteration (of the control software) where enough sensor data is available to calculate the user's eye gaze. This can lead to frequent modification of the OOI. This can be annoying to the user, especially if the OOI is displayed on screen. This is because sometimes the user may be looking around (on the screen or beyond) without intending to move or change the OOI. To alleviate this, rather than continuously modifying the OOI based on detected eye gaze, the control system can initiate OOI modification (in accordance to the eye gaze) only when the user performs a designated user action/gesture called the OOI modification start trigger (OMST). An OMST can be an action such as an eye blink/wink/squint, eyebrow motion, smile, mouth open/close, lip twitch, nose twitch, or any other suitable facial expression, or head/hand/body part motion/pose/orientation/configuration, or any physical, verbal or mental action, or a combination of any such actions. This concept can be called Warping, wherein the OOI can suddenly change (and possibly jump on a display screen) or be suddenly modified according to where the user is (determined to be) looking, when the user performs the OMST. If the OMST is a facial expression, this can be called Facial Expression based Warping (FE Warp) of the OOI. If the OMST is head motion, then it can be called Head Motion based Warping (Head Warp) of the OOI. A designated OMST can also be making a hand gesture, tightening a bodily muscle, attaining a mental state (as measured by brain waves), making a sound (e.g. a clicking sound, verbal command, etc.), moving the tongue, clenching teeth, or any other suitable action. See referenced applications for additional examples of start triggers, including U.S. patent application Ser. No. 15/469,456 which lists illustrative examples of head motion based start triggers that can be used to start generation of OOI modification command signals.

Figure 13:
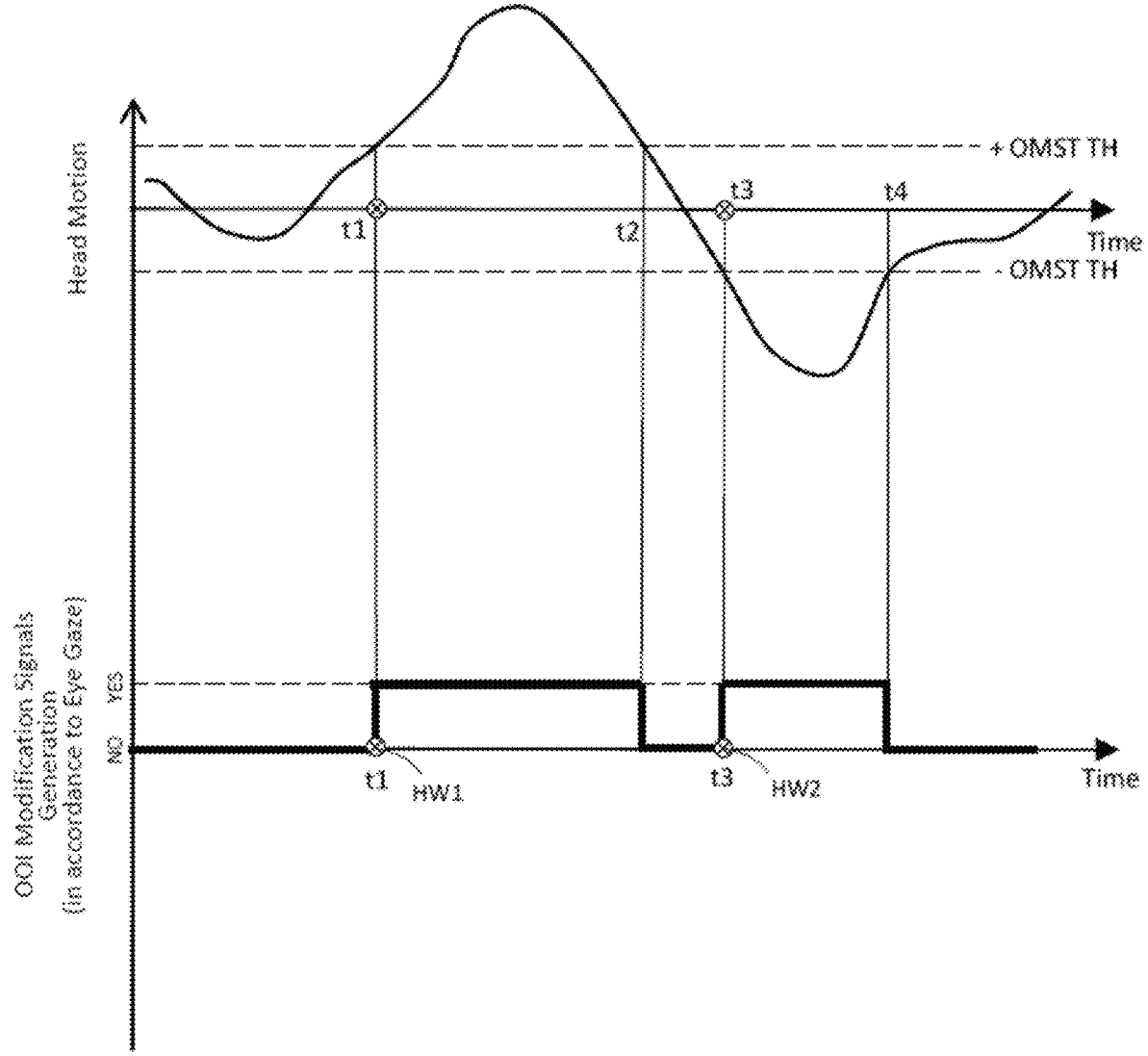
FIG. 13 illustrates an exemplary Head Motion pattern to trigger OOI Warp based on Head Motion in an embodiment.

As an illustrative example, in a system configured to move the mouse pointer (OOI) in accordance to the user's eye gaze (OMD), if head motion was the OMST, the mouse pointer may not move even if the user's eye gaze was moving around, unless and until the user also moved their head by at least a specified minimum amount (OMST Threshold, aka OMST TH). That is, when the user is ready to move the mouse pointer, they can simply look to the spot they want to move the mouse pointer to and then move their head (at a magnitude larger than the OMST TH); this can lead to the mouse pointer instantaneously jumping to where they are looking. After the jump to this location, the OOI can stay there indefinitely, unless the user continues to move their head by at least the OMST TH (i.e. performs the OMST). See FIG. 13 for an illustration. The Head Motion plot of the figure shows the motion of user's head over time. The OMST TH is illustrated. The magnitude of head motion is shown to be within the OMST TH prior to time t1, but then exceed it during time period t1:t2, drop within it during t2:t3, and then exceed it again during t3:t4. Therefore, in this embodiment, the first head warp (HW1) is experienced at time t1, that is when the generation of OOI modification commands in accordance to user's eye gaze is initiated. That means that the mouse pointer is moved from its previous position to CPOI at time t1 (CPOI1), and then it can be continuously moved in accordance to the CPOI (computed during every iteration) during the time period t1:t2. The mouse pointer then can come to rest at the CPOI computed at time t2 (CPOI2) and can stay at that location till the next occurrence of a warp. The second head warp (HW2) is experienced at time t3, wherein the mouse pointer can again start moving in accordance to the user's eye gaze between the time period t3:t4, and the OOI can come to rest at CPOI computed at time t4. Such a system can therefore allow the user to freely look around (at the display screen or elsewhere) without having the mouse pointer constantly follow their eye gaze, as long as the user was also holding their head steady enough (i.e. not moving it more than the specified OMST TH).

Note: In the above embodiment, the mouse pointer (OOI) was being exclusively modified based on the eye gaze (that is where the user was looking at) between the periods of t1:t2, and t3:t4. This exclusivity may not exist in some other variations.

Figure 14:
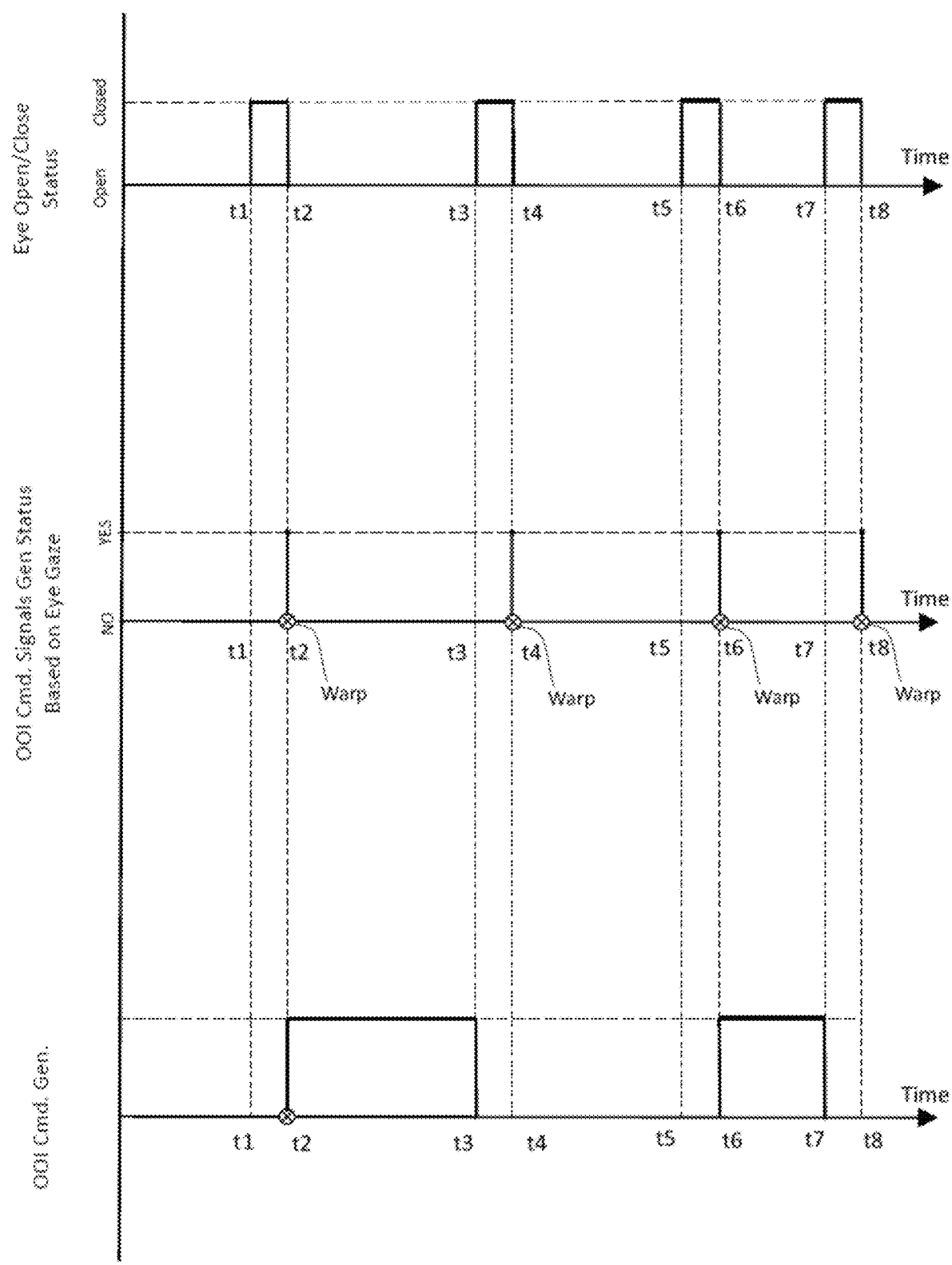
FIG. 14 illustrates an exemplary OOI Warps based on Blinks in an embodiment.

In some embodiments, a facial expression can be specified to be an OMST. For example, if an eye blink was an OMST, the OOI would be modified (e.g. get moved to the location where the user is looking) when the user blinks. However, once the OOI gets modified, it can stay unchanged at the new state/location. See FIG. 14 illustrating an embodiment showing OOI warping based on blinks. The Eye Open/Close Status plot of the figure shows eye open close status, and the OOI Cmd. Signals Gen. Status plot shows status of generation of OOI modification command signals (that are in accordance to the eye gaze signals). The user starts a blink (by closing their eyes) starting at time t1 through time t2 when they open their eyes. The control system can compute the CPOI right after the blink is completed (at time t2) and generate command signals to move the mouse pointer/OOI to be in accordance to the coordinates of $CPOI_2$. (Note that if the plane where the OOI is displayed does not coincide with the plane used for calculation of CPOI, then the coordinates of CPOI may not match the coordinates of the OOI). In this embodiment, there are no OM signals generated after time t2 until time t4 when the next completed blink is detected. Note that some systems can imposes a minimum duration requirement on the blinks. That is, for example, if a time duration t1:t2 was not longer than a minimum required blink duration, then that blink can be ignored for OOI warping purposes by the control system. See the OOI Cmd. Gen. plot for a variation where the system initiates and keeps on generating OM signals (based on eye gaze) upon/after the first blink until it encounters a second blink, where the second blink is used as an indicator (end trigger) to stop generation of the OM signals (at time t3). There can be no OM signals generated between times t3:t5, and the signal generation is restarted at t6 which continues till t7 (the time when the fourth blink is started). This assumes that all four blinks were valid (that is, for example, of at least the minimum specified duration), otherwise as stated before, invalid blinks can be simply ignored and the system can reinstate the OM signal generation status that existed just before that blink was encountered. In this embodiment, every odd number valid blink is treated as an OMST and every even number valid blink is treated as an ODE (OM signal generation Disabling Event). Note: In some variations, the OM signals generated at the onset of a blink based warp can be based on the last CPOI calculation before the user closed their eye. E.g., the CPOI used to place the OOI at time t2 may be from the CPOI during the iteration just before time t1. Some embodiments may consider the point the user is looking at just before the blink (rather than just after the completion of the blink) as a more reliable indicator of where the user intended to move the OOI. The same approach can be used with other user actions designated to trigger OOI warps.

Figure 15:
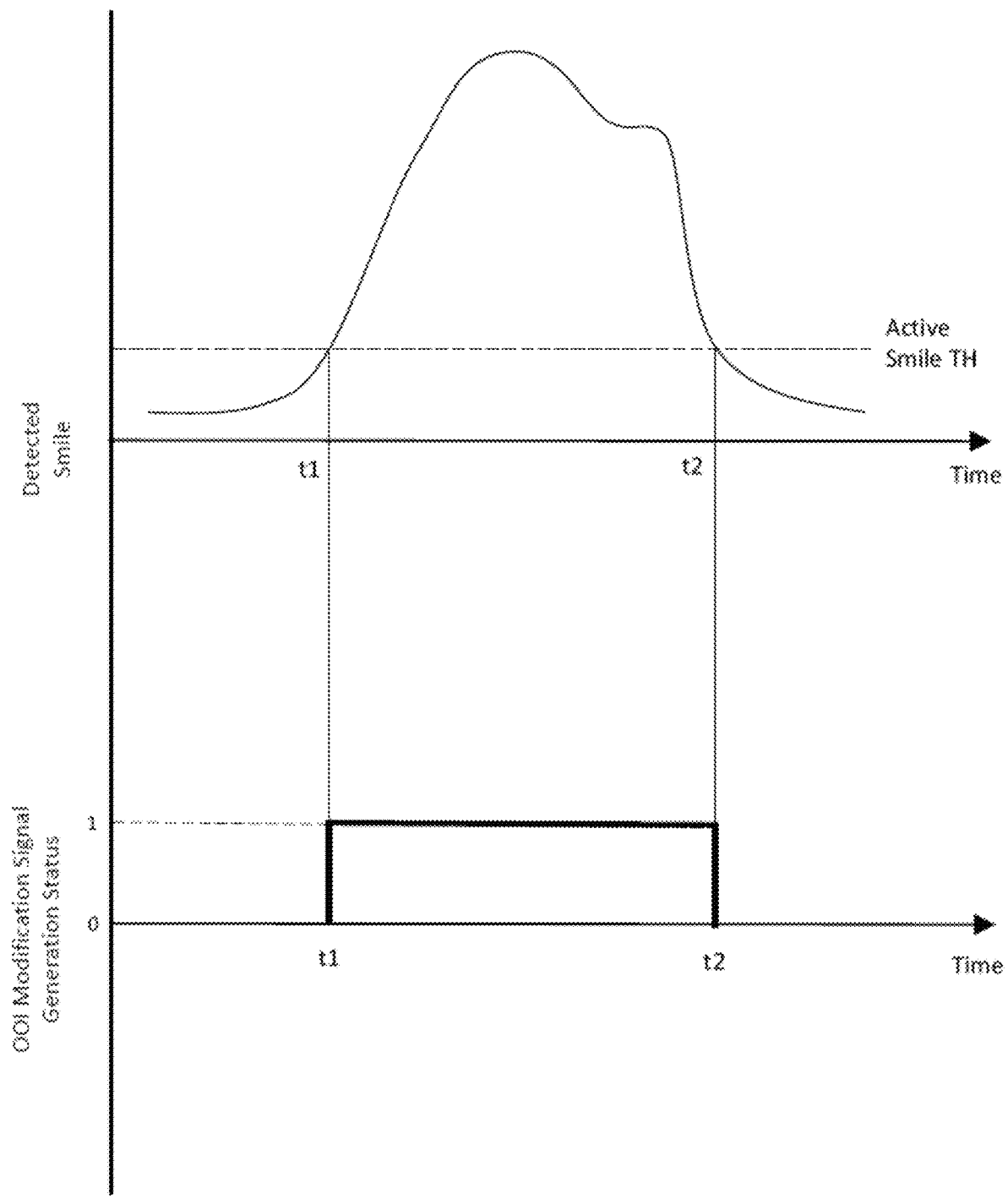
FIG. 15 illustrates an exemplary OOI Modification Signal Generation based on detection of an Active Facial Expression.

In another example, if the OMST was the facial expression of smile, the OOI can get modified according to the eye gaze when a smile of magnitude greater than the OMST TH is detected; and in a further variation, the OOI can be continuously modified as per the eye gaze, as long as the facial expression is detected to be above the OMST TH or a different specified threshold. See FIG. 15 for an illustration of OOI modification being generated based on detection of an active facial expression. The Detected Smile plot of the figure shows variation of detected smile, wherein it surpasses the Active Smile Threshold only between times t1 and t2. The OOI Modification Signal Generation Status plot of the figure shows the status of OM signal generation. It shows that those signals are generated (in accordance to eye gaze) only between the times of t1:t2. The OOI can be abruptly modified (warped) to CPOI computed at time t1 and then can be further modified in every subsequent iteration according to the CPOI computed at that iteration, up to time t2 when the detected smile becomes non-active (i.e. drops below the active smile threshold), and then the system can leave the OOI at coordinates corresponding to CPOI2 (the CPOI calculated at time t2) until the next OMST is encountered. As illustrated in this embodiment, an (active) smile start event can be treated as a OMST and end of active smile can be treated as an ODE.

The concept of OOI Warping (whether based on facial expressions, head motion or any other designated body action) can therefore provide an easy and precise way of indicating user intent to moving/modifying or start moving/modifying an OOI in accordance to an OMD.

In a variation of systems using body motion (such as, for example, head or hand motion, etc.) as the OMST, additional conditions can be imposed before the system can start generating the OOI modification command signals. For example, the system can also require the body motion (OMST) be performed in a particular direction, before it can be considered as a valid OMST to trigger generation of signals for OOI modification. As an example, the system could require head motions be only along the horizontal direction going right or left, or be a side-to-side shake, or be only in a downward nod of the head, or some other combinations of head motions. Alternatively, some systems can require the head motion to be in the direction of the POI. That is, if the user's head was pointed towards point P on the screen (i.e. the intersection of DHP with the surface of the display screen, see FIG. 9) but if their eye gaze was pointed towards POI, then the system can require that the user move their head so that the DHP traces the vector going from point P to POI/CPOI (within certain required tolerance). Therefore, even if the user moved their head (while looking at the POI) at a magnitude larger than the OMST TH, if the direction of head motion was not sufficiently correct (and possibly for sufficient amount of time duration), then that user action may be ignored (that is, not considered as a valid OMST to start command signal generation). Note that other variations can require the OMST head motion to be in opposite direction compared to the P-POI/CPOI vector; this requirement can be beneficial in systems that tend to underestimate the location of the POI. Regardless, imposing a direction requirement (in addition to the magnitude requirement of an OMST) can help with reducing false positives when using an OMST.

Additional conditions (beyond the OMST) can be required to be satisfied before the system can start generating command signals to modify the OOI. For example, in a variation, some systems can also look to the size (or change in size) of user's pupil as an indicator of user intent. Some systems can require pupils of the user's eye to dilate (that is increase in size) by a specified minimum amount before, during or immediately after the performance of the OMST. Further, the system can require that this dilation persist for at least a specified minimum amount of time. Some systems can also compensate for change in lighting conditions (around the user) when computing the dilation of the user pupils. Some systems can also compensate for the size, color, brightness, or nature of objects (such as inanimate versus animate, moving versus stationary, male versus female gender, their closeness to the DEG or the user's eye, etc.) shown on the display screen (real or virtual) or in the visual field of the user, when computing the pupil dilation changes. Some systems can also compensate for non-visual stimuli or other conditions causing cognitive load to the user, before computing the amount of dilation that could be correlated/attributed to user intent. In such embodiments, if the additional eye pupil dilation requirements are not met, the system may not start generating the OM signals even if the OMST conditions were met.

Multiple OMDs after Warp

In some embodiments, immediately after the warping of OOI, it can be continued to be modified based on multiple OMDs. In such cases, the magnitude and direction of OOI modification can be based on the relation between magnitude and direction of first OMD to magnitude and direction of second OMD. For example, the OOI motion calculated at a particular point in time can be in accordance to the OMD with larger magnitude at that particular instant. In another embodiment, OOI motion calculated at an instant can be based on the OMD with the lower magnitude at that instant. In other variations, the OOI modification can be based on a combination of both (or all) the designated OMDs (i.e. including their magnitudes and/or their directions). In other variations, change in eye gaze vector (CEGV) can be calculated and used to determine which OMD is used to drive the OOI modification. The CEGV can be calculated either between two consecutive iterations, or over some specified number of iterations (possibly up to the current iteration), or over a designated time period (possibly just before and up to the current iteration) or any other suitable interval, and also possibly including filtering out of some of the eye gaze vector calculations attributable to noise or random or unintentional motions of the eye or head. The CEGV then can be used to determine if the OOI should be modified in accordance to the eye gaze OMD versus some other OMD (such as head motion) for the current iteration. For example, if the CEGV is less than a specified CEGV threshold, then the OOI can be modified in accordance to head motion (i.e. the second OMD instead of eye gaze). Note that if the head motion during a particular iteration happens to be zero in magnitude, the magnitude of OOI modification can still be zero even though CEGV is non-zero, if the CEGV is less than the specified CEGV threshold. In effect, the effect of eye gaze on OOI can be suppressed if CEGV is within a specified threshold. In other variations, the effect of eye gaze can be suppressed when it is larger than a second designated CEGV threshold. This for example can help with not modifying the OOI if the user happens to look away from the screen. Some embodiments can designate a variety of CEGV values and then suppress or enable OOI modifications based on if the CEGV falls within or outside specified range of values.

Note: The CEGV can be calculated between two designated eye gazes possibly as physical distance or number of pixels on the display screen between the two CPOIs (corresponding to the two eye gaze vectors) or as the angular deviation between two designated eye gaze vectors or any other suitable method of determining the change between some specified number of designated eye gaze vectors In some embodiments, where both eye gaze and head motions are being tracked, the OOI motion start trigger could be performance of a head motion by the user, wherein the magnitude of the head motion is larger than a first designated head motion threshold. The OOI (possibly shown on the display screen of an electronic device) can stay stationary despite changes in the eye gaze point as the user looks around. However, when the user performs a head motion larger than a specified threshold, the OOI can be modified in accordance to the latest eye gaze point (i.e. possibly jump to the latest coordinates of the eye gaze point). However, after that sudden change in the OOI attributes (such as coordinates), it can start following the head motion (that is, for example, the coordinates of OOI can change in accordance to the head motion) until the occurrence of an ODE (such as a POLA performed with the head motion). (Note that when the OOI is being moved by means of their head, if the user looks away from the current location of the OOI by more than a specified amount, the OOI can jump to a new location that corresponds to the new eye gaze point. If that happens, the OOI can continue to move from that new location in accordance to the head motion, provided that the head motion is larger than some specified designated threshold, which may or may not be the same as the first designated head motion threshold.) In a variation, some embodiments may disallow the eye gaze to affect the OOI modification while the OOI modification is being driven by head motion. In further variation, that disallowance may be in effect only based on certain detected state(s), such as presence of a body action including facial expression, hand/finger gesture, etc., or detection of key press state of mouse button or keyboard or an adaptive switch, touch state of a touch sensitive surface or specified state of some type of manual input mechanism. For example, if at the start of the OOI modification based on head motion it is detected that a mouse key is in depressed state, the OOI motion will only follow the head motion (and not the eye gaze) until the point in time when the mouse key is released.

Note: The principles/concepts of Facial Expression Warping and Head Warping can be used along with the principle/concept of CEGV based OMD determination.

Note: Warping can be done based on any body parts (and not just facial muscles or head).

Here are a few embodiments illustrating use of additional OMDs after the warping process. As previously seen, some embodiments can start generating OM signals when a valid OMST (including any additional requisite conditions) is encountered. At this point, the OOI can get moved/modified according to the user's eye gaze and then it can be left there indefinitely unless the OMST conditions are met again. In some variations, however, once the OOI is moved/modified as per the eye gaze (the first OMD) as part of the warp, it can be subsequently modified by means of a second OMD (such as head motion, hand motion, or motion of some other body part). See FIG. 16 for an illustration on such an embodiment. Here are the various parameters for this illustrative embodiment—

OOI=Mouse pointer

OMST=Head motion (above OMST TH).

OMD1=Eye gaze (at Warp, and possibly conditionally during Post-Warp Period (PWP))

OMD2=Head Motion (at PWP, possibly conditionally based on OMD1)

ODE=ODE POLA (performed by head). Head motion required to be at or within

ODE POLA TH for two consecutive iterations.

Figure 16:
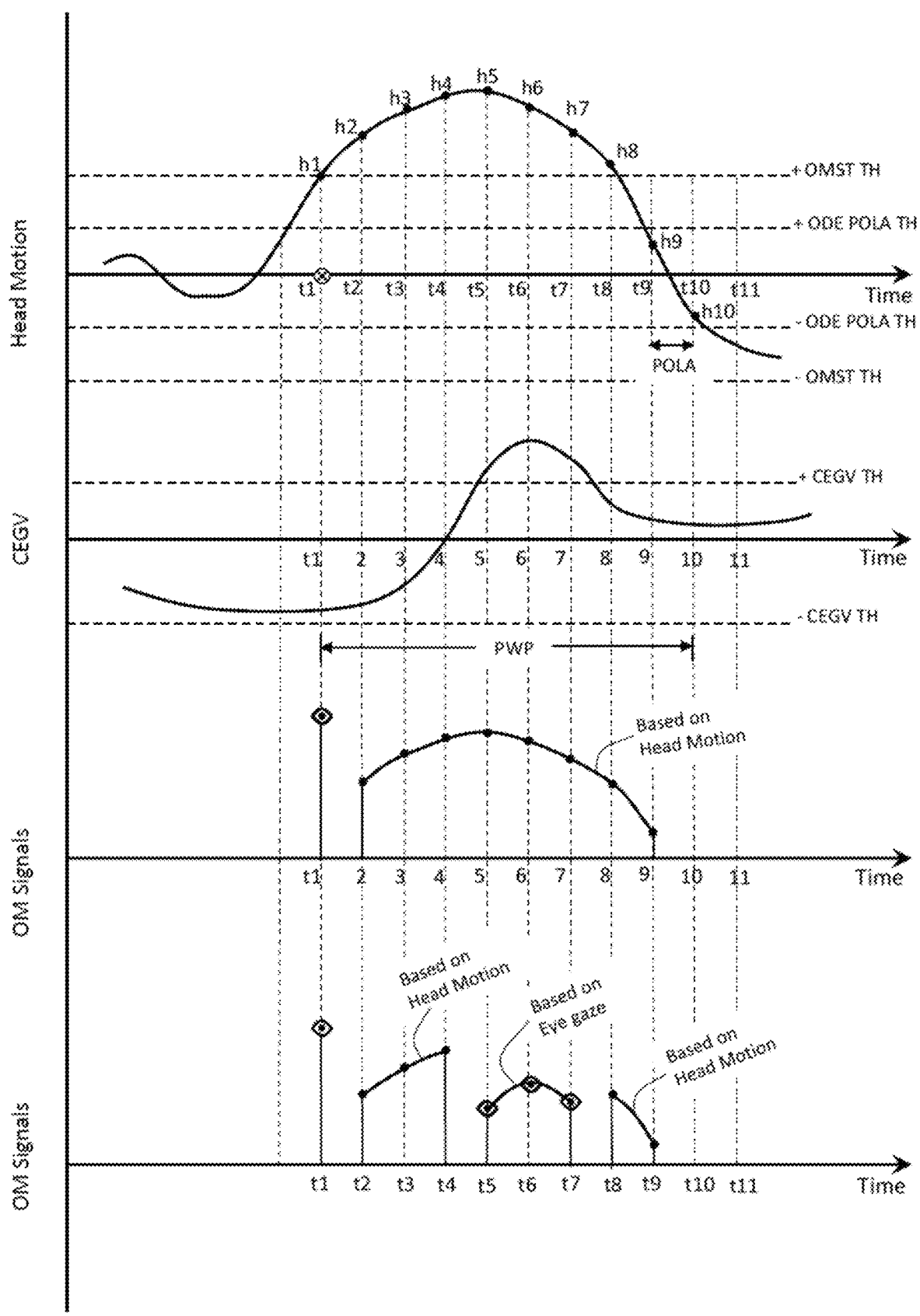
FIG. 16 illustrates an exemplary generation of OOI Modification signals in accordance to Head Motion versus Eye Gaze based on CEGV Threshold, in some embodiments.

The X axis in all of the parts of FIG. 16 represents time. Further, the tick marks on the X axis can indicate the start time of each iteration in the main loop of the control system software/process. The tick marks are shown at constant time intervals for this embodiment indicating there is a constant time interval between two iterations, and possibly also between readings taken from the same sensor during two consecutive iterations. The Head Motion plot of FIG. 16 represents variation of head motion over time. The Y axis can represent head motion which can be based on readings from a sensor sensing head motion. Though there can be multiple sensors providing multiple readings of motion (rotational and translational) along various axes, for purposes of simplicity of illustration (in this as well as all other figures) we are showing only one head motion variation. (Remember, as mentioned earlier that head "motion" can be based on head velocity readings obtained from the motion sensor during a particular iteration, or, it can be head displacement or change in head position detected between the previous and current iteration. Displacement can be converted to velocity given that velocity is displacement divided by time.) The tolerance zone for OMST is shown via the +/−OMST TH lines. The tolerance zone for ODE POLA is shown via the +/−ODE POLA TH lines. The CEGV plot of FIG. 16 shows variation of the CEGV (as measured between two subsequent iterations). Designated threshold on the CEGV is depicted by the +/−CEGV TH lines. The upper OM Signals plot of FIG. 16 depicts representation of OM signals generated in response to head motion (from the Head Motion plot of the figure) and CEGV variation (from the CEGV plot of the figure). It can be seen that while head motion and CEGV values are non-zero most of the time up to time t1, no OM signals are generated. At time t1, head motion readings obtained at that iteration indicate head motion to be at or above the OMST TH. This causes a head warp, that is, the system can generate OM signals to place the mouse pointer (OOI) at the calculated POI (CPOI1). Note that $CPOI_1$ can be calculated based on readings obtained (during the iteration started at time t1) from various sensors that help measure eye gaze of the user. Note that the head motion reading (h1) obtained at iteration of t1 can be ignored in generation of the OM signals at time t1; they can be entirely based on the $CPOI_1$. Starting at t2, however, the generated OM signals can be based only on head motion, until and including iteration at t9 wherein the magnitude of head motion drops below ODE POLA TH but is still positive. At iteration of t10, the magnitude of head motion is still within ODE POLA TH bound, and given that ODE POLA is considered to be complete if head motion is within the POLA TH for two consecutive iterations, the generation of OM signals can be brought to an end at this iteration. Therefore, generation of OM signals can be suppressed starting at t10 until possibly another OMST is encountered in the future. Note that while the OM signals generated at t1 can place the OOI precisely at CPOI1, signals generated at t2:t9 can be generated purely on head motion signals. Given that head motion signals can represent incremental head displacement experienced from iteration to iteration, the OM signals generated during t2:t9 can (incrementally) displace the OOI by an amount proportional to the measured displacement at a particular iteration (compared to the location of the OOI during the previous iteration). For example, the location of the OOI at end of iteration t1 (L1) is equal to $CPOI_1$ (due to the warp). At iteration t2, the OOI location (L2) can get updated to $CPOI_1+g(h2)$, where 'g' can be any suitable (gain) function that provides an output displacement value for a given input displacement value. (The gain function can be a simply a constant non-zero multiplication factor.) At iteration t3, the OOI location L3 is set to L2+g(h3) and so on, until iteration t9 where L9=L8+g(h9), and at iteration t10, L10 can be equal to L9 (or equal to L9+g(10)). Starting at t11, however, given that a valid ODE POLA can be considered to be detected by end of iteration t10, generation of OM signals can be suppressed starting at t11, indefinitely till possibly another OMST is detected. Note: the time period t2:t10 can be called a Post Warp Period (PWP) (where OM signals can be generated in response to designated OMD(s)). It can start right after OMST is encountered and it can end upon occurrence of an ODE.

Note that in the above embodiment, as seen in the upper OM Signals plot of FIG. 16, no consideration is given to the value of CEGV during the Post Warp Period in generation of the OM signals. However, in a variation as shown in the lower OM Signals plot of FIG. 16, the choice of OMD to use for generation of OM signals is based on the eye gaze signals. As shown in the lower OM Signals plot, when the eye gaze signals indicate CEGV value greater than or beyond a designated CEGV threshold at any particular time (iteration) in the PWP period, the generated OM signals can be in accordance to only the eye gaze signals (and without regard to the amount of head motion indicated by head motion signals). That is in this situation, the OM signals can place the OOI directly at the calculated CPOI obtained at that iteration, in effect ignoring the head motion readings obtained at that iteration. Therefore, while (similar to variation in the upper OM Signals plot), $L2=L1+g(h2)$ $L3=L2+g(h3)$ $L4=L3+g(h4)$ during time t5:t7, when CEGV is beyond CEGV threshold, location of OOI can be in accordance to the eye gaze (in effect ignoring head motion readings), as follows $L5=CPOI_5$ $L6=CPOI_6$ $L7=CPOI_7$ And then during t8:t9, because CEGV is within the CEGV threshold, OM signals can be based on head motion OMD (in effect ignoring eye gaze readings during those iterations) as follows $L8=L7+g(h8)$ $L9=L8+g(h9)$ And then, at t10, generation of OM signals can come to an end due to detection of a valid ODE at t10, thereby not affecting the position of the OOI at t10 (and leaving it where it was at end of the t9 iteration).

Figure 17:
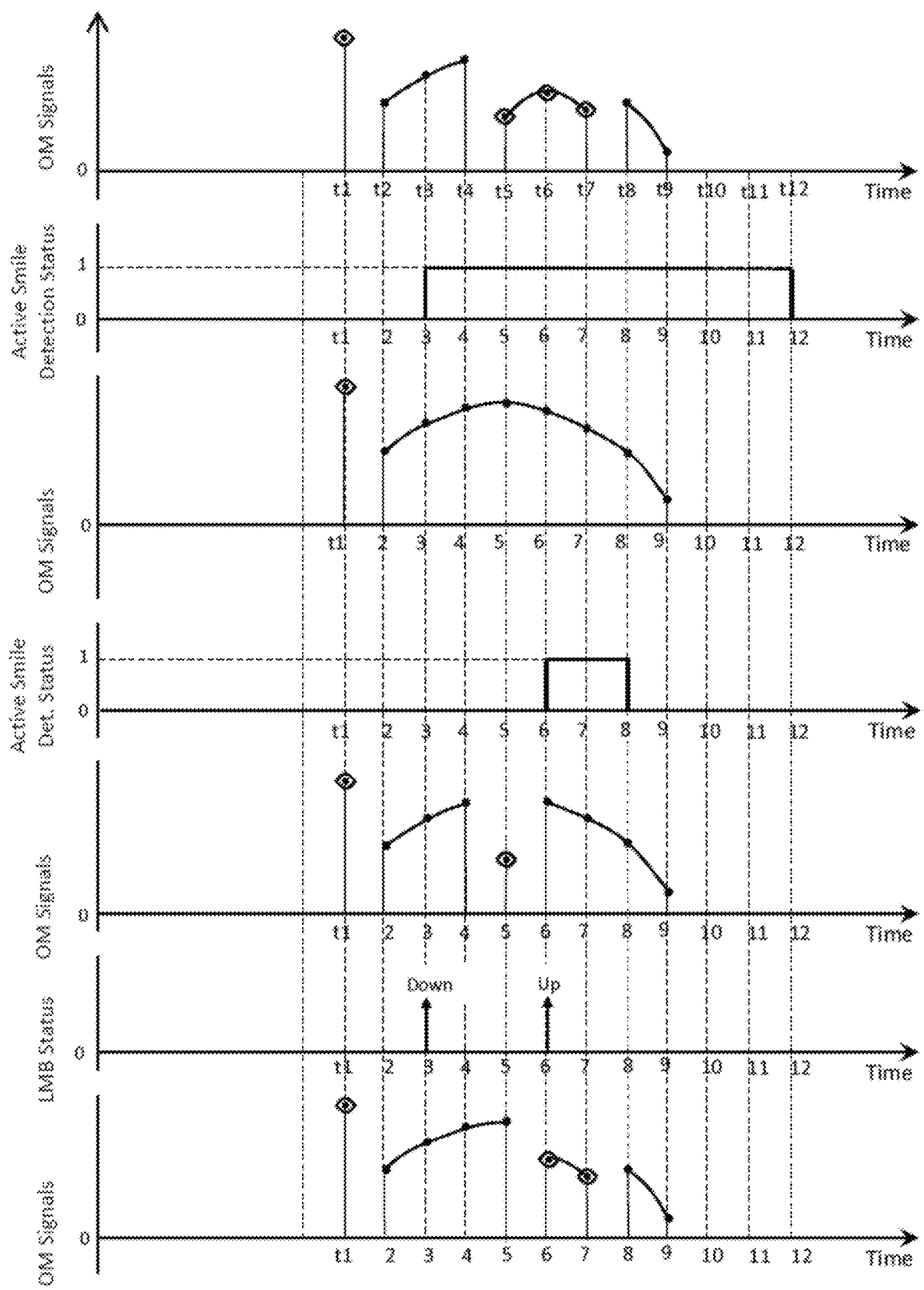
FIG. 17 illustrates an exemplary generation of OOI Modification signals in accordance to Head Motion versus Eye Gaze based on active FE active status and Mouse Button status, in some embodiments.

See FIG. 17 for further variations based on the embodiment shown in the lower OM Signals plot of FIG. 16. The top (first) OM Signals plot of FIG. 17 reproduces the lower OM Signals plot of FIG. 16 for sake of convenience of explanation. The underlying head motion and CEGV plots (corresponding to OM Signals show in the top OM Signals plot of FIG. 17) are also the same as the Head Motion and CEGV plots shown in FIG. 16; however, are not re-illustrated in FIG. 17 (for sake of avoiding redundancy). In one variation, when a designated facial expression is detected to be active, OM signals are only generated with one type of OMD (and the use of other OMD is suppressed). For example, one embodiment can suppress use of eye gaze signals for OM signal generation, during iterations when an active smile is also detected. See the upper Active Smile Detection plot of FIG. 17 for active smile detection status and the second OM Signals plot for corresponding OM signal generation. Note that since active smile is detected during the time period of t3:t12, OM signals are based only on head motion signals during the entire PWP, even though CEGV is beyond the CEGV TH during t5:t7. Therefore, the second OM Signals plot shown in FIG. 17 looks similar to the upper OM Signals plot of FIG. 16 (instead of the lower OM Signals plot of FIG. 16) even though the control system can generate signals based on eye gaze signals when those signals indicate CEGV greater than a designated CEGV threshold. See the second Active Smile Detection plot of FIG. 17 for another plot of active smile detection status, where the smile is shown to be active only between t6:t8. See the third OM Signals plot of FIG. 17 for corresponding OM signals generation. Note that while OM signals at t5 are based on eye gaze signals at t5, they are only based on head motion signals during t6:t8 even though eye gaze signals indicate CEGV greater than CEGV threshold during t6 and t7 as well. In another variation, the suppression of use of eye gaze signals (for purposes of generating OM signals) can be based on presence of other conditions such as press/release status of a mouse button, keyboard key, status of an input mechanism (connected to the controller or controlled device), tensing of a designated muscle, state of a program or in a program running on the electronic device, a voice command to start or stop suppression, level of opening of user's eye, dilation level of user's pupil, or any other suitable user action. The LMB Status plot and the bottom (fourth) OM Signals plots of FIG. 17 illustrate an embodiment that suppresses use of eye gaze in OM signal generation when the left mouse button (LMB) is in pressed state. The LMB Status plot of FIG. 17 shows status of left mouse button (physical or virtual, as perceived by the operating system of the controller device or the controlled device). It shows that the status of the Left Mouse Button is changed to "Down" (or "Pressed") at time t3 and to "Up" (or "Released") at time t6. Therefore, even though CEGV is beyond CEGV threshold during t5:t7, OM signals are generated based on head motion during t5 (when left mouse button state is still "Down"). OM signals are based on eye gaze during t6 and t7 (when left mouse button reverts to "Up" state).

Note: This conditional suppression of eye gaze signals for OM signal generation can allow the user to look around (the display screen or otherwise) when in middle of modifying an OOI via another OMD (e.g. head/hand/finger/arm/any suitable body part motion), using a simple user action that does not interfere with that the operation they might be performing on the controlled device. This is especially useful if the path OOI takes on the display screen is important to the user, e.g. while using a drawing/sketching/painting program, such as Microsoft Paint, on the electronic device, or when playing video/computer game. When engaged in such activities, it may be desirable for the OOI to follow the motion of a body part being used to define the path of the OOI and not be affected by user's eye gaze, at least during certain times during the activity.

CEGV Measurement with Respect to CPOI at Designated Event

As illustrated in FIG. 16 and FIG. 17, some embodiments can measure CEGV between every iteration. That is, CEGV at iteration 'i' can be defined as $$CEGV_i=(CPOI_i-CPOI_{i-1}),$$

where 'i' is the iteration number.

However, in certain embodiments, especially during the PWP, CEGV value at an iteration can be computed to be based on change from a designated event. For example, the designated event can be the last occurrence of warp, last fixation of the eye, last time a designated facial expression was detected to be active, last time the user tensed up a designated body part/muscle, etc. So, for example, for embodiments illustrated in FIG. 16 and FIG. 17, CEGV at an iteration during PWP can be defined as $$CEGV_i=(CPOI_i-CPOI_1),$$

where 'i' is the iteration number and wherein $CPOI_1$ is the CPOI computed at the iteration when warp is detected for the current PWP. That is, "detection of the latest warp" is the designated event for measuring CEGV in the PWP for this embodiment. CEGVs calculated based on or with respect to a designated event (and not with respect to previous iteration) can be called Event Based CEGV (or ebCEGV for short). Therefore, the above equation can be rewritten as—

$$ebCEGV_i=(CPOI_i-CPOI_1),$$

where 'i' is the iteration number and wherein $CPOI_1$ is the CPOI computed at the iteration when warp is detected for the current PWP.

Figure 18:
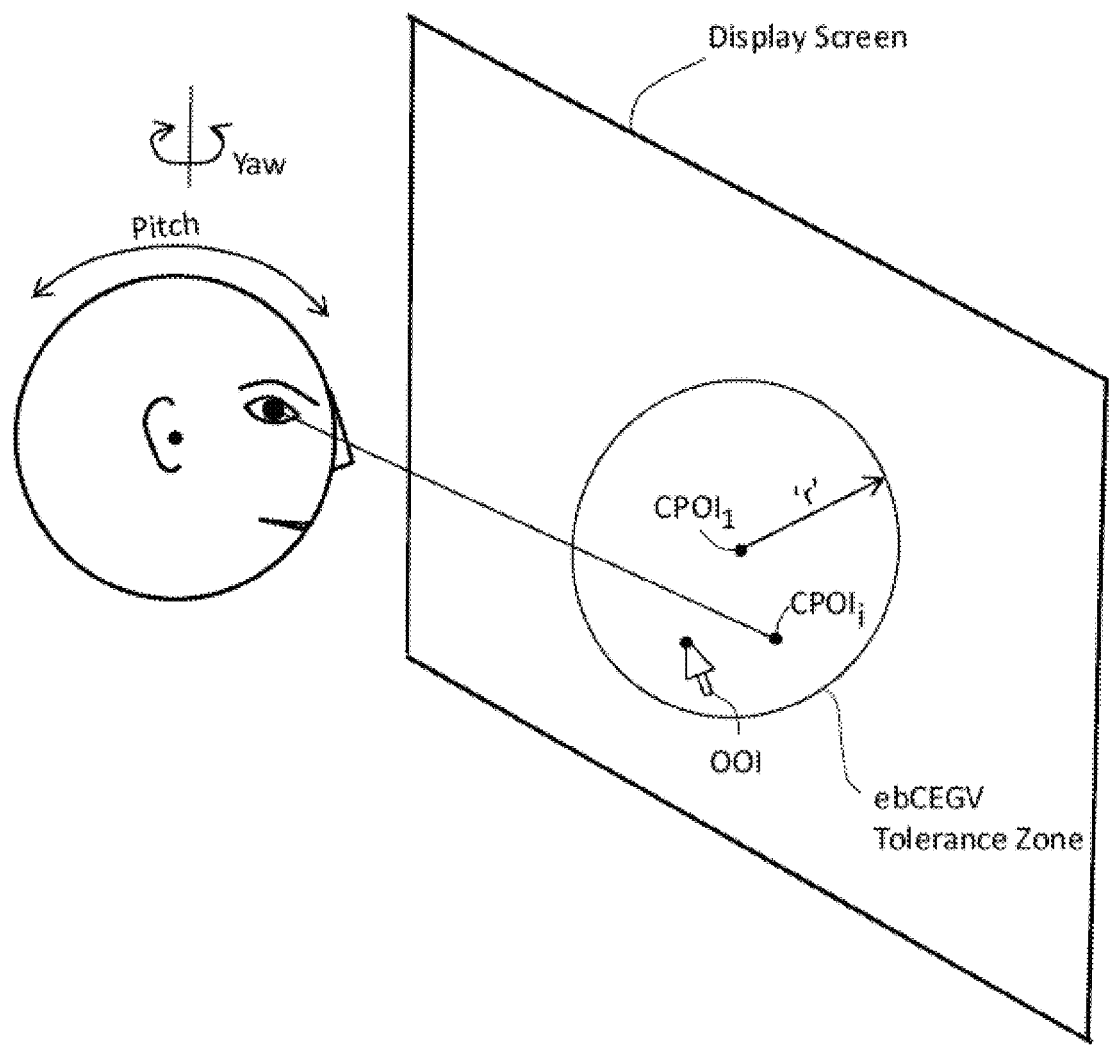
FIG. 18 illustrates an exemplary ebCEGV Tolerance Zone, wherein designated event is the last OOI Warp and the ebCEGV Tolerance Zone is centered around CPOI at the designated event.

See FIG. 18 for an illustration of such an embodiment. Parameters of this embodiment are as follows—
OOI=Mouse pointer
OMST=Head motion (above a specified OMST TH).
OMD1=Eye gaze (at Warp, and possibly conditionally during PWP)
OMD2=Head Motion (during PWP, possibly conditionally based on OMD1)
ODE 1—ODE POLA (performed by head). Head motion required to be at or within ODE POLA TH for two consecutive iterations.
ODE 2—ebCEGV during PWP exceeding a specified ebCEGV TH (wherein designated event for ebCEGV is latest warp)

FIG. 18 shows schematic representation of ebCEGV tolerance zone for the above embodiment. Point $CPOI_1$ (on the display screen) represents the CPOI at warp time. The CPOI for current iteration 'i' is displayed as point $CPOI_i$. The circle with radius 'r' (where 'r' is equal to ebCEGV TH) centered at $CPOI_1$ represents the tolerance zone established for the current PWP. In this embodiment, as PWP starts, if the CPOI stays within the tolerance zone, head motion is continued to be used to further modify the location of the mouse pointer (i.e. OM signals are generated based on head motion signals). If the user happens to perform ODE 1 (that is POLA using head motion) while maintaining the POI/CPOI within the tolerance zone circle, then the PWP can come to an end leaving the OOI at the last location. However, this embodiment also has a second ODE (ODE 2) designated, which is defined which is based on the CEGV. As per ODE 2, this PWP can terminate if at any iteration (during PWP) the ebCEGV (as measured with respect to $CPOI_1$) is greater than the ebCEGV TH. That is, if the CPOI for a particular iteration during the PWP happens to fall outside the tolerance zone circle, then that can also lead to ending of OM signal generation based on head motion. In a variation of this embodiment, when a current PWP is ended based on ebCEGV exceeding ebCEGV TH (i.e. based on ODE 2), that can be also treated as start trigger of a new warp wherein the OOI can be placed at the latest CPOI (that was computed during the iteration that detected the ODE 2). After the occurrence of this ebCEGV based warp, a new PWP can be started which can be terminated by ODE 1 or ODE 2. If the new PWP is terminated by ODE 2, then yet another warp can be started followed by yet another PWP, and the process can continue indefinitely. Therefore, this embodiment can be viewed as having two OMSTs as follows—
- OMST 1=Head motion (above OMST TH)
- OMST 2=PWP of the previous warp terminated based on ebCEGV (during that PWP) exceeding ebCEGV TH (when measured from CPOI at the time of the previous warp).

Note: When multiple OMSTs or ODEs are specified for an embodiment, by default detection of OMST or ODE is sufficient, unless description of an embodiment explicitly calls out for multiple OMSTs or ODEs to be detected at once.

Note: A visual representation of tolerance zone can be provided on the display screen (as feedback to the user) in any/all of the embodiments.

In another variation, the designated event for determining ebCEGV during PWP can be motion of the OOI. That is, at any iteration, the CPOI can be compared with the latest coordinates of the OOI. This would mean that if the OOI was moved/modified in the previous iteration, then ebCEGV at iteration 'i' would be $$ebCEGV_i = CPOI_i - L_{i-1}$$

where $L_{i-1}$ is the location of OOI at iteration (i−1).
Or we could simply say that ebCEGV for this embodiment can be defined as $$ebCEGV_i = CPOI_i - L$$

where L is the location of OOI at the start of current iteration. This variation is similar to the previous, with the difference that the tolerance zone circle is placed around the latest location of OOI and it keeps on moving after every iteration wherein the OOI is moved. See FIG. 19 that shows illustration of this embodiment. This figure is similar to FIG. 18, with the notable difference that the tolerance zone circle is centered around the latest location of OOI (Point L). Therefore, as OOI is modified by OM signals generated during PWP, the tolerance zone circle keeps on updating accordingly. In effect, as long as the user keeps on looking within the circle, OM signals are generated based on head motion. However, if the user looks outside of the circle, then triggers an ODE 2 (as explained in the previous paragraph). This constant update of the center of the tolerance zone to the latest location of the OOI can be beneficial to users because during the PWP process the OOI may have drifted (gotten modified) far away from CPOI1, thereby causing a higher likelihood of triggering ODE 2 and thereby unintentionally triggering a new warp (which can cause an unintentional sudden jump of the OOI to the latest CPOI location).

Figure 19:
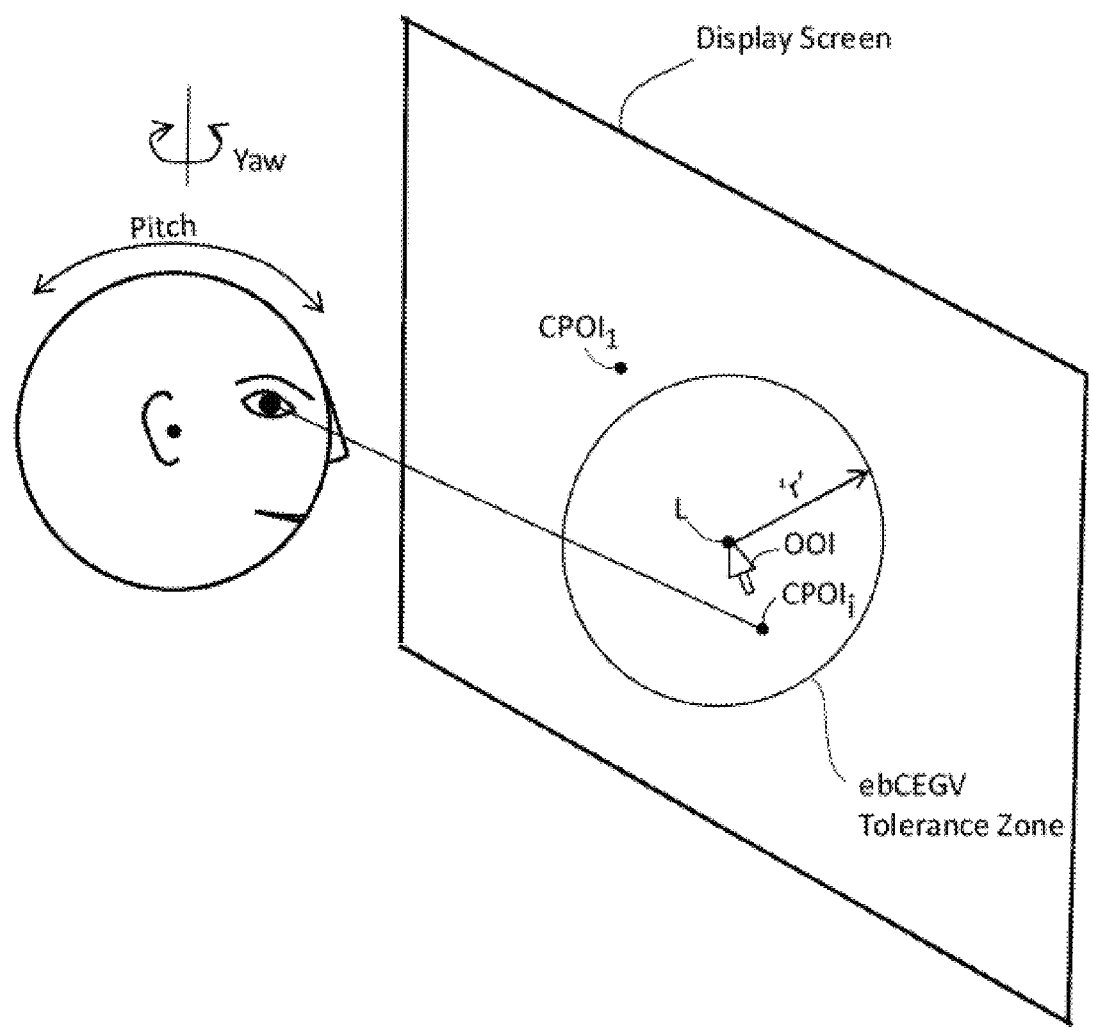
FIG. 19 illustrates an exemplary ebCEGV Tolerance Zone, wherein designated event is motion of OOI and the ebCEGV Tolerance Zone is centered around the last location of the OOI.

In an embodiment that can be viewed as a superset of the embodiment from FIG. 19, the ebCEGV (based on L) heuristics can be used not only during a PWP, but always. Here are some illustrative parameters for this embodiment—
- OOI=Mouse pointer
- OMST 1=Head motion (above a specified OMST TH).
- OMST 2=ebCEGV based on L (the latest location of OOI) exceeding ebCEGV TH
- OMD1=Eye gaze (at Warp, and possibly conditionally during PWP)
- OMD2=Head Motion (during PWP, possibly conditionally based on OMD1)

Eye gaze motion/displacement used=$ebCEGV_i$=
  ($CPOI_i - L$) for iteration $i$.

(That is, eye gaze motion at any iteration is measured based on difference between current CPOI and the last value or location of OOI)
- ODE 1—ODE POLA (performed by head). Head motion required to be at or within ODE POLA TH for two consecutive iterations.
- ODE 2—ebCEGV based on L (the latest location of OOI) exceeding a specified ebCEGV TH.

Note that the above parameters do not reference a PWP. This means that OMST 2 can be detected (thereby triggering a warp) even when there is no PWP in progress. Further, any warp can be brought to an end by simply looking away from L, the latest location of OOI (by more than ebCEGV TH).

Note that as mentioned before, each of the OMSTs designated for this embodiment can be used independently of each other for full effect. Similarly, each of the ODEs can also be used independently of each other.

Note: Given that there is no reference to PWP, some variations can drop OMST 2 but retain OMST 1 as the only OMST, but also retain both ODEs.

In a variation of the above embodiment, the two OMSTs can be made dependent on each other for them to take effect (in triggering a warp). Or in other words, they could be combined together to form one OMST as follows.
- OMST=Head motion (above a specified OMST TH) provided that ebCEGV based on L exceeds ebCEGV TH (at the same time)
- OMD1=Eye gaze (at Warp, and possibly conditionally during PWP)
- OMD2=Head Motion (during PWP, possibly conditionally based on OMD1)

Eye gaze motion/displacement used=$ebCEGV_i$=
  ($CPOI_1 - L$) for iteration $i$.

(That is, eye gaze motion at any iteration is measured based on difference between current CPOI and the last value or location of OOI)
- ODE 1—ODE POLA (performed by head). Head motion required to be at or within
- ODE POLA TH for two consecutive iterations.
- ODE 2—ebCEGV based on L (the latest location of OOI) exceeding a specified ebCEGV TH.

Figure 20A:
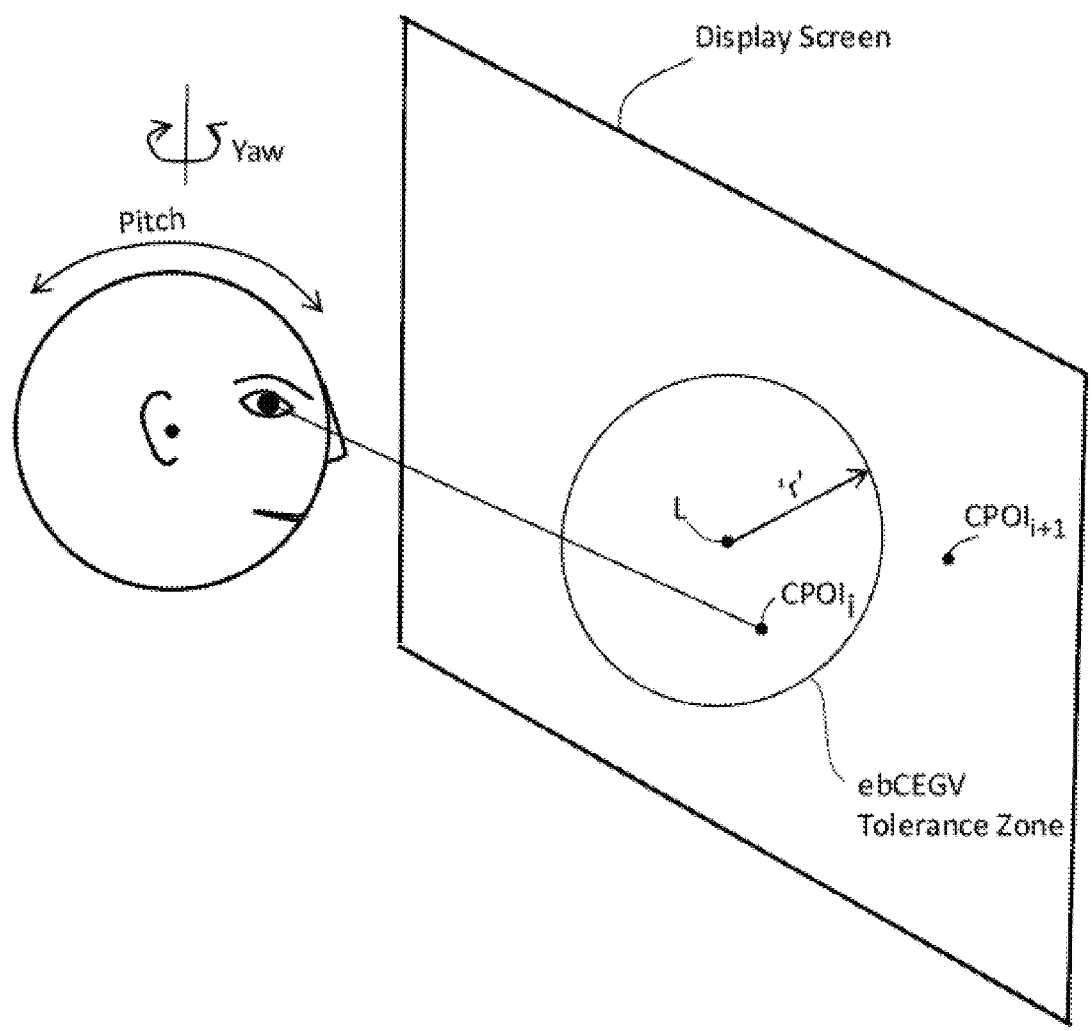
FIG. 20A illustrates an exemplary ebCEGV Tolerance Zone, wherein designated event is motion of OOI and the ebCEGV Tolerance Zone is centered around the last location of the OOI and wherein the OOI Warp Start Trigger is based on combination of Head Motion and Eye gaze, and in particular shows the CPOI (Calculated Point of Interest) for iteration 'i+1" is outside the ebCEGV Tolerance Zone.
Figure 20B:
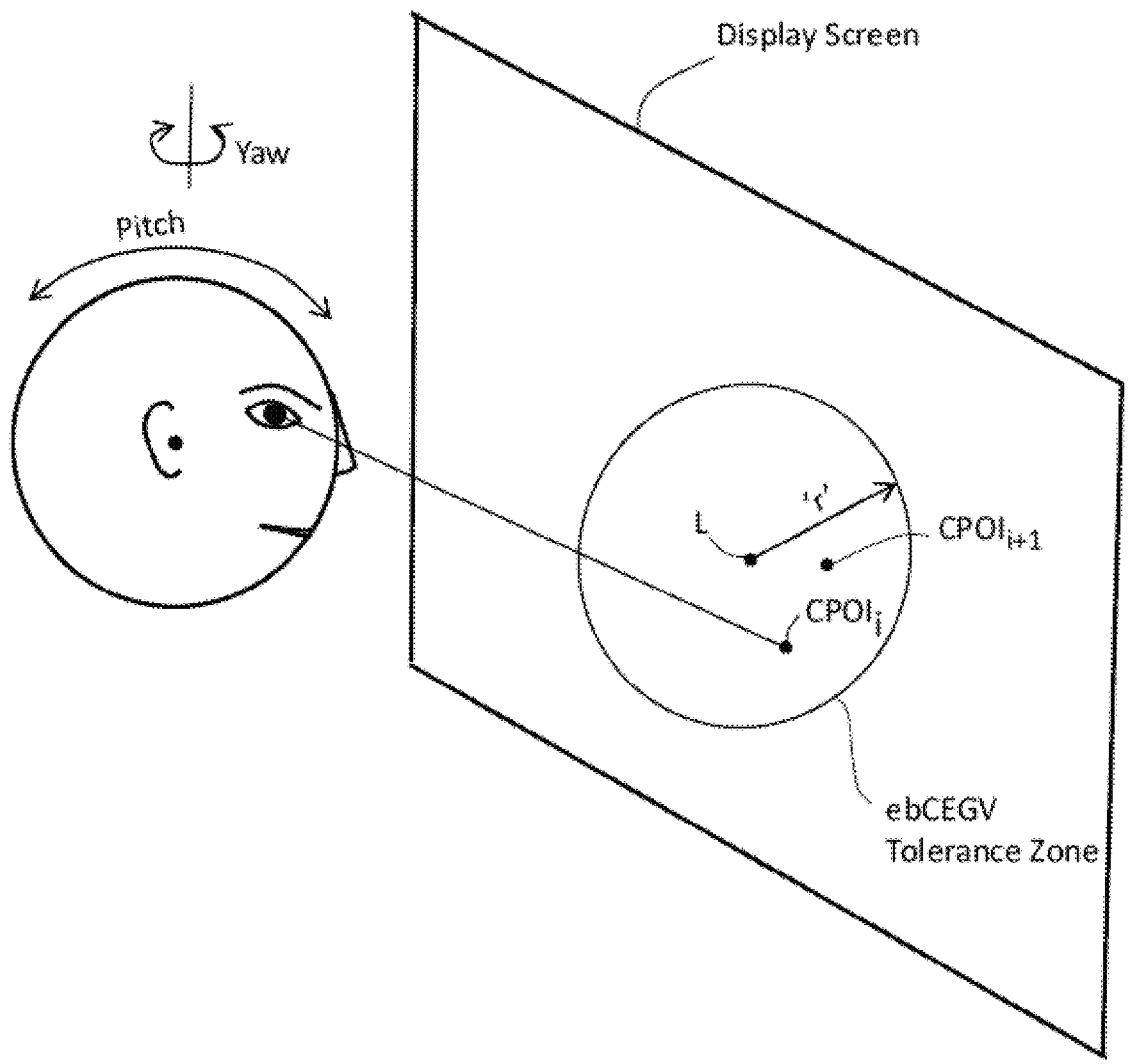
FIG. 20B illustrates an exemplary ebCEGV Tolerance Zone, wherein designated event is motion of OOI and the ebCEGV Tolerance Zone is centered around the last location of the OOI and wherein the OOI Warp Start Trigger is based on combination of Head Motion and Eye gaze, and in particular shows the CPOI for iteration 'i+1" is within the ebCEGV Tolerance Zone.

See FIGS. 20A and 20B for an illustration of this embodiment. It shows OOI at point L on the display screen and the ebCEGV tolerance zone circle centered around L. In FIG. 20A, the eye gaze shifts to CPOIi+1 during iteration i+1, but if the head motion stays within OMST TH, then there will not be a warp triggered at iteration i+1, and the system can keep generating OM signals according to head motion. However, if the head motion also happened to exceed OMST (at iteration i+1), then that can trigger a warp that would move the OOI to $CPII_{i+1}$. In FIG. 20B, CPOIi+1 is shown to be within the tolerance zone circle. Therefore, regardless of whether head motion at i+1 exceeds or stays within the OMST TH, the system may not trigger an OOI warp based on the above defined OMST. This embodiment can thereby provide additional flexibility to the user to look around as the OOI is being actively modified, but also give them a predictable way of triggering a warp.

Note: The designated event for ebCEGV calculation can be any user action including detection or termination of an active facial expression, a hand gesture, a vocal command, entering a meditative state, pressing a keyboard key, adaptive switch button or mouse button, moving the mouse by hand (or some other mechanism) in middle of a PWP, tensing a designated muscle, etc.

Warp and Post Warp Phases—Further Variations

As seen in previous paragraphs, the warping concept can be very useful in systems where eye gaze is an OMD (or at least one of the OMDs). That is, in such systems, the OOI can be affected by the eye gaze (DEG/POI/CPOI) of the user at least some of the time. In traditional systems using eye gaze as OMD, the control system can either have the OOI be continuously modified by the eye gaze OMD, or they require the users to go through a multi-step process to activate or deactivate the modification of OOI via eye gaze. The continuous modification of OOI can get annoying (due to unintentional modification of the OOI) and the multi-step process for activating/deactivating OOI modification can get cumbersome. The concept of OOI warping can allow for indication of user intent (for starting to modify the OOI via use of user's eye gaze) in a simple and reliable fashion. However, warping the OOI can be only the first step in what the user may intend to do. Given the inherent inaccuracies in eye tracking systems (which cause CPOI not to be exactly at the POI of the user), typically further adjustment of the OOI may be required to attain the user intended modification of the OOI in a precise fashion. Therefore, the overall process followed by the user can be considered to have two phases—Warp step and a Post-Warp phase. Large but possibly imprecise modifications of OOI can be achieved via eye gaze in the warp step, and the subsequent fine modifications can be achieved in a post-warp phase. See following paragraphs for explanation of the two phases and variations possible.

Warp Phase:

Warp phase is when an OOI, which may not be actively being affected by eye gaze, is instantaneously modified in accordance to the user's eye gaze upon detection of performance of a designated start trigger by the user. This designated start trigger (aka OOI Modification Start Trigger, or OMST for short) can be a designated sequence user actions performed by the user for initiating OOI modification. The OMST can be a combination of variety of user actions including (but not limited to) motion of a body part, performing a facial expression, tensing of a designated muscle in the body, pressing a button, touching a touch sensitive surface, making a hand gesture, issuing a voice command, blinking an eye, squinting an eye, twitch of a designated muscle (including a facial muscle), tightening of a sphincter, performing a designated mental action (e.g. concentration, relaxation, imagination of a specified physical action such as pushing/pulling/lifting and object, thinking of saying yes or no, etc.), or any other specified user action. (See referenced applications, including U.S. patent application Ser. No. 15/469,456 for additional examples of start triggers meant to initiate OOI modification.) When a start trigger (OMST) is detected by the control system, the control system can start generating command signals to move/modify the OOI in accordance to the eye gaze.

For example, if the start trigger was specified to be motion of the head, upon detection of head motion, the OOI can be modified in accordance to the user's eye gaze. If for example the OOI was a mouse pointer on a display screen, upon detection of head motion (the OMST in this example), the mouse pointer can move to the location of user's eye gaze (POI/CPOI) at the time of detection of the start trigger. If before the OMST was detected the mouse pointer was away from the POI/CPOI, then upon the detection of OMST, it may appear as if the mouse pointer jumped from that location to the POI/CPOI instantaneously (upon the detection of the OMST).

Note: The term "motion" of an object can be interpreted as velocity or displacement of that object measured over a particular time period, e.g. displacement of the object going from one iteration to the next. Note that in a typical control system, the processor can process the output it receives from some/all the sensors during every iteration. These iterations can be started every 'n' milliseconds (i.e. specified time interval between consecutive iterations) or an iteration can start immediately after the completion of the previous iteration. Given that velocity is defined as displacement over time, and displacement is change in position, the term "motion" can be used to imply velocity or displacement or change in position. Therefore, the term "motion threshold" could be interpreted as a velocity (magnitude) threshold or a displacement threshold wherein the displacement is measured between two consecutive iterations or between a pair of specified events. For example, the pair of specified events could be the end of the last PWP (see following paragraphs for explanation of PWP) and the start of current Warp phase. Another example of pair of specified events is detection of the last OMST and acquisition of latest motion or position readings from an appropriate sensor. Some embodiments can use the mean or median of the sensor readings made over the specified amount of time immediately before the current iteration, and so on.

Time and magnitude bounds as well as direction requirements can be specified for any of the user actions before those user action can be considered to be valid start triggers/OMSTs. For example, if head motion was the specified start trigger, then the control system can require the head motion of be of at least a specified minimum magnitude. Some systems can further require the head motion (of specified minimum magnitude) to be maintained for at least certain minimum duration of time, possibly continuously (or alternatively on an average or other suitable measure, over the time period of specified minimum duration), before the head motion can be considered to be a valid start trigger.

Some systems can impose a requirement that the body/head motion be in the direction of the POI/CPOI. For example, only those head motions that lead to a decrease in the angle between DEG and DHP can be considered to be valid start triggers. Therefore, even though the user moved the head in such a way that the magnitude of the motion was higher than the specified minimum start trigger magnitude, and that motion was maintained for at least the specified minimum start trigger duration, if the motion was such that the angle between DEG and DHP was increasing, then that head motion can be ignored by the system and the warp process may not be started.

Note: The minimum magnitude threshold for the body actions (for them to be considered valid start triggers) can be set to minimum detection threshold of the sensor(s) sensing those body actions. That is, the moment the body action is detected by the sensor, it could be considered to have met the minimum magnitude requirement. However, it can be advantageous to set the minimum magnitude threshold to be much higher than the minimum detection threshold of the sensor, as this can allow for user convenience. For example, if head motion was the start trigger, and the minimum detection threshold of the head motion sensors was 0.1 degrees/second (angular velocity), however, if the minimum magnitude threshold (for start trigger purposes) was set to 5 degrees/second, then the user could find it easier to hold their head "steady" for extended periods and thereby avoid unintentional head motions from triggering OOI warps. In other words, given that many users can find it difficult to hold a monitored body part (e.g. head) extremely steady, if the minimum magnitude threshold (for a body action used for OMST) was set too low (such as close to or equal to the sensor's minimum detection threshold), then that would lead the system to frequently detect performance of OMST, leading to frequent modifications of the OOI without the user's intention to do so, leading to the annoyance that we are trying to remedy in the first place. Therefore, it can be advantageous to set various thresholds (OMST, active facial expression, etc.) to much higher values compared to the sensor minimum detection threshold of respective sensors. Further, a user mechanism can be provided to the user to set these thresholds based on their preference, explicitly or implicitly. The explicit method can involve where the user can set a numerical value of a threshold. An implicit method can involve doing a calibration where the system can figure out a suitable threshold value.

See Table 4 from the referenced U.S. patent application Ser. No. 15/469,456 for some illustrative examples of OMSTs. As mentioned in the reference application, the "P" motion can be substituted by Y or R, or can be replaced by any combination of P, Y and R motions. Further the head motions can be replaced by motions of any other body part, and any designated combinations of the basic motions (of head or any designated body parts) can be used as the start trigger. Note that designated configuration of body parts can also be used as start triggers. For example, holding an arm out with the hand in a pointing configuration (using a stretched index finger but other fingers in a closed first configuration), and so on.

Embodiments of the control systems can use different combinations of the time, magnitude and direction requirements on the start trigger actions. They can also use variety of velocity, displacement or position thresholds. Other suitable requirements on start triggers can also be further specified. For example, a system can require the user to hold their breath when performing the start trigger gesture.

Post-Warp Phase/Period (PWP):

Once the OOI warp is performed (based on detection of a designated OMST, and the OOI possibly instantaneously being modified as per the eye gaze), the Post-Warp Period can be considered to start immediately afterwards. The PWP can be considered to be started following the iteration in which performance of a valid OMST was detected. Note that commands signals to modify the OOI in accordance to the eye gaze (DEG/POI/CPOI) can be generated in the same iteration that detected the OMST. Once the PWP is started, it can last until the end trigger (for ending generation of OM signals at the end of PWP) is detected. There are several options on what control systems can do during the PWP.

Figure 21:
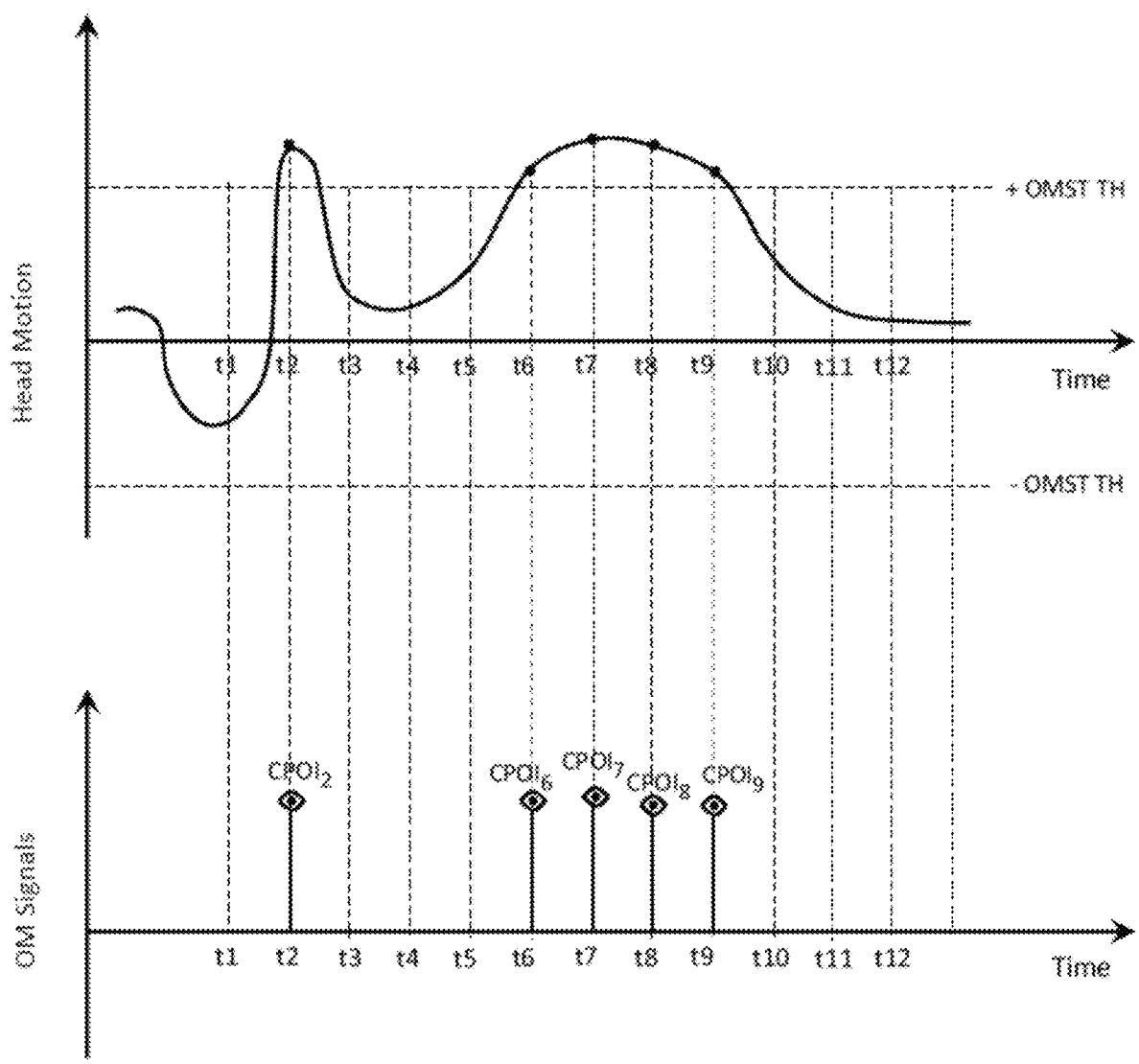
FIG. 21 illustrates an exemplary Head Motion and corresponding OOI Modification Signals based on the principle of OOI warping, wherein there is no Post Warp Period.

Option i: The control system can stop generating any further command signals (to modify the OOI), possibly immediately after the warp, and it can simply wait for the next occurrence of a designated OMST (to again start generating any command signals to modify the OOI) or look for some other user action. In effect, in this variation, it can be considered as if the PWP did not even exist (or as if the PWP was of zero duration). If in an embodiment the OMST was head motion (above head motion threshold), then the OOI can lay unmoved on the display screen until the user moved their head (by at least the designated OMST TH value), and at that point the OOI can shift to the CPOI at the time the valid OMST was detected. And right after that the OOI can stay at that location until the user repeated the warp process (by moving their head again). See FIG. 21 for an illustration of this. The Head Motion plot of FIG. 21 shows head motion plotted against time, and the OM Signals plot shows generation of OM signals in response to OMST. At time t2, head motion is shown to exceed the OMST TH; that triggers a warp causing the system to generate OM signals based on CPOI2. However, the head motion signals are shown to fall within the +/−OMST TH zone during t3:t5 so no OM signals are generated at that time. Between time period t6:t9, head motion signals are shown to be beyond the OMST TH so OM signals can be generated for each of those iterations (wherein the signals are in accordance to the CPOI computed at those iterations). It can be considered as if there was a new OOI warp detected for each iteration in the t6:t9 period, though to the user it may feel as if the OOI is following their eye gaze continuously during that time period.

Option ii: The control system can start generating command signals to modify the OOI according to designated user actions (performed by the user during the PWP).

Option ii(a). In one variation, after the initial instantaneous modification of the OOI according to the eye gaze (as part of the OOI warp), the system can continue to modify the OOI (during the PWP) in accordance to the eye gaze until a specified end trigger is encountered. As described in the referenced application(s), the end triggers (to end generation of OM signals) can be a variety of user actions. Some of those actions can include performance of a POLA (with head, eyes or suitable body part), blinking, smiling, or other facial expressions, voice command, press or release of a button, touch of a touch sensitive surface, tensing of a muscle, changing the mental state, etc.

In one variation, the end trigger can be a POLA (dwell or hover action) performed with the eye gaze, possibly for a minimum specified duration of time. That means that after the warp is completed, the OOI can jump in accordance to user's eye gaze and continue to move in accordance to the eye gaze until the user finally holds their eye gaze relatively steady at some point in space (wherein the steadiness can be measured based on a specified amount of positional/angular tolerance on the eye gaze and possibly a minimum amount of time could be specified for which the eye gaze has to be held continuously steady). Upon occurrence of the specified end trigger, the generation of OM signals can come to an end and then the system can resume to look for the next occurrence of the start trigger to restart the OOI warp and post-warp process. Note: Fixation of eye gaze can also be considered to be a POLA and thereby be used as an end trigger to bring the PWP to an end.

In a variation, the end trigger can include a facial expression such as squinting the eye, raising an eye brow, smiling, opening the mouth, twitching or tensing a facial muscle, or any other suitable facial expression.

Note that magnitude and time bound requirements can be specified on any user actions (including facial expressions) designated to be an end trigger.

Option ii(b). In another embodiment, after the initial instantaneous modification of the OOI according to the eye gaze (that is after the OOI warp), the system can continue to generate signals to modify the OOI based on a different user action than just the eye gaze. This different user action can be (1) based on the body part that was used in specification of the start trigger, or (2) based on a different body part/user action that was not part of the start trigger, or (3) based on a combination of eye gaze and a different user action.

Figure 22A:
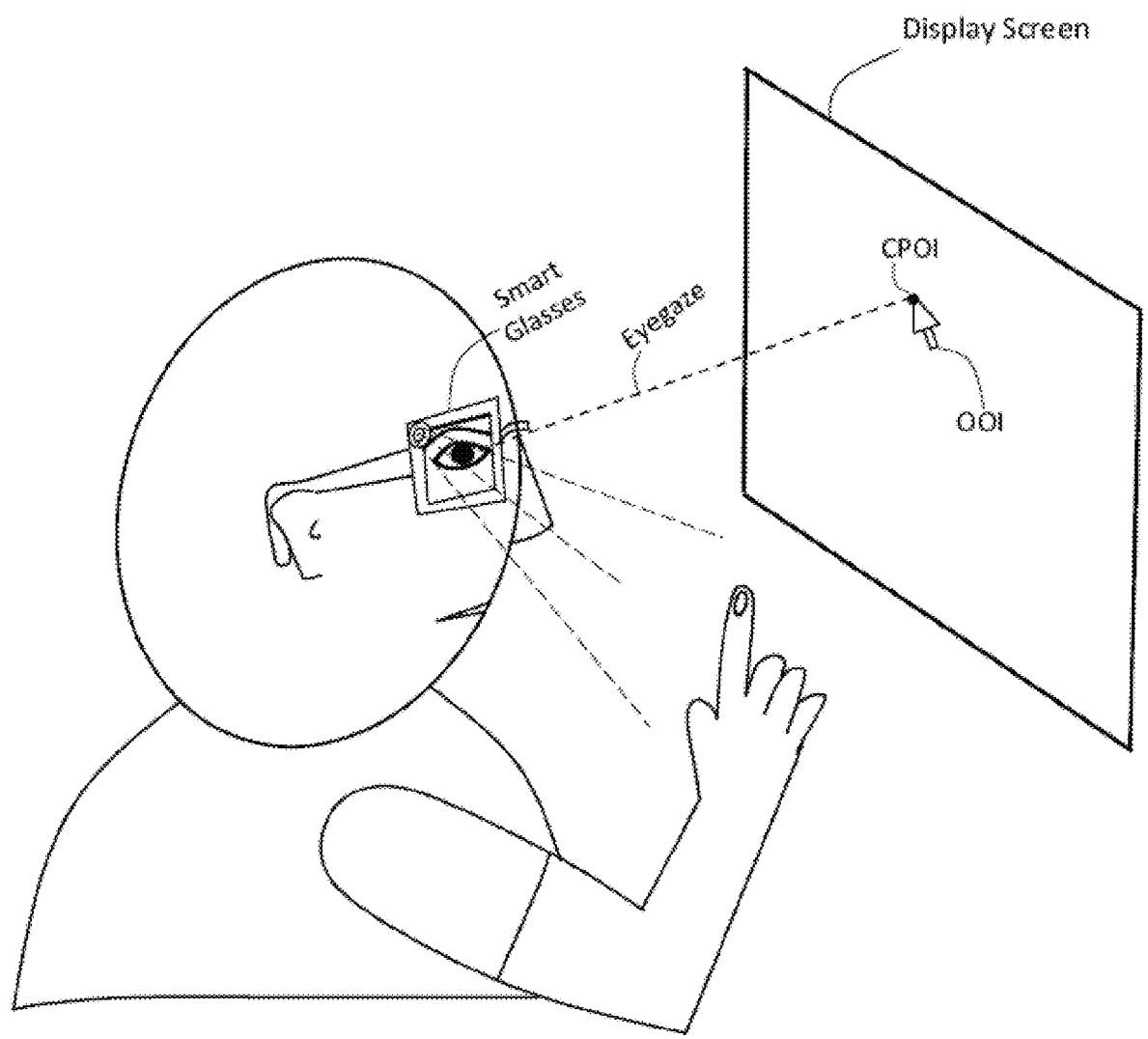
FIG. 22A illustrates an exemplary embodiment where the OOI Warp Start Trigger is based on a Hand Gesture, and wherein OOI Modification Signals during the Post Warp Period are also generated based on a Hand Gesture.

Option ii(b)—Variation 1. In variation (1) above, as an example, if the start trigger is based on head motion, the user action to continue OOI modification in the PWP can also be based on head motion. For example, if the OOI was the mouse pointer, then upon the initial detection of a valid head motion based OMST, the mouse pointer can jump in accordance to the eye gaze CPOI calculated during the iteration when performance of OMST is detected. Alternatively, the pointer could jump to the CPOI calculated at the start of the OMST (note that OMST performance could take multiple iterations if a minimum time bound is specified on performance of the OMST), or some function (e.g. average, median, or some other suitable function) of the CPOIs calculated during the performance of the OMST. During the PWP however, the OOI can start to move according to the user's head motion (instead of eye gaze/POI/CPOI) until the end trigger is detected. In another variation, the OMST can be based on detection of a part of a hand, arm or fingers, possibly in a particular configuration such as making a pointing gesture or a first or some other specified gesture. Once the finger/hand/arm based start trigger is detected, the OOI can jump to the POI/CPOI (which may not be the same point where the user's finger/hand/arm may be located in the field of view of the user or some image sensor) and then continue to be modified in accordance to the finger/hand/arm motion until the occurrence of an end trigger. The end trigger can be based on the same body part/body parts that are used to define the start trigger. So in this example, after the OOI warp, it can continue to move until the finger/arm/hand either performs a POLA and/or changes in configuration. For example, if the start trigger was to hold out a hand in a "pointing with index finger" configuration/gesture, the end trigger could be to bend the index finger so as to make a first/closed hand gesture (with all the fingers bent). See FIG. 22A for an illustration of user making the pointing gesture that can be captured via the eye glass shaped wearable device. The contents of the display show indication of user's eye gaze (CPOI) and the OOI moved to the CPOI (at the time of warp) that was triggered by the user making a pointing gesture with their hand. In this variation, for example, the mouse pointer could be made to move in (linear, square or any other suitable function) proportion to the detected motion of a part of the user finger, hand or arm (during the PWP). That is, OOI Motion after the warp could be defined to be equal to a function of measured finger/hand/arm motion/displacement ("Gain Function"). Displacement of OOI during the PWP could be defined by the following equation—

OOI Displacement during PWP=$g(x)$, where g is a Gain Function, and x is Displacement of Finger/hand/arm during PWP.

Figure 22B:
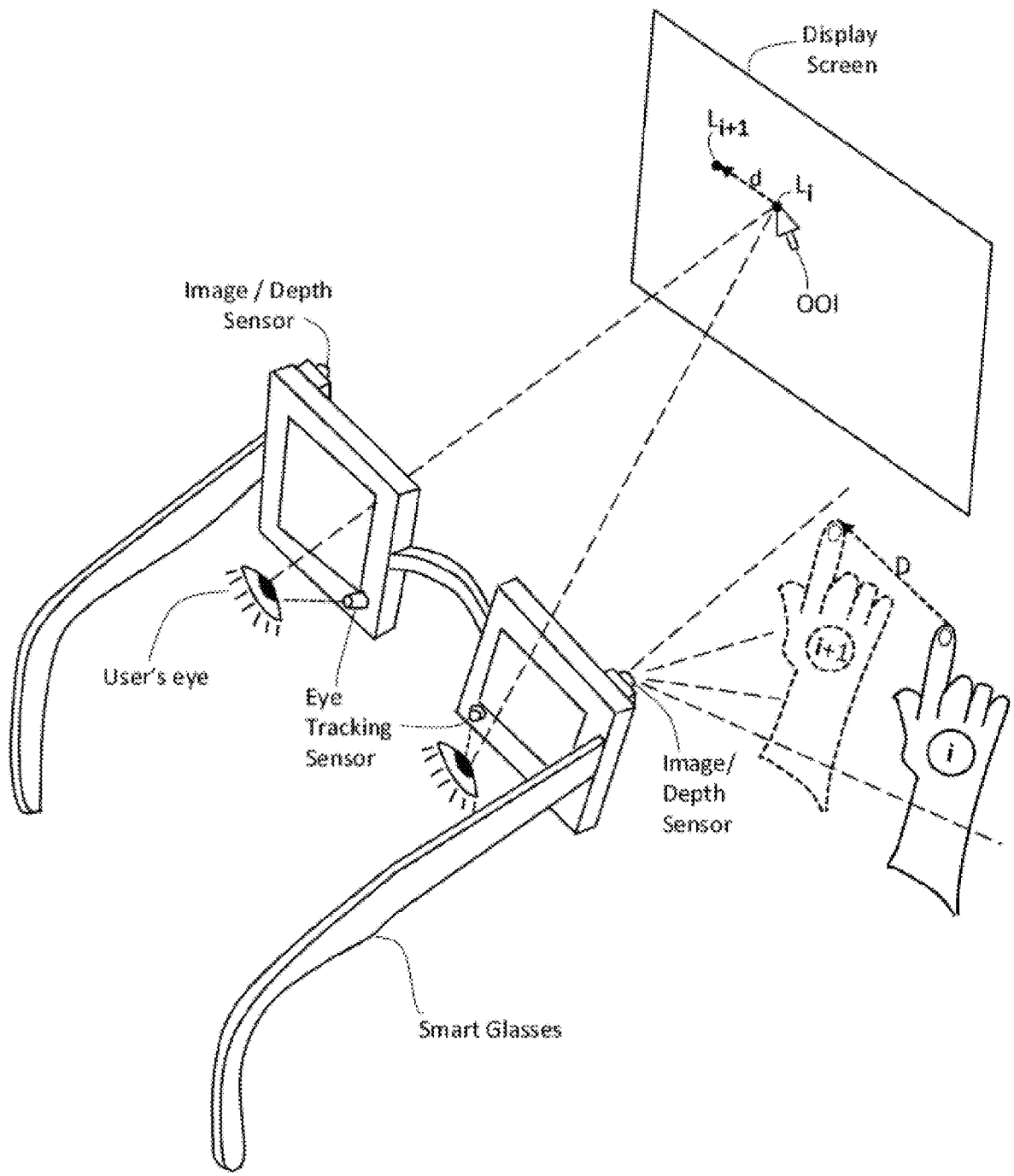
FIG. 22B illustrates an exemplary embodiment where the OOI Warp Start Trigger is based on a Hand Gesture, and wherein OOI Modification Signals during the Post Warp Period are also generated based on a Hand Gesture and shows motion of user's hand between iterations 'i' and 'i+1'.

See FIG. 22B for a more detailed view of the device worn by the user and key elements. The eye glass wearable shows inward facing eye tracking sensors tracking user's eyes to determine the eye gaze vector and/or CPOI on the display screen. Forward facing sensors that can be mounted on the same eye glass wearable are shown tracking the user's hand. The user is shown to be moving their hand by distance 'D' over a time period (such as for example between iteration 'i' and 'i+1') and that is shown to translate the OOI by 'd' over the same time period. Here, $d=g(D)$, as per the above gain function definition.

If the Gain Function is defined such that it outputs values that are lower in magnitude than the provided input (e.g. the finger/hand/arm motion), then any displacements of the finger/hand/arm can result in smaller OOI displacements. In a simple example, the Gain Function could simply multiply the input by a positive constant whose value is less than 1.0 and return that as the output. Such embodiments can give the user ability to fine tune the location of the mouse pointer (using relatively large motions of their hand or body part). Such behavior can be useful if the OOI does not move exactly to the desired location upon the warp, and/or the user desires to move the OOI to a different location after the warp, especially if they want to move the OOI along a particular path or curve; e.g. when playing a video game, using a program such as Microsoft Paint (for creating art), etc. . . . . Furthermore, tying the post warp OOI displacements to a body part (and using a Gain Function as above) can also lead to feeling of smoothness (less shakiness) in control of the OOI in comparison to systems that solely rely on eye gaze or position of a body part such as an extended hand/finger to place or move an OOI. The above disclosed embodiments are an example of systems using multiple OMDs. These principles can be utilized to control Augmented/Mixed/Virtual Reality glasses/wearable displays as well as other computing devices.

Option ii(b)—Variation 2. In variation (2) above, as an example, if the start trigger is based on head motion, the body action to continue OOI modification (after the warp) can be based on motion of another body part, e.g. the user's hand. However, if the hand is not visible (to appropriate sensors) when the start trigger is detected by the system, the post warp OOI modification may not start and the system can start looking for a new start trigger. In a variation, the system may give a grace period (after the detection of the start trigger) to give the user the chance to adjust their body so that the designated part for post OOI warp modifications (i.e. the hand in this example) is visible and/or is detected by an appropriate sensor. Once the hand is detected within the grace period, the system can start generating OM signals in accordance to the motion/displacement of the hand until an end trigger is encountered. In another example of this variation, the start trigger can be eye gaze, wherein the eye gaze is required to be displaced by or change by at least a minimum eye gaze displacement threshold. This change in eye gaze (i.e. eye gaze displacement) can be measured between last eye gaze fixation location and current POI/CPOI, or between the current mouse pointer location and current POI/CPOI, or in some other suitable fashion. The control system can generate signals to place the OOI at the CPOI when it detects the eye gaze based start trigger (i.e. the eye gaze has changed by at least a specified minimum eye gaze displacement threshold value). Immediately after this OOI modification, the system can start generating signals to further modify the OOI based on head motion, until the point that a specified end trigger is detected. After the detection of the end trigger, generation of the post wrap OOI modifications can come to an end, and the system can go back to looking for a new start trigger.

Option ii(b)—Variation 3. In variation (3) above, for example, if the start trigger is based on action of a first body part (which is not an eye ball), the body action to continue OOI modification (after the warp) can be based on the combination of eye gaze and action of a second body part (which is not an eye ball). However, the second body part can be the same or different than the first body part, and the action of the first body part can be the same or different from the action of the second body part. For example, if the first designated body part was head and the designated action of first body part was motion, and the second body part and its action were the same as the first ones, then after the initial OOI modification upon the detection of the start trigger (based on head motion), the system can subsequently continue generating command signals until a designated end trigger is detected. These subsequently generated command signals (during the PWP) can be based on a combination of eye gaze as well as head motion (which is the designated action of the second body part in this example). In some embodiments, as described in referenced U.S. patent application Ser. Nos. 14/897,657 and 15/469,456, OM signals can be generated conditionally based on the amount of change in eye gaze between two events (such as two iterations, possibly consecutive, or any other suitable events). For example, if the change in eye gaze is greater than an eye gaze displacement threshold, the OM signals can be generated based on the eye gaze signals; however, if that is not the case, then the OM signals can be based on head motion instead. Therefore, in such embodiments, when the system is started the OOI (mouse pointer in this case) can be unchanging (or stationary) until the first start trigger is detected (in this case, head motion with magnitude over a designated threshold), wherein the mouse pointer can jump to the POI/CPOI location. However, after this initial jump/OOI warp, the system can keep moving the pointer according to head motion (by generating OM signals) when the change in eye gaze (between consecutive iterations or other specified events) is lower than a specified eye gaze displacement threshold; however, the system can move the pointer based on eye gaze signals (or POI/CPOI calculated based on the eye gaze signals) instead when the eye gaze signals indicate an eye gaze displacement greater than the specified eye gaze displacement threshold. This decision regards to which signals (head or eye gaze) to base the OM signals on, can be made on an iteration by iteration basis, and therefore can change behavior (or state or motion) of the OOI moment to moment. This process can continue until a designated end trigger is detected, at which point the pointer can stop moving (due to cessation of generation of OM signals); then the system can start looking for a new start trigger to repeat this (warp and post-warp) process.

In a variation of the above embodiment, some systems can suppress switching OOI signals to be based on eye gaze signals (even if the eye gaze displacement threshold condition is met) in the PWP if certain other conditions ("Eye gaze Disabling Condition", EDC) are met. Some examples of EDC are presence of an active facial expression (e.g. smile, eye brow raise, sipping or puffing action, biting action, etc.), tensing of muscles of a designated part of the body, press and hold of a mouse button or a keyboard key or an input mechanism, touching a touch sensitive surface, performing any other suitable designated action(s). (This is akin to description of embodiment in FIG. 17) When an EDC is detected to be active, then during that time the system will continue to generate signals for OOI modification based on designated body part motion (e.g. head motion) instead of eye gaze, even if the change in eye gaze may indicate eye gaze displacement greater than the specified eye gaze displacement threshold. However, when the EDC is no longer detected, the system can go back to conditionally generating command signals based on eye gaze or head motion (i.e. the designated body action) during the post-warp period. EDCs can be greatly beneficial to provide freedom to the user to temporarily look around during the PWP when fine tuning the location of the OOI. In a further variation, even if the EDC started before the OOI warp, it can still be considered to be a valid EDC (and thereby prevent use of eye gaze signals for OOI modification) during the post-warp period, as long as the EDC is detected to be active. Other variations can require the EDC to be activated during the PWP for it to be considered a valid EDC.

Hand Warping and Variable Rate of Modification of OOI

Figure 23A:
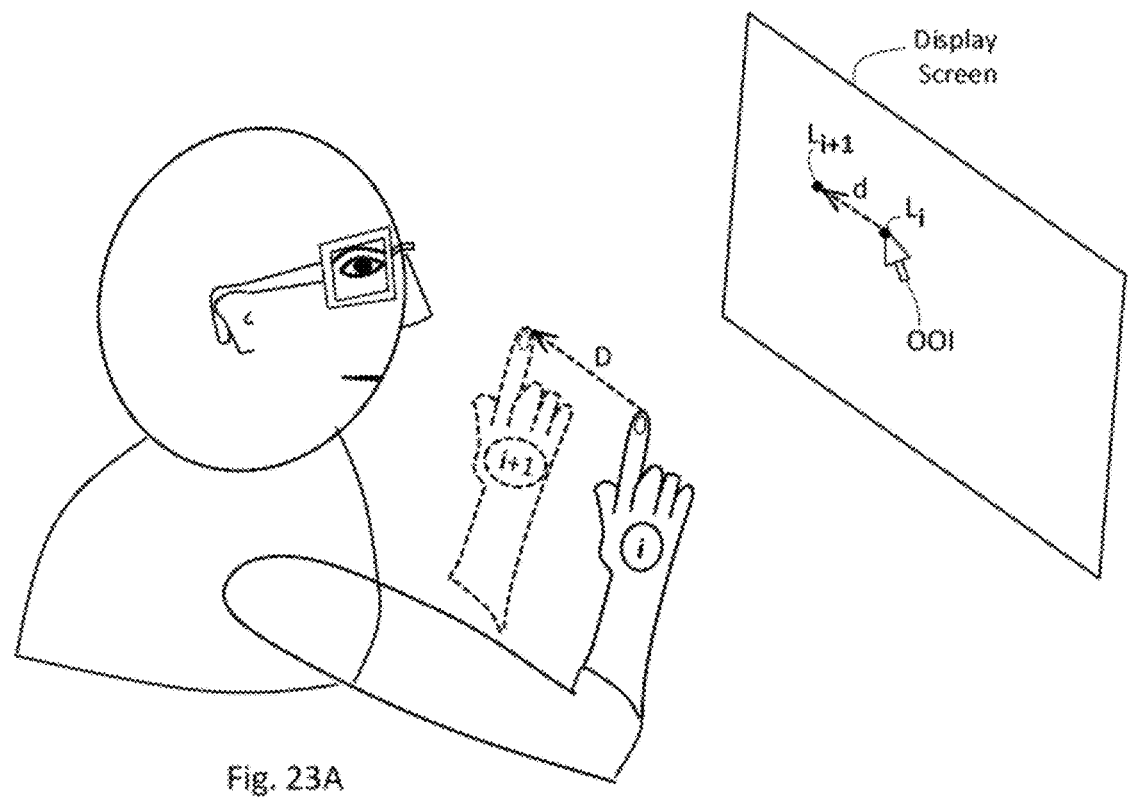
FIG. 23A illustrates an exemplary embodiment using multiple Hand Gestures as OOI Warp Start Triggers and OMD during Post Warp Period.
Figures 23B, 23C, 23D, 23E, 23F:
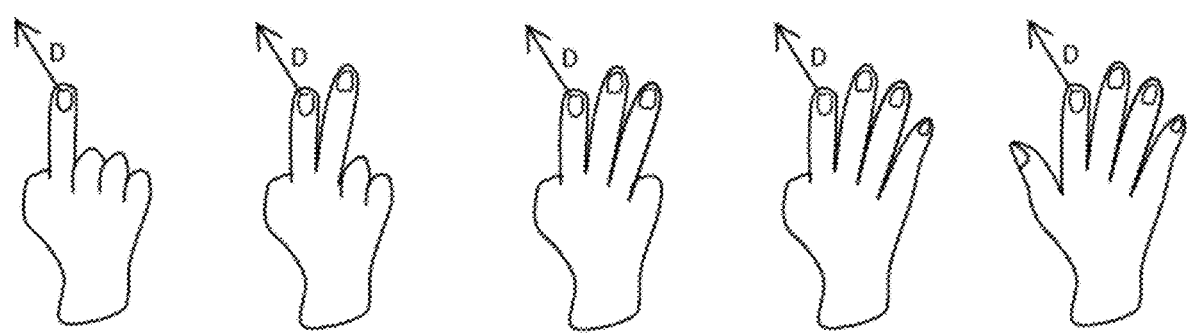
FIG. 23B shows an exemplary formula used to calculate OOI motion when user performs a hand gesture with only index finger raised.
FIG. 23C shows an exemplary formula used to calculate OOI motion when user performs a hand gesture with two fingers raised.
FIG. 23D shows an exemplary formula used to calculate OOI motion when user performs a hand gesture with three fingers raised.
FIG. 23E shows an exemplary formula used to calculate OOI motion when user performs a hand gesture with four fingers raised.
FIG. 23F shows an exemplary formula used to calculate OOI motion when user performs a hand gesture with five fingers raised.

In some embodiments, hand motion can be the designated OMST. Further, hand motion can also be the designated second OMD. Therefore, in an illustrative embodiment where the electronic device is a Augmented Reality/Virtual Reality/Mixed Reality headset, and the OOI is some type of mouse pointer or reticle or a virtual object (possibly displayed on the display screen or projected directly onto the user's retina, etc.) then even when the user is looking around (i.e. eye gaze, the first OMD is changing substantially), the OOI will not follow it unless—(a) the user's hand position is detected by a camera (possibly mounted on the electronic device, (b) the detected hand is moving within a specified range of speed (i.e. within a range of specified min/max speed), and (c) this requisite hand motion is detected to be performed for at least a minimum time period, then the OOI can first jump to the location of the POI (i.e. warping of the OOI), however, after this jump the immediately subsequent changes in the OOI can be accordance to the hand motion (the second OMD) until an ODE is encountered. In another variation, the OMST can be specified to be a gesture performed with the hand, and the second OMD can be motion of the hand. Therefore, for example, the user can be required to perform a pointing gesture (e.g. curling up all the fingers of a hand into a first but with the exception of one finger, such as the index finger as the OMST to cause a warp of the OOI (Gesture Warp). Once the pointing gesture (OMST) is detected (for a minimum specified time period and possibly within a certain distance away from the DEG/CPOI), the OOI can jump to POI/CPOI (i.e. be modified in accordance to the eye gaze instantaneously); however, the immediately following changes (such as displacement) in the OOI can follow the changes (displacements) of the hand (i.e. in accordance to the second OMD), until an occurrence of ODE, after which this process can repeat. These subsequent changes/displacements of the OOI in accordance to the hand motion (second OMD) can be much smaller than the displacement of the hand as observed by the user. That is, if the hand moves by 50 pixels (in the image captured by one of the designated cameras, possibly on the electronic device), the system can move the OOI by only a small fraction, say 5 pixels, possibly in the direction of the hand motion. This way the user can fine tune the placement/movement of the OOI by using large/coarse motions of the hand. This can be very beneficial for applications such as AR/VR/MR, where the user may not be able to hold their hands very steady and/or move their hands very precisely when trying to point or move the OOI steadily or precisely. Some embodiments can change the above displacement factor (i.e. displacement of OOI divided by displacement of the monitored body part such as hand) based on the gesture used for OMST or performance of a designated gesture when OOI modification is in progress using the second OMD. See FIG. 23 for an illustration of how different gestures can affect the relationship between the measured motion/displacement of a body part to displacement/motion of the OOI. FIG. 23A shows the user moving their index finger (while held in a pointing gesture) by 'D' between iterations 'i' and 'i+1'. If the OMST in this embodiment is pointing with the index finger, then the OOI jumps to the location of the CPOI upon detection of that gesture. However, as shown in FIG. 23B, subsequent displacements of the OOI could be smaller by a factor of 10 compared to the displacement of the hand, that is, the displacement factor can be 0.1. However, if the OMST was pointing with two fingers (say index and middle finger) then the displacement factor can be a different number, say 0.2, as shown in FIG. 23C. If the OMST was pointing with three fingers (say index, middle and ring finger) then the displacement factor can be a different number, say 0.3, as shown in FIG. 23D. If OMST was pointing with four fingers (i.e. index through little fingers, all stretched out but the thumb still tucked in), then the displacement factor can be 0.4 (as shown in FIG. 23E); if OMST was pointing with all five fingers stretched out (i.e. first completely opened up), then the displacement factor can be 1.0 (i.e. one to one correlation between the OOI motion and second OMD) as shown in FIG. 23F. In variation, regardless of the OMST used (i.e. number of fingers used for pointing), the displacement factor can be changed by the user by changing the number of fingers being held up while modifying the OOI in accordance to the hand motion. (So, even if the OOI motion was started by the user sticking out their hand with all fingers stretched out, the user can close down a few fingers to change the displacement factor during the rest of the user gesture, till the occurrence of an ODE). Note that some systems can designate the action closing the hand in a first as an ODE. Therefore once the user starts OOI modification by using a pointing gesture and the OOI warps/jumps to the POI/CPOI, they can continue to move the OOI as per the displacement of their hand at different rates by simply changing the number of fingers they hold up during the hand motion and bring the modifications of the OOI to an end by simply closing the hand in a first configuration or another suitable ODE such as a POLA (performed with their hand). Such user gestures can be especially beneficial to users of AR/VR/MR devices.

Today's eye gaze tracking systems have limited accuracy and precision in tracking eye gaze. (E.g. see the paper "Toward Everyday Gaze Input: Accuracy and Precision of Eye Tracking and Implications for Design" by Anna Maria Feit, et. Al from Proceedings of CHI 2017 ACM, May 6, 2017) Control system embodiments described above can make it easy for the user to move the OOI through large distances easily and placing them very accurately at the desired location. This could be performed by having the large or coarse motions of the OOI achieved by eye gaze, and the fine motions (for accuracy of placement) achieved by action of a designated body part (such as motion of head, finger, hand, etc). Furthermore, control systems using the OOI warping principles can provide significant convenience to the user by enabling the user to indicate when the OOI should be modified in accordance to the eye gaze.

Persons knowledgeable in the art can see that the above disclosed concepts/principles can be combined with other concepts/principles described in this or referenced documents.

Alleviating Impact of Eye Gaze Inaccuracies Based on Helper User Actions (HUA):

Some control systems that can use eye gaze for modifying an OOI (that is affected by a controlled electronic device) can use other user actions (including facial expressions) as helper user actions along with eye gaze to alter modification of the OOI. The HUA can cause the control signal to generate "helper signals" that help with modification of the OOI. Following are a few example embodiments and explanations Variation 1.
OOI=A graphical object such as a mouse pointer on the display screen of the controlled electronic device;
OMST=Active Facial expression of smile (i.e. smile with magnitude greater than specified threshold);
OMD during PWP=Eye gaze
Helper user action (HUA) for altering (or enhancing precision of) OOI modification=Active Facial expression of smile.
Helper signals=Zoom-in of portion of display screen around CPOI
ODE=End of the active smile that started the warp.

In such systems, the mouse pointer (OOI) can be made to jump to the location of eye gaze on the display screen (that is the CPOI/POI) only when an active smile is detected to be performed by the user. In such embodiments, the mouse pointer (OOI) can stay put (i.e. its location, the attribute of interest, can stay unchanged) until a smile (i.e. designated HUA) is detected to be active. When the start trigger is detected, the OOI can jump to the CPOI at that time.

Figure 24:
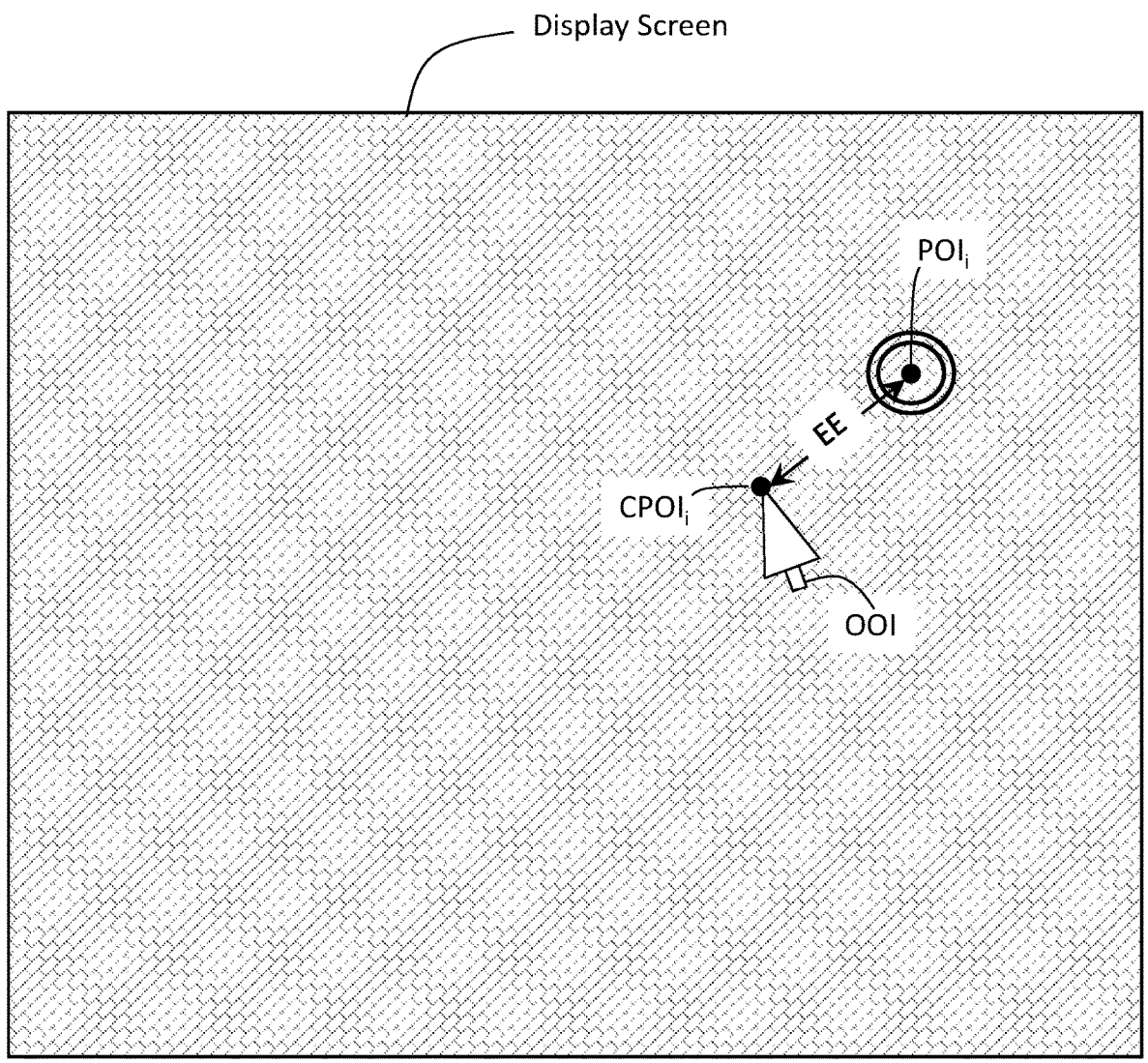
FIG. 24 illustrates Eye Gaze Calculation Error in an exemplary embodiment, at the moment of OOI Warp.
Figure 25:
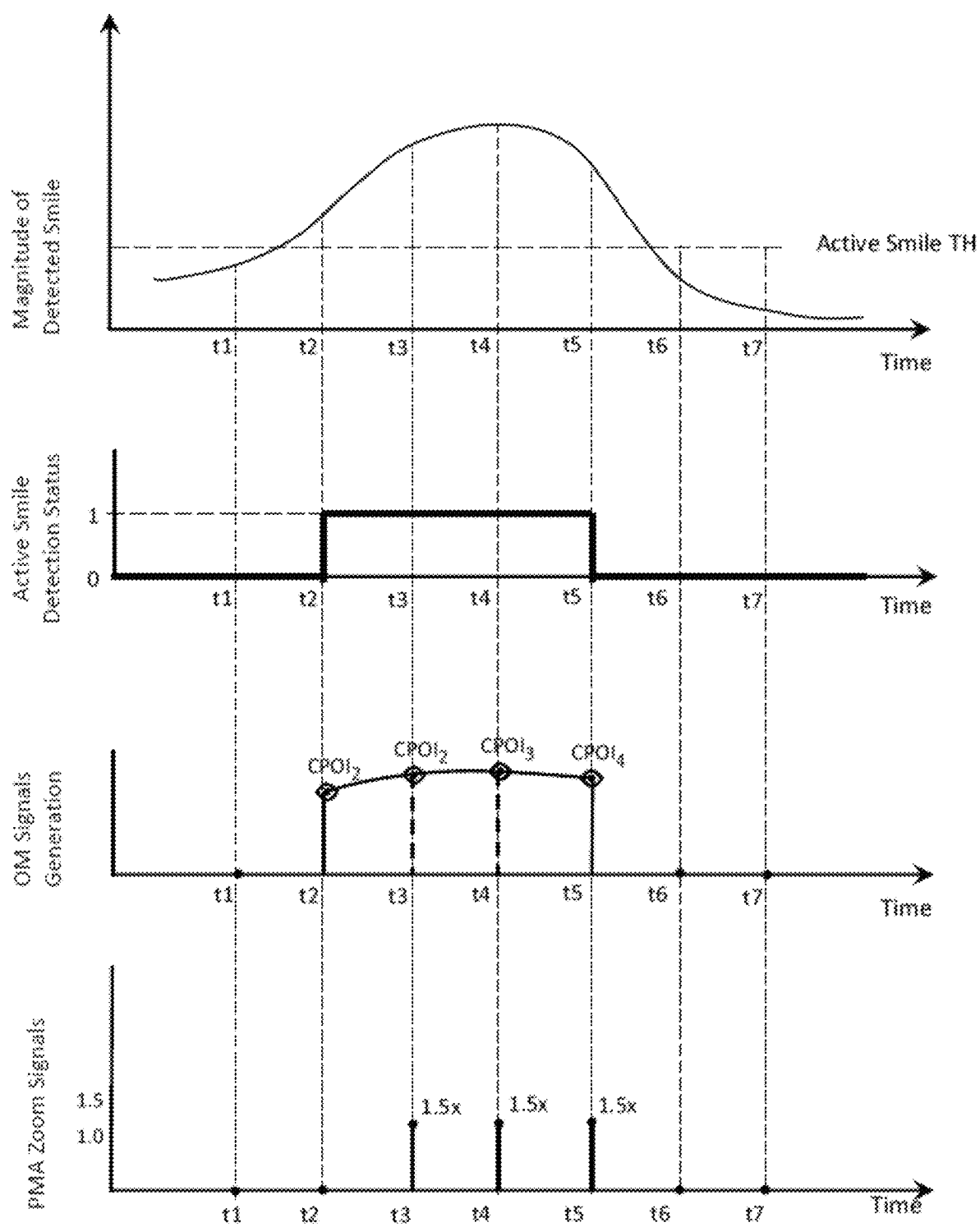
FIG. 25 illustrates an exemplary Facial Expression Signals and OOI Modification signals in an embodiment that generates Helper Signals (PMA Zoom signals) during PWP.

Given that eye gaze calculations (and determination of CPOI in particular) typically have inaccuracies, the mouse pointer (OOI) can possibly be not at the location where the user is looking at (which could be the location the user would have liked the OOI to be). See FIG. 24 for an illustration of eye gaze calculation error (EE). The figure shows a display screen and its content. The circular icon is the intended target where the user would like to place the OOI. The user is therefore looking at the center of that circle on the display screen (which is indicated by POI at the center of that circle). However, the system is shown to calculate the POI at the point shown as CPOI. The location difference between POI and CPOI is shows as EE (the eye gaze calculation error). Assuming that a warp was just performed, the OOI (mouse pointer) is shown to be at the CPOI on the display screen. Note that such eye gaze calculation errors can be inherent to eye tracking systems, and are generally expected to happen. However, depending on the amount of error, this can be a hindrance to proper user interaction. To alleviate this, the control system can generate an additional type of command signals ("helper signals") to possibly enhance the precision of modification (location) of the OOI, when the active HUA is detected. (In this variation, note that active smile is the start trigger for warp as well as the HUA, however, this may not be the case in other embodiments.) See FIG. 25 for an illustrative embodiment depicting generation of helper signals. The Magnitude of Detected Smile plot of the figure shows variation of readings from a smile sensor, along with Active Smile TH above which the detected smile is considered to be active. Therefore, an active smile is detected during t2:t5. The Active Smile Detection Status plot of FIG. 25 depicts the Active Smile Detection status. It shows that active smile was detected during time period t2:t5. The OM Signals Generation plot of FIG. 25 depicts (schematically) OM signals generated over time. Note that they are generated at t2 (based on CPOI2) because an active smile (OMST) is detected at t2. Given that the OMD to use over PWP is also eye gaze, OM signals are also generated during t3:t5 in accordance to the eye gaze (CPOIs) calculated during those iterations.

In this variation, the helper signals can cause the graphical objects around the CPOI to be magnified (possibly temporarily). Therefore, right after the initial jump/OOI warp (sudden modification) of the OOI on the display screen (upon detection of an active smile, the warp start trigger), an area (of a specified size and shape) around the CPOI can start getting magnified progressively over passage of time (let's call this area "progressively magnified area", PMA), as long as the user continues to keep that facial expression (smile HUA) active. The PMA Zoom Signals plot of FIG. 25 depicts generation of helper signals (zoom in this case). They are shown to be generated only during iterations t3, t4 and t5 as that is when the PWP is in progress. These zoom signals can cause only the content within the PMA to be progressively magnified with every passing iteration (by a factor of 1.5× in this example).

Figure 26A:
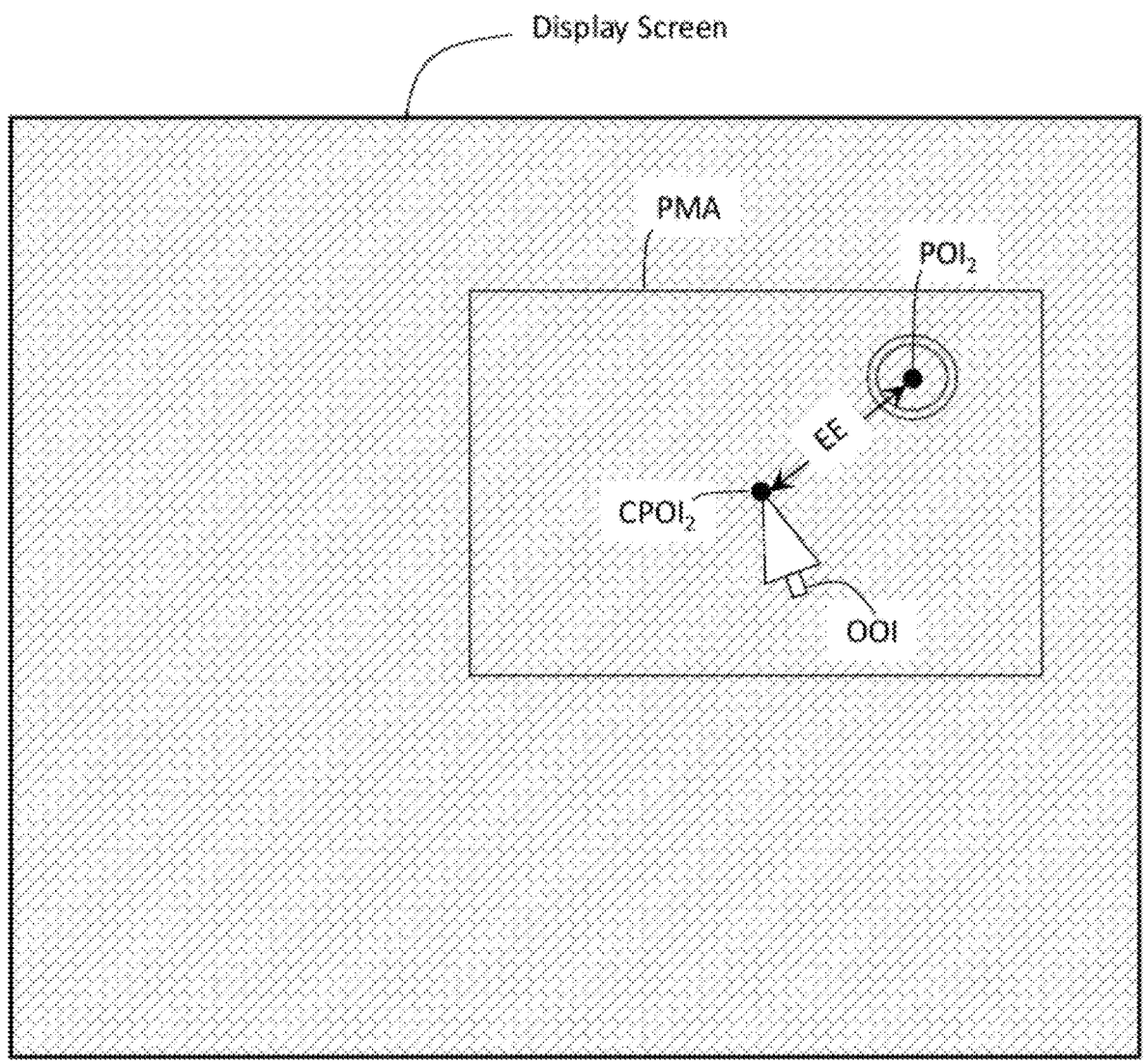
FIG. 26A illustrates an exemplary Progressive Magnification Area (PMA) on a display screen for an embodiment that generates Helper Signals (PMA Zoom signals) during PWP before the helper signals have started to be generated.
Figure 26B:
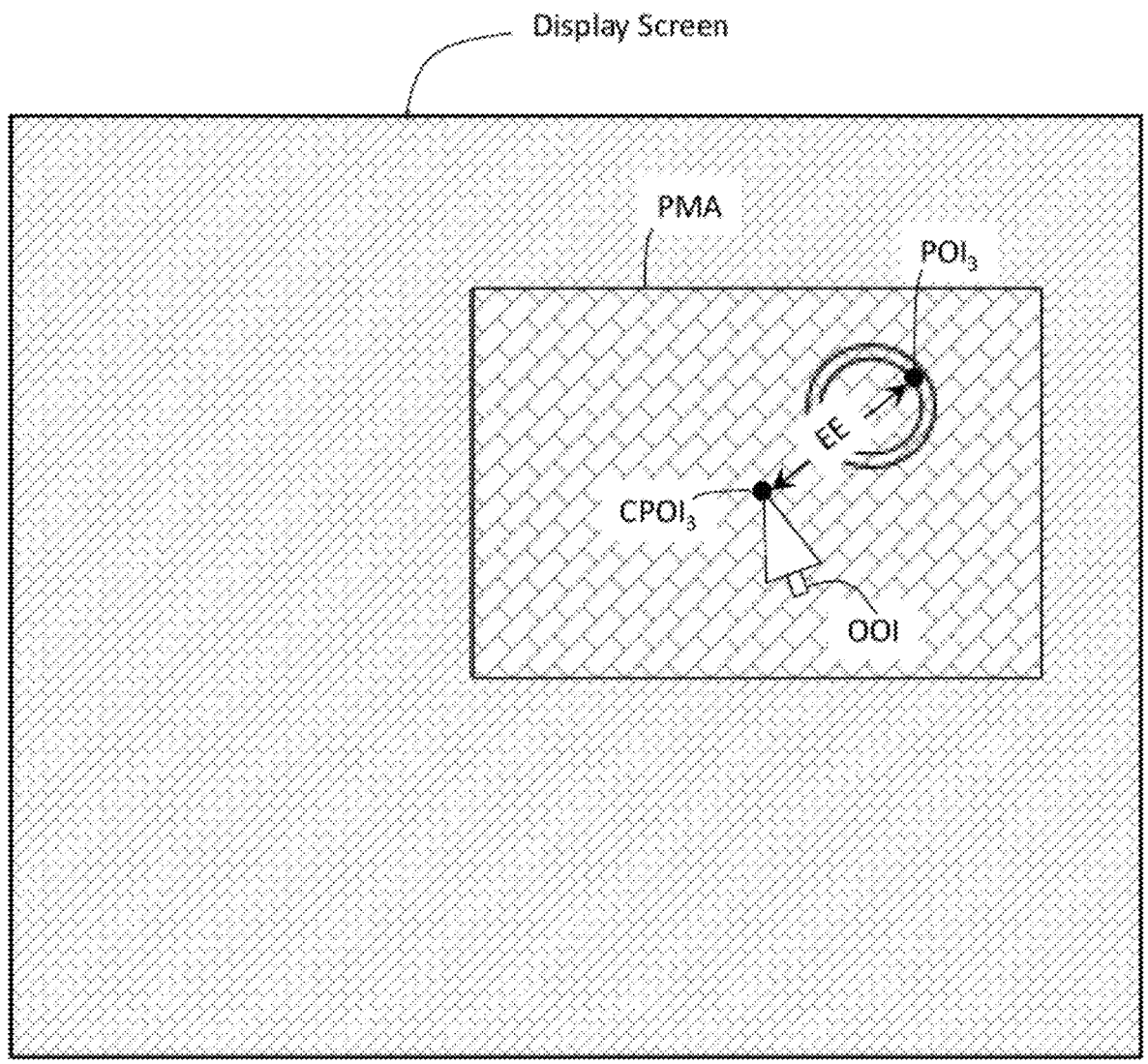
FIG. 26B illustrates the exemplary PMA of FIG. 26A wherein the generated PMA Zoom signals caused 1.5× magnification of the PMA.
Figure 26C:
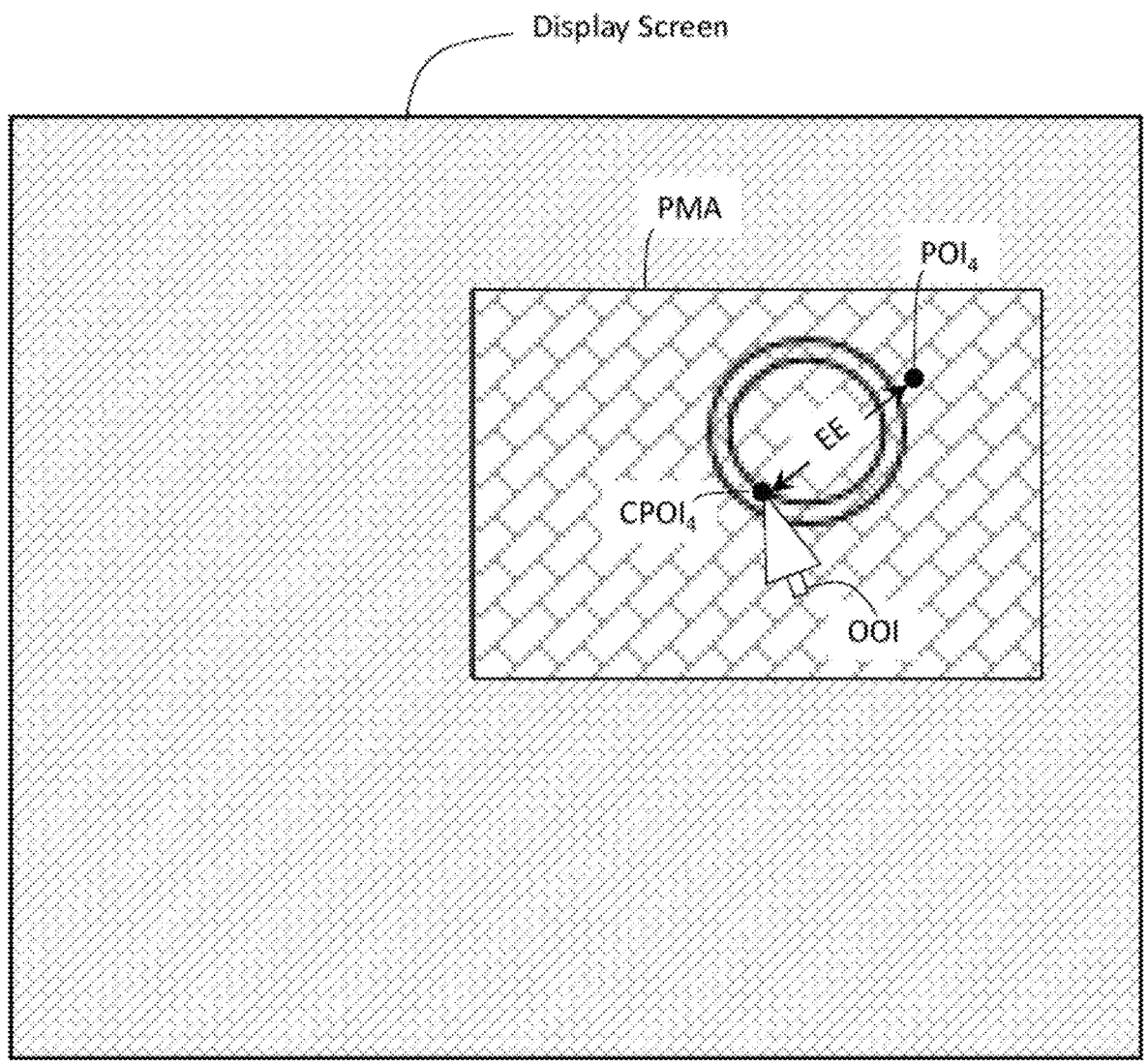
FIG. 26C illustrates the exemplary PMA of FIGS. 26A and 26B wherein the generated PMA Zoom signals caused further magnification of the PMA.
Figure 26D:
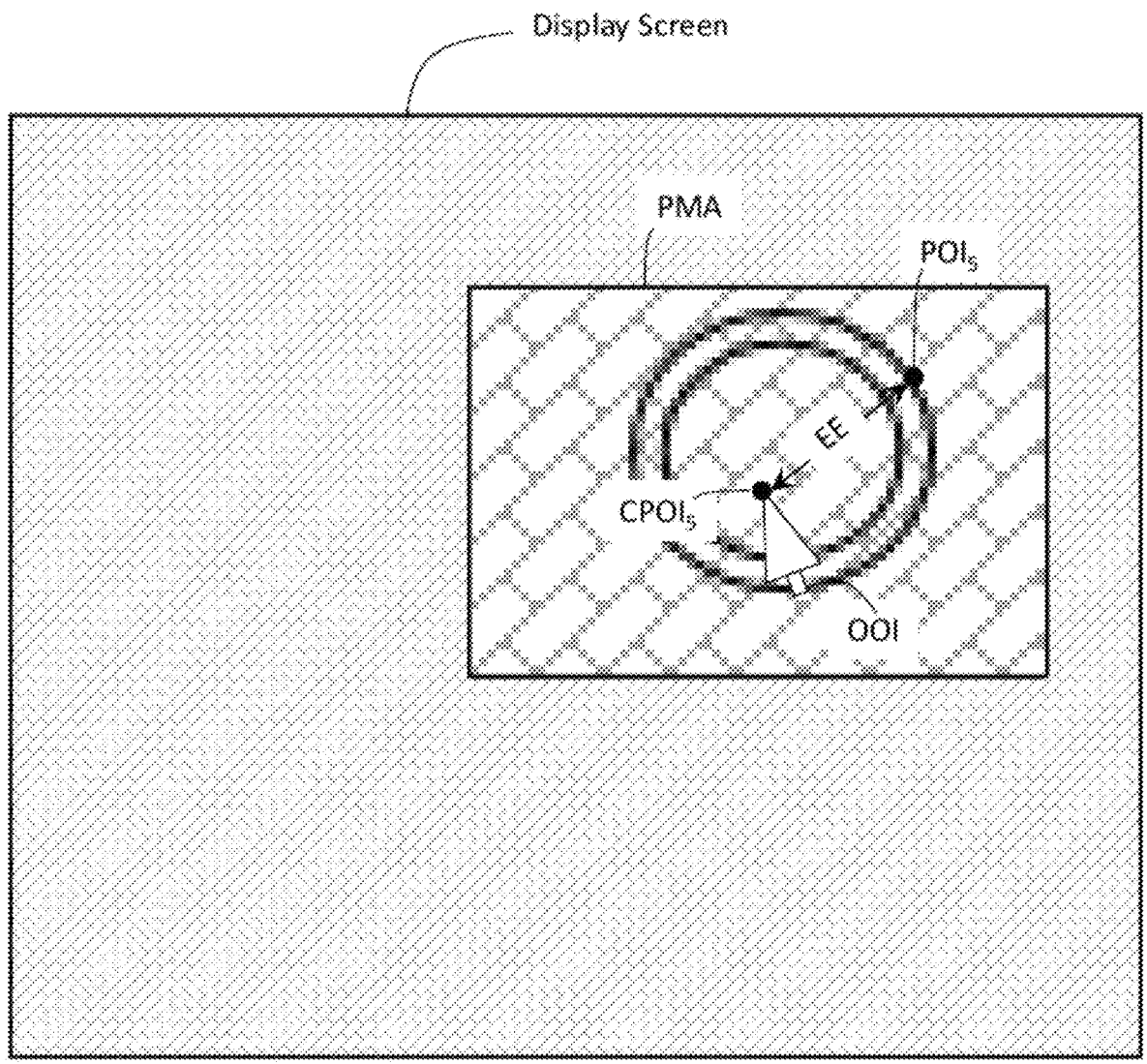
FIG. 26D illustrates the exemplary PMA of FIGS. 26A-26C wherein the generated PMA Zoom signals caused still further magnification of the PMA.

During this period of progressive magnification, the control system can continue to modify the mouse pointer (OOI) so that it continues to follow the user's (calculated) eye gaze (CPOI). If the user's eye gaze continues to be within the PMA, then OOI can keep on getting adjusted to follow the CPOI (within that PMA), until the time when the user stops the active smile (i.e. the system detects the HUA to be no longer active), at which point the mouse pointer modification can come to an end. See the illustration in FIG. 26. It depicts progressive magnification in a PMA on the display screen. FIG. 26A shows the display screen and its content at the time of the warp (time t2) (similar to FIG. 24), however along with a PMA. Note, the helper signals have not started being generated at time t2 so there is no magnification of contents inside the PMA yet. The circular icon represents the target the user intends to move the OOI to however the calculated POI is off by Eye gaze error (EE). FIG. 26B shows the content at time t3 wherein the content in the PMA has gone through 1.5× magnification. Given that some embodiments may keep the physical size of the PMA constant throughout generation of helper signals, not all magnified content can fit in the PMA, thereby causing clipping of some content. Further, some embodiments can center the magnified content at the latest CPOI, before clipping it. In that situation, the user may want to look a little bit beyond the original target so that the CPOI is pulled closer to the actual target with each iteration. FIG. 26C shows the PMA at time t4 (which is further magnified content from PMA of time t3 with further clipping). FIG. 26D shows PMA from t5 which further magnification of content of PMA from t4. Note that the user is shown to be looking a little beyond the target (the double circle, which is their real intended target for placing the OOI) so that the CPOI pulls up a little closer to the target with every iteration. Note that the EE is shown to be constant across iterations t3:t5. However, given that the content in the PMA is progressively zoomed in, the relative "size" of the error EE in original (unmagnified space keeps on reducing with each iteration as the progressive magnification is performed). When the OOI (which is moved to the latest CPOI) gets close enough to the target, the user can stop the helper action (that is active smile, in this case) and that can terminate the progressive magnification process, the generation of OM signals (and the PWP), thereby leaving the OOI much closer to the intended target than what would be possible without the zoom via the helper signals.

Note that, in some variations, the PMA can encompass the entire area of the display screen, thereby effectively causing a zooming-in of the entire graphical content on the display screen upon detection of an active HUA. In a variation, when the helper signals are being generated (based on detected active HUA), if the user happens to look outside the PMA (or even beyond the display screen), the system can temporarily suspend the generation of the helper signals (i.e. suspend the generation of zoom-in signals) to temporarily bring progressive magnification/zooming in to a halt. In such cases, the generation of helper signals can restart when the user looks within the PMA (or the display screen) and provided that they are still smiling (i.e. active HUA is detected). If the user stops smiling (HUA) at any time during the zoom-in process, the system can terminate the zoom-in process, stop displaying the PMA, and can restore the magnification factor of the entire display screen to the original value (i.e. the one just before the start of the zoom-in process) and refresh the display screen, and the OOI can be left at the latest location (i.e. at the last location during the zoom-in process but transformed back to match the original magnification factor).

Variation 2.

OOI=A graphical object such as a mouse pointer on the display screen of the controlled electronic device;

OMST=Blink of one or more eye, possibly with min and max time limits on the time duration of the blink;

Start Trigger for generating Helper Signals (STHS)= Blink. The performance of the start trigger for OOI warp can also be considered to be start trigger for generation of helper signals.

Helper signals=Zoom-in of portion of display screen around CPOI

End Trigger for Helper Signals (ETHS)=Blink. Once the generation of helper signals is started based on performance of STHS, the system can keep generating the helper signals until an ETHS is encountered. In this variation, a second blink (that is different from the STHS) will cause the zoom-in process to come to an end.

Based on the above parameters, in this variation, the OOI can be unaffected by the user's eye gaze, until the user blinks (the OMST). At that point in time, the mouse pointer (OOI) can jump to where the user is determined to be looking at (CPOI). However, given that the blink is also STHS, the system can start causing an area about the CPOI on the display screen to start progressively being magnified (zoom-in action) and the OOI to continue moving on the PMA in accordance to the eye gaze. This zoom-in process can continue until the user performs ETHS (also a blink in this variation). At this point, the PMA area can be redrawn so as the match the original magnification factor of the display screen, and the OOI relocated to the appropriate location on the display screen (refreshed with the original magnification factor based on the last location of the OOI on the PMA).

In a variation of the above, the blink for OMST/STHS can be required to be of a different duration (say longer) than the duration of the blink for ETHS. With the above arrangement, chances that a normal, unintentional blink of the user will not get misinterpreted as a OMST or STHS.

Variation 3.

OOI=A graphical object such as a mouse pointer on the display screen of the controlled electronic device;

OMST=Blink of one or more eye, possibly with min and max time limits on the time duration of the blink;

STHS=Blink. The performance of the start trigger for OOI warp can also be considered to be start trigger for generation of helper signals.

Helper signals=Zoom-in of portion of display screen around CPOI

End Trigger for Helper Signals (ETHS)=None. In this variation, the zoom-in process automatically comes to an end upon passage of specified amount of time after the start of generation of helper signals (which is in turn triggered by the STHS).

Based on the above parameters, in this variation, the OOI can be unaffected by the user's eye gaze, until the user blinks (the OMST). At that point in time, the mouse pointer (OOI) can jump to where the user is determined to be looking at (CPOI). However, given that the blink is also STHS, the system can start causing an area about the CPOI on the display screen to start progressively being magnified (zoom-in action) and the OOI to continue moving on the PMA in accordance to the eye gaze. This zoom-in process can continue for specified number of milliseconds, that is the specified "time duration for generating helper signals" (TDHS). After the elapse of THDS milliseconds after detection of the STHS, the zoom process can end, the PMA area can be redrawn so as the match the original magnification factor of the display screen, and the OOI relocated to the appropriate location on display screen (refreshed with the original magnification factor based on the last location of the OOI on the PMA).

Variation 4.
OOI=A graphical object such as a mouse pointer on the display screen of the controlled electronic device;
OMST=Start of squint of one or more eye, possibly with min and max time limits on the time duration of the squint; Note: Thresholds can be specified on the current size (or ratio) of the opening of the eye (to normal opening size) to determine if a squint is active. For example, if the current opening size is less than 50% of the "normal" eye opening size of the user for at least 50 milliseconds, then the squint action can be considered to be started.
STHS=Same as OMST action.
Helper signals=Zoom-in of portion of display screen around CPOI
End Trigger for Helper Signals (ETHS)=End of the squint. Note that the threshold used to determine end of the squint can be different from the start of the squint. For example, the squint can be considered to start if the user changes the opening of their eye to be less than 50% of the normal eye opening size, however, once the squint is started, it can be considered to be active until the time it increases to more than 70% of the normal eye opening size for that user.

Based on the above parameters, in this variation, the OOI can be unaffected by the user's eye gaze, until the user starts squinting (the OMST). At that point in time, the mouse pointer can jump to the CPOI. Given that the STHS is the same as OMST, a new graphical object representing the PMA can be superimposed on the current contents of the display screen, wherein the contents of the PMA are progressively magnified over time as long as the squint is active, and the OOI can be modified so as to follow the eye gaze. Upon the end of the squint, the PMA can disappear and the OOI be retained at its last location, however, appropriately transformed to account for the reverting back to the original magnification factors of the contents of the display screen.

Note: When computing eye opening of the user in systems that use image sensors, the head pose and eye gaze direction of the user (with respect to the image sensor) can be taken into consideration. For example, if the user is sitting upright and the image sensor is directly in front of them and at the same level of their eyes, and the user is also looking in the direction of the image sensor, then that may lead to a larger measurement of the "normal" opening of their eye, in comparison to when the user may be looking in a downward direction.

Variation 5.
OOI=A graphical object such as a mouse pointer on the display screen of the controlled electronic device;
OMST=Eyebrow raise/move/wiggle.
STHS=Same as OMST action.
Helper signals=Zoom-in of portion of display screen around CPOI
ETHS=Bringing eye brow to the original position (i.e. one before OMST was performed), or, passage of specified amount of time after the OMST.

Note that in this as well as any other variations, a blackout period can be specified right after the detection of the OMST or STHS where all eye gaze signals can be ignored for the purpose of generation OM signals. This can be especially helpful when the user action (e.g. OMST or STHS) involves the eyes or surrounding area (including eyelids and eye brows). This can allow the user to settle down some before focusing on the next step after that user action. Persons knowledgeable in the art can see that the above disclosed concepts/principles can be combined with other concepts/principles described in this or referenced documents. The above variations are illustrative in purpose, and different combinations of user actions (including facial expressions) can be used for OMST, STHS and ETHS, and different OOI types can be used in place of a mouse pointer (e.g. any graphical object), and different shapes and sizes of display screen areas can be used for PMA, and different types of Helper signals can be used as well. Some embodiments can permanently change the graphical contents in the PMA (i.e. the graphical content modified as part of the progressive magnification may not go back to the original state even after the ETHS is detected).

The principles, concepts, heuristics, user gesture designs and algorithms can be implemented in a wide variety and types of embodiments. For example, they can be implemented as methods executed using computers, software running on electronic devices, electronic systems (whole or part) or apparatuses. They can be implemented as controller devices or embedded inside controlled devices or systems. A variety of type of sensors can be used to sense the user actions disclosed. Following are just a few examples of physical embodiments implementing some of the disclosed principles.

Figure 27:
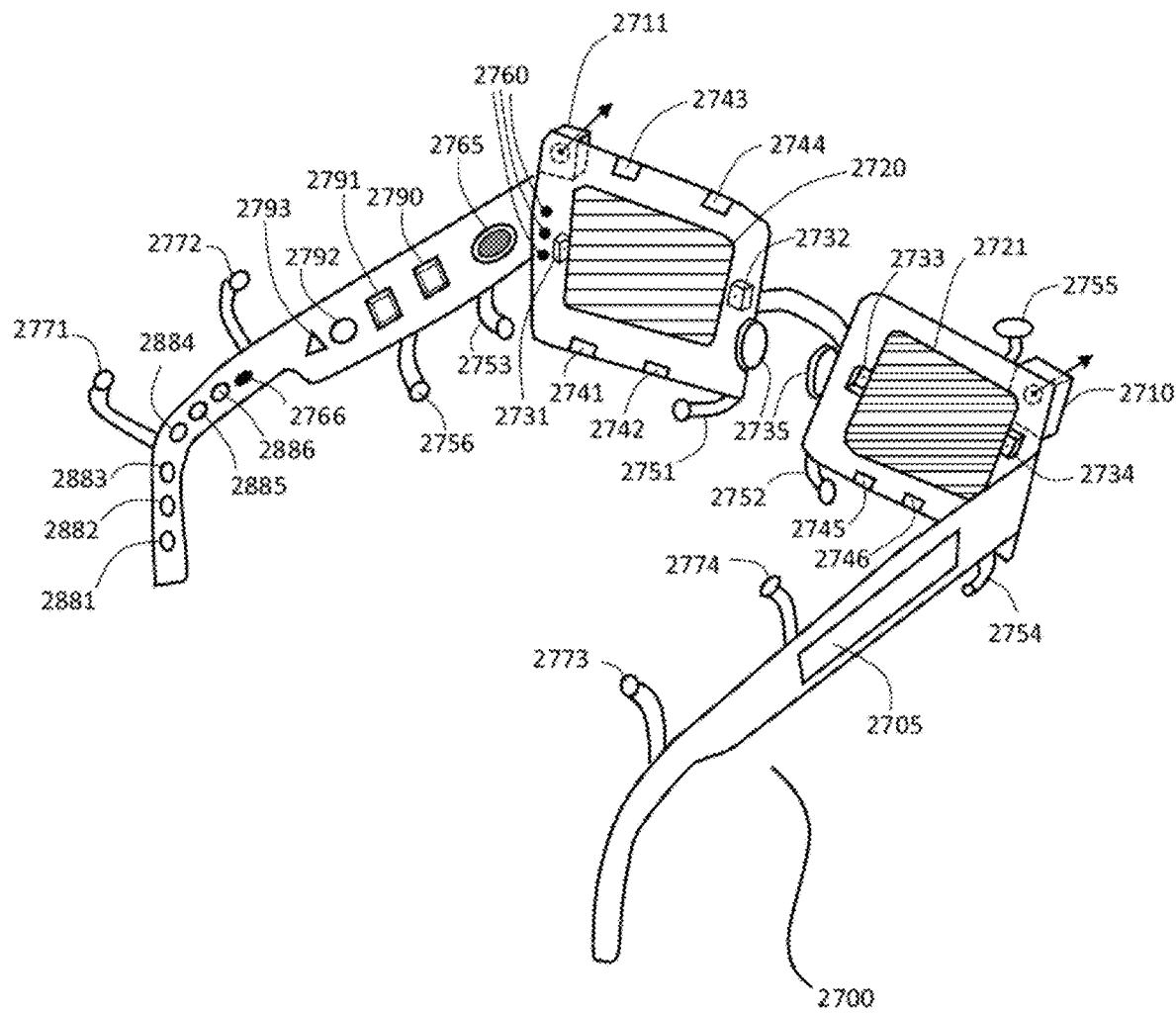
FIG. 27 illustrates an exemplary embodiment in the form of wearable Augmented/Mixed Reality Eye Glasses that uses diverse user actions including Eye gaze, Head motion and Hand gestures.

See FIG. 27 for an illustrative embodiment. in the form of Augmented Reality/Mixed Reality smart glasses. Device 2700 is a wearable Augmented Reality/Mixed Reality smart glass that can allow the user to interact with itself as well as other electronic devices by means of eye gaze, head motions, facial expressions (such as smile, eye brow motion, frown, etc.), brain waves, auricularis muscles, finger/hand/arm gestures, biometric information, physiological information, as well as touch input mechanisms. Device 2700 is in the form of eye glasses. The outside side of the right temple shows touch pad 2705 that the user can interact with by touching, swiping and pressing, with one or multiple fingers, palm, or other parts of the hand/body. The device can also differentiate a touch by a fingertip from other parts of the hand (by possibly the size and shape of the contact with the touch pad 2705) and treat them as different user actions in the user gestures. Sensors 2710 and 2711 can contain any combination of image sensors, depth sensors, time of flight sensors that can help with the detection of finger/head/arm gestures performed by the user, as well as provide understanding of the environment of the user so that the main processor of the device (not shown) can display virtual images and other augmented/mixed reality information for consumption by the user.

The front of the frame of device 2700 shows having elements 2720 and 2721, which are combination of lens with a display screen. (Optionally, device 2700 can also have a retinal projector to display images to the user.) Eye tracking sensors 2731, 2732, 2733 and 2734 are shown to be mounted on the insides of the eye glass frame; they provide readings for detection and calculation of user's eye gaze. Nose pads 2735 are shown near the bridge. (Nose pads can also be used to mount/embed various sensors). Sensors 2741, 2742, 2743, 2744, 2745 and 2746 can contain a combination of proximity, and touch sensors that can monitor the movement and/or touch by cheeks, eye brows, eye lids, as well as other muscles/facial tissue in the vicinity of those sensors. These sensors therefore can act as FE sensors. Sensors 2751, 2752, 2753 and 2754 can contain combination of proximity, touch and pressure sensors that can monitor the position, motion, touch and pressure exerted by the muscles in the vicinity of those sensors. These sensors are shown to be mounted on arms that can be adjusted to make them touch parts of the face. The output of these sensors can be used as FE readings. Sensor 2755 shown to be mounted on the top part of the frame can include EEG sensor that can help in getting brain wave readings. It may also include EMG sensor that can get readings from muscles around the eye brow. These can also be used as FE sensor readings.

Microphone 2756 is an audio mic for the user to use verbal commands. LED lights 2760 are shown on the inside of the frame; they can glow in multi colors, thereby providing feedback to the user. Speaker 2765 is shown mounted on the inner side of the temple of the eye glass. That can provide audio feedback. It could be also replaced by ear buds for audio output. Haptic feedback device 2766 can also be used for feedback to the user. Sensors 2771, 2772, 2773, and 2774 can contain combination of EEG or EMG sensors to measure brain waves or muscle activity around those regions. They are also mounted on adjustable arms that can touch or exert pressure on the user's body. Body Temperature sensor 2881, Wear sensor 2882, EEG sensor 2883, EMG sensor 2884, Heart rate sensor 2885 and GSR (Galvanic Skin Response) sensor 2886 are shown mounted on the sides of the eye glass temples. Their input can also be used for conditional activation in various heuristics. For example, certain user actions such as facial expressions can be ignored (or utilized) based on if the heart rate or GSR response readings within (or beyond) certain ranges of specified values. Head motion readings can be ignored (or only considered) based on physiological readings as well. For example, if the user is experiencing stress (as indicated by GSR readings) their head motion readings and eye brow can be ignored and only smile and eye gaze may be honored for purposes of interaction with the device.

Device 2700 also shows a Motion and orientation sensor 2790 (possibly including a MEMS based Inertial Motion Sensing Unit), Processor 2791 for computational processing and telecommunication, Battery 2792 for power source and Transceiver 2793 for connection with other devices. Other sensor types such as radar sensors can also be used for monitoring motion of facial muscles as well as hands in the vicinity of the glasses. The user gestures disclosed in this and referenced applications can not only be used to control Device 2700 itself, but some of the user gestures can be used to control other devices paired or connected with Device 2700. In effect, Device 2700 can act as a controller of any other electronic device it is configured to communicate with, for example, desktop/laptop computers, smart TVs, smart phones, home appliances, IOT devices, lighting and electrical systems, industrial machinery, car/automobile/transportation systems (including infotainment systems), health/medical/surgical systems, and more. Device 2700 can also include complete capability of a smart phone. Furthermore, Device 2700 may also communicate and receive readings from sensors mounted on other parts of the body, such as smart watches, smart rings, arm bands, heart monitors, and other wearable sensors.

Figure 28:
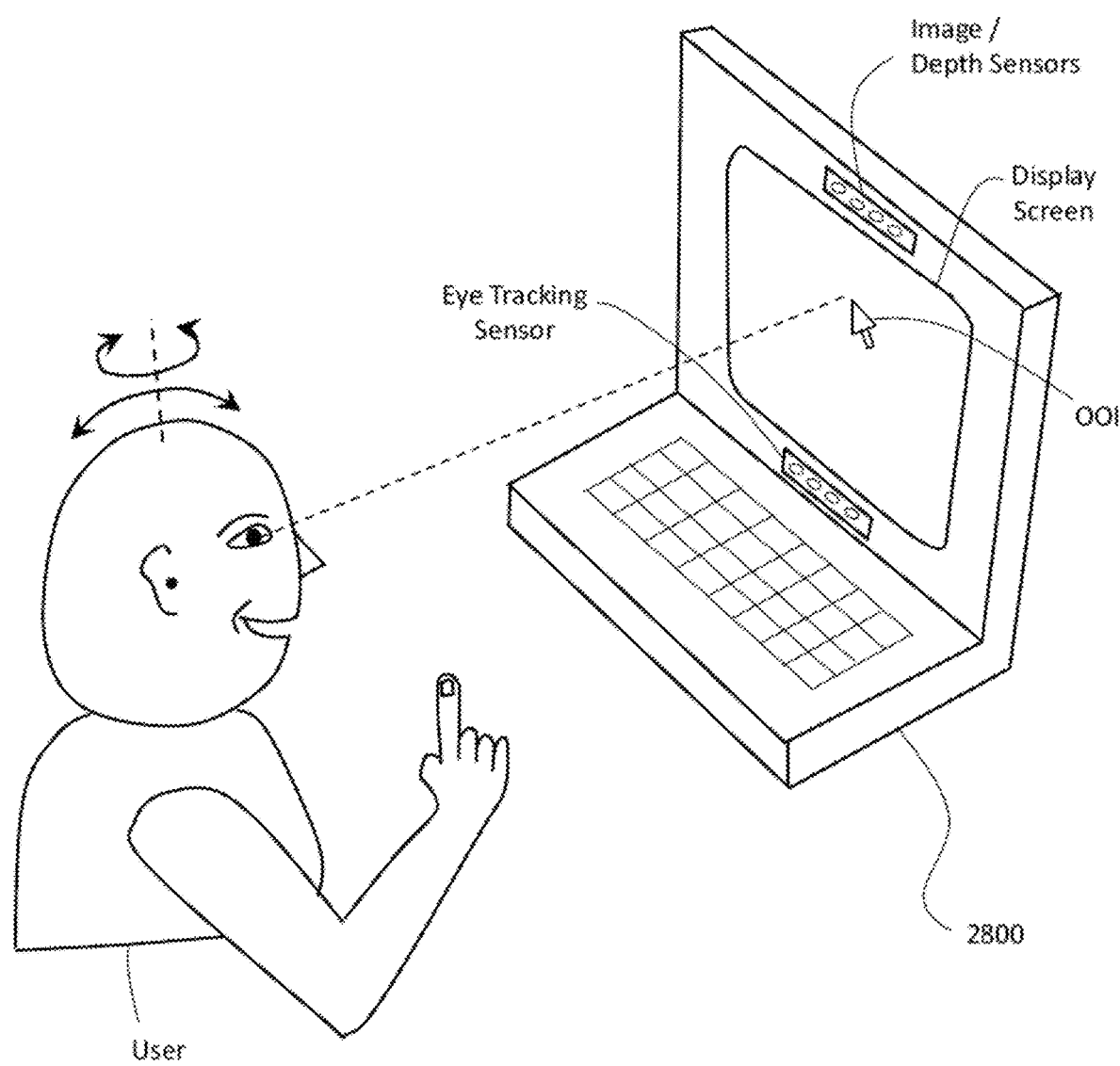
FIG. 28 illustrates an exemplary embodiment of a Control System that uses diverse user actions including Eye gaze, Head motion and Hand gestures without the need for wearables.

See FIG. 28 for another embodiment of the control system. It shows the user interacting with a computer 2800 by means of head motion, facial expressions as well as hand gestures. The computer is shown to include eye tracking sensor, as well as image and depth sensors which can include 2D as well as 3D RGB sensors, time-of-flight sensors, depth sensors, infrared sensors, infrared illuminators, etc. These sensors capture head motion, facial expressions, eye gaze, as well as hand and other body part actions. In this scenario, the user is not wearing any devices however the sensors on the computer are capturing them in a touch free fashion. While interacting with computer 2800, the user can use many of the same user gestures that can be used when interacting with device 2700. These user gestures can include user actions such as head motion, eye gaze, facial expression, hand gestures as well as vocal commands. The computer is shown with a display screen and includes a processor that runs the control software that receives the input from all the sensors, recognizes user gestures, and generates command signals to control computer 2800 (or any programs running on it), or any other devices connected to computer 2800. The computer can be considered to include the control system as well as the controlled device.

The referenced applications (including U.S. patent application Ser. No. 13/418,331, U.S. patent application Ser. No. 14/054,789 and others) disclose wearable devices in the form of head-worn wearables, with arms that include touch and/or proximity sensors that can sense the motion of facial muscles as well as touch by those facial muscles. The use of sip-and-puff sensors (which are typically mounted on projections or arms). Some embodiments can combine multiple sensors on the same physical structure, such as an arm extending from a controller embodiment (that may be worn on the head or mounted close to the user's head). For example, refer to FIG. 1 of the '331 application. It shows sensor arm 2 extending towards the user's mouth. Some embodiments can have this arm elongated enough so that the user can blow puffs of air on a portion of the arm (such as the tip of the arm). The strength and time duration of the puffs can be measured by puff sensor(s), and these sensor readings can be considered to be indicative of the puffing action or puffing facial expression performed by the user. These sensor readings can be considered to be PCE readings and thereby be used by any of the heuristics (that use a PCE) disclosed in this as well as the referenced applications. Further, the same arm that has a puff sensor can also house proximity and touch sensors so that the touch actions performed by the user (by using their lips, tongue, cheek or any other part of the mouth or face) can be sensed by the same arm. This can provide flexibility (and thereby ease of use) to the user with regards to which PCE they would like to use to perform the gestures. For example, the user can puff into the puff sensor for a short duration to cause a click or puff into the puff sensor for a longer duration to start a drag command, or touch a touch sensitive part of the arm for a short duration for a click, or touch the arm for a longer duration to start a drag command, and keep on interchanging which action they are performing to achieve the same or similar results. By using different muscles or part of the face, the user thereby can prevent the same set of muscles from getting tired due to over use or frequent use.

Some electronic devices use facial recognition for securing access to devices. For example, Apple's iPhone X allows unlocking a locked phone by means of the facial recognition that will unlock only when the face of the user looks similar to the face of the user authorized to use that phone. However, this arrangement can get fooled by having an unauthorized user use a mask that resembles the authorized user. Further, a twin sibling or even a relative of the authorized user can gain access to the phone due to the resemblance of their face with the authorized user. Such systems can be made more fool proof by requiring the user to present additional actions to unlock the device. For example, the user can be required to perform a sequence of motions or body actions when they are in front of the device. For example, they can be required to perform a sequence of facial expressions. Some examples are—a smile, or a smile followed by a frown, or a smile and a wink, or a smile and simultaneous wink, or a smile and moving the head in a specified motion pattern (such as nod, head roll, tracing FIG. 8 with the nose tip, and so on), and so on. Further the additional actions can involve other body parts or actions. For example, squeezing the sides of the device (such as the phone) while holding the phone, or shaking/moving the device in a particular way before or after looking at the facial recognition camera on the device, or holding a victory hand gesture with the hand or doing a Vulcan salute, etc. could be required. The above principles could also be used with home and other security systems so that when a user is in front of the camera (used for facial recognition), they could be required to perform additional actions (with just their face or any other part of their body) to gain access. It will be obvious to persons knowledgeable in the art that the above principles can be used with a wide variety of combinations of other body actions along with pure face recognition to strengthen the security of the system.

The principles of user interface and gesture definition/recognition disclosed in this document are applicable for use with information from any sensors that can provide information related to motion and/or position of body parts or any other objects that can provide an indication of motion of user's body parts. For example, an indication of motion/position of user's arm can be provided by measuring motion/position of an arm band, wrist band, watch, ring, glove, etc. being worn by the user. Motion/position of user's head (Body Motion) can be substituted by motion or position of a hat, eye glasses or a head gear worn by the user. In effect, Body Part can be substituted by a foreign object under direct or indirect, full or partial control of the user. Further, this motion/position information can be derived using a variety of sensors including but not restricted to accelerometers, gyroscopes, image sensors, wave field sensors, radars, electric field sensors, acoustic sensors, ultrasonic sensors, EMG sensors, OCG sensors, resistive sensors, as well as others. Further, some user actions may not be detectable visibly from outside but be detectable by other sensors. For example, users can change their meditation or attention level consciously. Alternatively, they can also intentionally change the level of their Alpha, Beta, Theta or Delta brain waves. These levels and/or level changes can be measured by brainwave, EEG or other suitable sensors. Neurosky, Inc. (http://neurosky.com) is one vendor that provides hardware and software to measure brainwaves and detect changes in meditation and attention level of the user. Some embodiments then can use brainwave sensors that provide readings of either meditation level or attention level or any other biometric quantity that the user can consciously have an effect on and/or can cause a change in magnitude, frequency, direction or other measurable attributes. For example, instead of performing a facial expression, the user can increase or decrease meditation or attention level, which then can be treated as "PCE" information and used in the heuristics/principles as described in this and above reference documents. Brainwave sensors, EEG and other biometric sensors can be used as PCE sensors and used to control electronic devices. Similarly, certain conscious bodily muscular action may be hard to detect visibly, however, may be easily detectable by EMG sensors and other sensors. For example, clenching of the teeth or different parts of lower jaw, tensing throat, other parts of face or head, scalp, various *auricularis* muscles, parts of torso, shoulders, arms, legs, feet, fingers, toes, thighs, calves, or various sphincters of the body may not be externally visible but could be detected by EMG or other sensors. Again, these sensors can be used as PCE/PCM sensors and all the heuristics defined for PCE/PCM sensors can be used with these sensors as well.

All the above disclosed concepts/principles/heuristics/techniques/algorithms, etc. can be used in variety of different fields and applications. Some of the examples are Augmentative and alternative communication (AAC), Assistive Technology, Speech Generation Devices, Augmented/Mixed/Virtual Reality, Desktop and Mobile Computing, Gaming, Industrial Control, Healthcare, Defense, Aviation, Transportation, Manufacturing, Product Lifecycle Management, Aerospace, and others. All the concepts/principles/heuristics/techniques/algorithms, etc. disclosed in this document can also be used with all the apparatuses/devices disclosed in the referenced documents, as well as with devices including but not limited to head worn devices such as smart glasses, smart helmets, virtual/mixed/augmented reality devices, head worn controllers, in-ear controllers, head phones, ear plugs, head bands and neck bands. Further, they are also applicable to other body worn devices such arm/wrist bands, devices utilizing wearable sensors and smart watches, devices embedded inside the user's body, as well as devices that are not physically worn in/on user's body such as smart phones, tablets, desktop computers, smart TVs, set top devices, and others that may possibly utilize image, radar, sonar, sound/voice, ultrasonic, laser and other sensors to sense any or all body actions.

Persons knowledgeable in the art can see that the above disclosed concepts/principles/heuristics/techniques/algorithms, etc. including but not limited to Combination of different types of Motion and Expressions that occur simultaneously or in tandem, Periods of "No Motion" or "No Expression", Periods of Motion or "No Motion" or Expression or "No Expression" with fixed and variable or indefinite lengths or bounded lengths, Time bounds on periods of Motion or No Motion or Expression or No Expression, Magnitude (and other attribute) bounds on Motions and Expressions, TMB Motions and Expressions, Blackout Periods, Variable Length Waiting Periods with or without bounds, Gesture Wakeup Sequence, Session Wakeup Sequence, Signal Generation Session, Concept of Modes, etc. can be used not only to define user gestures but also to facilitate recognition of those user gestures, as well as to provide user convenience. Further, Motions and Expressions can be substituted by other bodily and/or mental actions performed by the user in the use/application of the disclosed concepts/principles/heuristics/techniques/algorithms, etc. Some or all of the above disclosures can be used to define/implement methods/processes, and/or to devise/create software modules/applications/programs, and/or to manufacture software storage media that contain computer executable instructions based on some or all of the teachings of the disclosures, and/or manufacture devices that implement some or all of the teachings of the disclosures.

Some or all of the above disclosures can be used to define or implement computer implementable methods or processes, to design and create part of user interfaces to electronic devices, to devise/create software modules/applications/programs, API, to manufacture non-transient storage media that can contain computer executable instructions based on some or all of the teachings of the disclosures, and/or to manufacture devices or apparatuses that implement some or all of the teachings of the disclosures.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

I claim:

1. A computer implemented method of controlling an electronic device by a user, the computer implemented method comprising:
   monitoring motions of the user's head;
   monitoring user's eye gaze;
   when the motions of the user's head reach or cross a first head motion threshold to go outside a head motion tolerance zone, generating one or more first commands to move an object of interest (OOI) in accordance to the user's eye gaze; and
   when the motions of the user's head stay within the head motion tolerance zone, not generating the one or more first commands to move the OOI in accordance to the user's eye gaze;
   wherein the OOI is affected by the electronic device.

2. The computer implemented method of claim 1, wherein monitoring motions of the user's head comprises monitoring the speed of the user's head and wherein the first head motion threshold is a speed threshold.

3. The computer implemented method of claim 2, further comprising:
   after generating the one or more first commands, generating one or more second commands to move the OOI in accordance to the motions of the user's head until the motions of the user's head fall under a second head motion threshold.

4. The computer implemented method of claim 1, further comprising:
   after generating the one or more first commands, generating one or more third commands to move the OOI in accordance to the motions of the user's head until the motions of the user's head fall under a third head motion threshold.

5. The computer implemented method of claim 1, further comprising:
   after generating the one or more first commands, generating one or more fourth commands to move the OOI;
   wherein the one or more fourth commands are generated in accordance to the motions of the user's head when the user's eye gaze moves by less than a first eye gaze motion threshold; and
   wherein the one or more fourth commands are generated in accordance to the user's eye gaze when the user's eye gaze moves by greater than or equal to the first eye gaze motion threshold.

6. The computer implemented method of claim 5, further comprising:
   stop generating the one or more fourth commands when the motions of the user's head fall under a fourth head motion threshold.

7. The computer implemented method of claim 1, further comprising:
   after generating the one or more first commands, generating one or more fifth commands to move the OOI in accordance to the motions of the user's head until the motions of the user's head fall under a fifth head motion threshold or until the user's eye gaze moves by greater than or equal to a second eye gaze motion threshold.

8. A non-transitory computer readable medium comprising one or more programs configured to be executed by one or more processors to enable a user to communicate with an electronic device, the one or more programs causing performance of a method comprising:
   monitoring motions of the user's head;
   monitoring user's eye gaze;
   when the motions of the user's head reach or cross a first head motion threshold to go outside a head motion tolerance zone, generating one or more first commands to move an object of interest (OOI) in accordance to the user's eye gaze; and
   when the motions of the user's head stay within the head motion tolerance zone, not generating the one or more first commands to move the OOI in accordance to the user's eye gaze;
   wherein the OOI is affected by the electronic device.

9. The computer readable medium of claim 8, wherein monitoring motions of the user's head comprises monitoring speed of the user's head and wherein the first head motion threshold is a speed threshold.

10. The computer readable medium of claim 9, wherein the method further comprises:
    after generating the one or more first commands, generating one or more second commands to move the OOI in accordance to the motions of the user's head until the motions of the user's head fall under a second head motion threshold.

11. The computer readable medium of claim 8, wherein the method further comprises:
    after generating the one or more first commands, generating one or more third commands to move the OOI in accordance to the motions of the user's head until the motions of the user's head fall under a third head motion threshold.

12. The computer readable medium of claim 8, wherein the method further comprises:
    after generating the one or more first commands, generating one or more fourth commands to move the OOI;
    wherein the one or more fourth commands are generated in accordance to the motions of the user's head when the user's eye gaze moves by less than a first eye gaze motion threshold; and
    wherein the one or more fourth commands are generated in accordance to the user's eye gaze when the user's eye gaze moves by greater than or equal to the first eye gaze motion threshold.

13. The computer readable medium of claim 12, wherein the method further comprises:
    stop generating the one or more fourth commands when the motions of the user's head fall under a fourth head motion threshold.

14. The computer readable medium of claim 8, wherein the method further comprises:
    after generating the one or more first commands, generating one or more fifth commands to move the OOI in accordance to the motions of the user's head until the motions of the user's head fall under a fifth head motion threshold or until the user's eye gaze moves by greater than or equal to a second eye gaze motion threshold.

15. A system for a user to control an electronic device, the system comprising:
    a processor configured to:
       receive head signals indicative of motion of the user's head;
       receive eye gaze signals indicative of the user's eye gaze;
       when the motions of the user's head reach or cross a first head motion threshold to go outside a head motion tolerance zone, generate one or more first commands for the electronic device to move an object of interest (OOI) in accordance to the user's eye gaze; and when the motions of the user's head stay within the head motion tolerance zone, not generate the one or more first commands to move the OOI in accordance to the user's eye gaze;

wherein the OOI is affected by the electronic device.

16. The system of claim 15, wherein the head signals are indicative of speed of the user's head and wherein the first head motion threshold is a speed threshold.

17. The system of claim 16, wherein after generation of the one or more first commands, the processor generates one or more second commands to move the OOI in accordance to the motions of the user's head until the motions of the user's head fall under a second head motion threshold.

18. The system of claim 15, wherein after generation of the one or more first commands, the processor generates one or more third commands to move the OOI in accordance to the motions of the user's head until the motions of the user's head fall under a third head motion threshold.

19. The system of claim 15, wherein after generation of the one or more first commands, the processor generates one or more fourth commands to move the OOI;

wherein the one or more fourth commands are generated in accordance to the motions of the user's head when the user's eye gaze moves by less than a first eye gaze motion threshold; and wherein the one or more fourth commands are generated in accordance to the user's eye gaze when the user's eye gaze moves by greater than or equal to the first eye gaze motion threshold.

20. The system of claim 19, wherein the processor stops generation of the one or more fourth commands when the motions of the user's head fall under a fourth head motion threshold.

21. The system of claim 15, wherein after generation of the one or more first commands, the processor generates one or more fifth commands to move the OOI in accordance to the motions of the user's head until the motions of the user's head fall under a fifth head motion threshold or until the user's eye gaze moves by greater than or equal to a second eye gaze motion threshold.

22. The system of claim 15, wherein the system further comprises one or more first sensors that provide at least a portion of at least one of the head signals and the eye gaze signals.

23. The system of claim 22, wherein at least one part of the system is worn on the user's body.

24. The system of claim 15, wherein at least one part of the system is worn on the user's body.

25. An apparatus for a user to control an electronic device, the apparatus comprising:

a processor configured to:

receive head signals indicative of motion of the user's head;

receive eye gaze signals indicative of the user's eye gaze;

when the motions of the user's head reach or cross a first head motion threshold to go outside a head motion tolerance zone, generate a one or more first commands for the electronic device to move an object of interest (OOI) in accordance to the user's eye gaze;

when the motions of the user's head stay within the head motion tolerance zone, not generate the one or more first commands to move the OOI in accordance to the user's eye gaze; and one or more first sensors configured to provide at least a portion of at least one of the head signals and the eye gaze signals;

wherein the OOI is affected by the electronic device.

26. The apparatus of claim 25, wherein the head signals are indicative of speed of the user's head and wherein the first head motion threshold is a speed threshold.

27. The apparatus of claim 26, wherein after generation of the one or more first commands, the processor generates one or more second commands to move the OOI in accordance to the motions of the user's head until the motions of the user's head fall under a second head motion threshold.

28. The apparatus of claim 25, wherein after generation of the one or more first commands, the processor generates one or more third commands to move the OOI in accordance to the motions of the user's head until the motions of the user's head fall under a third head motion threshold.

29. The apparatus of claim 25, wherein after generation of the one or more first commands, the processor generates one or more fourth commands to move the OOI;

wherein the one or more fourth commands are generated in accordance to the motions of the user's head when the user's eye gaze moves by less than a first eye gaze motion threshold; and wherein the one or more fourth commands are generated in accordance to the user's eye gaze when the user's eye gaze moves by greater than or equal to the third eye gaze motion threshold.

30. The apparatus of claim 29, wherein the processor stops generation of the one or more fourth commands when the motions of the user's head fall under a fourth head motion threshold.

31. The apparatus of claim 25, wherein after generation of the one or more first commands, the processor generates one or more fifth commands to move the OOI in accordance to the motions of the user's head until the motions of the user's head fall under a fifth head motion threshold or until when the user's eye gaze moves by greater than or equal to a second eye gaze motion threshold.

32. The apparatus of claim 25, wherein the apparatus is worn on the user's body.

33. The apparatus of claim 25, wherein the apparatus is in the form of eyewear.

34. The apparatus of claim 25, wherein the one or more first sensors comprise an image sensor.

35. The apparatus of claim 25, where the one or more first sensors comprise a MEMS sensor.

* * * * *